United States Patent
Kang et al.

(10) Patent No.: US 10,063,923 B2
(45) Date of Patent: Aug. 28, 2018

(54) DIGITAL DEVICE AND CONTROL METHOD THEREOF

(71) Applicant: LG ELECTRONICS INC., Seoul (KR)

(72) Inventors: Sangwoo Kang, Seoul (KR); Kanghee Im, Seoul (KR); Changwook Im, Seoul (KR); Dongheon Jang, Seoul (KR); Chanjin Park, Seoul (KR); Beomjun Kim, Seoul (KR); Sangchoul Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/121,931

(22) PCT Filed: Feb. 3, 2015

(86) PCT No.: PCT/KR2015/001108
§ 371 (c)(1),
(2) Date: Aug. 26, 2016

(87) PCT Pub. No.: WO2015/130024
PCT Pub. Date: Sep. 3, 2015

(65) Prior Publication Data
US 2017/0085948 A1    Mar. 23, 2017

Related U.S. Application Data

(60) Provisional application No. 61/945,101, filed on Feb. 26, 2014, provisional application No. 61/945,113, filed on Feb. 26, 2014.

(30) Foreign Application Priority Data

Sep. 30, 2014  (KR) .................. 10-2014-0131935
Sep. 30, 2014  (KR) .................. 10-2014-0131936

(51) Int. Cl.
*G06F 3/00* (2006.01)
*G06F 13/00* (2006.01)
(Continued)

(52) U.S. Cl.
CPC ..... *H04N 21/4432* (2013.01); *H04N 21/4882* (2013.01); *H04N 21/8173* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 9,804,662 B2 * | 10/2017 | Park ................. | G06F 1/3265 |
| 2010/0325409 A1 * | 12/2010 | Kim .................. | G06F 9/4401 713/2 |
| 2014/0139741 A1 * | 5/2014 | Momosaki ........ | H04N 21/4424 348/553 |

FOREIGN PATENT DOCUMENTS

| | | |
|---|---|---|
| KR | 10-2009-0034140 | 4/2009 |
| KR | 10-2013-0132079 | 12/2013 |

(Continued)

OTHER PUBLICATIONS

International Search Report dated Apr. 29, 2015 issued in Application No. PCT/KR2015/001108 (English translation attached).

*Primary Examiner* — Mulugeta Mengesha
(74) *Attorney, Agent, or Firm* — KED & Associates LLP

(57) ABSTRACT

The present specification discloses various embodiments for a digital device and a control method thereof. Herein, a control method of a digital device according to an embodiment of the present invention may comprise the steps of: receiving a power-on signal; determining whether an application, which was executed at a power-off time point before the reception of the power-on signal, was an image output application; if it is determined that the application which (Continued)

was executed at the power-off time point was an image output application, loading and executing the image output application; loading and executing a first image control application for controlling an image that is output through the image output application; loading a second image control application; and, when the loading is completed, terminating the first image control application and executing the second image control application.

18 Claims, 41 Drawing Sheets

(51) Int. Cl.
| | |
|---|---|
| *H04N 5/445* | (2011.01) |
| *H04N 21/443* | (2011.01) |
| *H04N 21/488* | (2011.01) |
| *H04N 21/81* | (2011.01) |
| *H04N 21/438* | (2011.01) |
| *H04L 29/08* | (2006.01) |
| *H04N 21/422* | (2011.01) |
| *H04N 21/426* | (2011.01) |
| *H04N 21/4363* | (2011.01) |
| *H04N 21/472* | (2011.01) |
| *H04N 21/485* | (2011.01) |

(52) U.S. Cl.
CPC ......... *H04N 21/8193* (2013.01); *H04L 67/02* (2013.01); *H04N 21/42204* (2013.01); *H04N 21/42646* (2013.01); *H04N 21/4383* (2013.01); *H04N 21/43632* (2013.01); *H04N 21/47214* (2013.01); *H04N 21/4852* (2013.01)

(56) References Cited

FOREIGN PATENT DOCUMENTS

| | | |
|---|---|---|
| WO | WO 2010-147267 | 12/2010 |
| WO | WO 2011-142498 | 11/2011 |
| WO | WO 2012-005421 | 1/2012 |

\* cited by examiner

FIG. 34
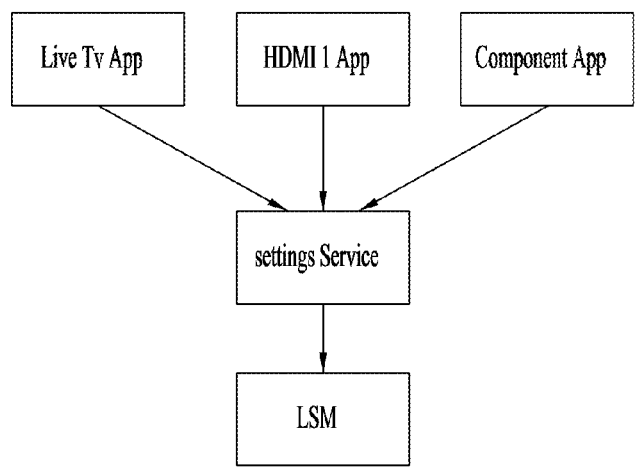
(a)
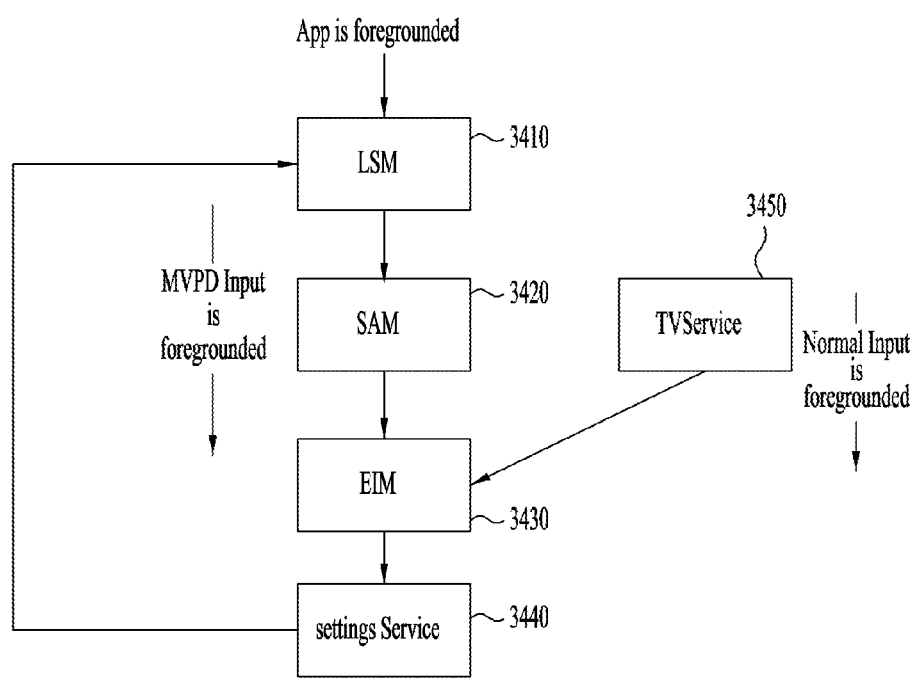
(b)

FIG. 41
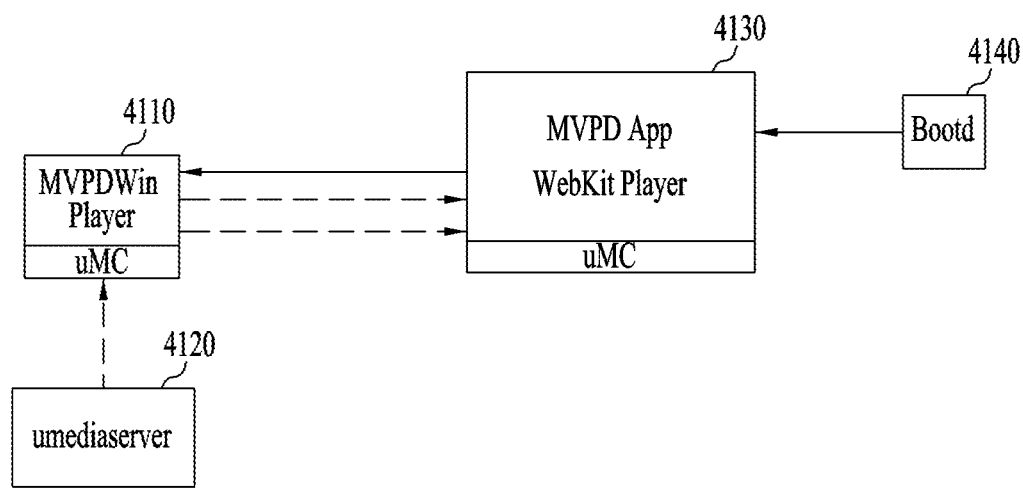
(a)
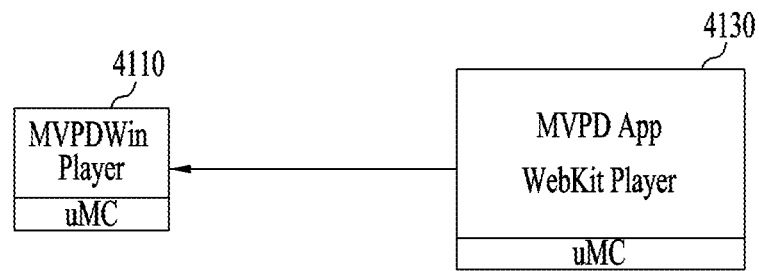
(b)

DIGITAL DEVICE AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2015/001108, filed Feb. 3, 2015, which claims priority to U.S. Provisional Application No. 61/945,101 filed Feb. 26, 2014, U.S. Provisional Application No. 61/945,113 filed Feb. 26, 2014, Korean Patent Application No. 10-2014-0131935, filed Sep. 30, 2014, and Korean Patent Application No. 10-2014-0131936, filed Sep. 30, 2014, whose entire disclosures are hereby incorporated by reference.

TECHNICAL FIELD

The present invention relates to a digital device. More particularly, when an image output application is executed and a first image control application is executed to control the image output application with a minimum function, the present invention related to a method of executing a second image control application to control the image output application using various functions with a technology incapable of being recognized by a user, a method of processing such a service as an MVPD (multichannel video programming distributor) and the like on a web OS platform, and a digital device therefor.

BACKGROUND ART

Development of a mobile device such as a smartphone, a tablet PC, and the like as well as a standing device such as a PC (personal computer), a TV (television) is remarkable. The standing device and the mobile device have been originally developing in each domain in a manner of being distinguished. Yet, the domain becomes ambiguous according to the boom of recent digital convergence.

And, as an eye level of a user is getting higher according to the development of a digital device or environment change, demand for various and high-spec services and application support is increasing.

As one of the aforementioned services, a digital TV supports an MVPD (multichannel video programming distributor) service as well. Yet, according to a legacy MVPD service, the service was performed in a form that solution(s) of a service provider are all embedded in a set-top box (STB). Hence, a digital device embeds the solutions in the device in a software manner and replaces a function of the legacy hardware set-top box with the solutions. Hence, according to a legacy digital device, it was difficult for a user to access the MVPD service. And, due to a load resulted from supporting the MVPD service supported by the digital device, service loading such as booting and the like or initialization time has increased. Hence, a user feels inconvenience when the user uses a service.

DISCLOSURE OF THE INVENTION

Technical Problem

Accordingly, the present invention is directed to substantially obviate one or more of the problems due to limitations and disadvantages of the related art. An object of the present invention is to preferentially boot a first image control application providing a minimum image control function at the time a user turns on power of a device.

Another object of the present invention is to boot a second image control application providing various image control functions at a background while a minimum image control function is provided by a first image control application.

Another object of the present invention is to perform resource management to make booting of the first image control application to be performed more quickly while a minimum image control function of the first image control application is provided.

Another object of the present invention is to support and process an RF and/or an IP-based MVPD (multichannel video programming distributor) service in a digital device on which a web OS platform is mounted.

Another object of the present invention is to provide the MVPD service in a form similar to external inputs such as a HDMI (high definition multimedia interface), a component and the like and provide accessibility and convenience to a user.

Another object of the present invention is to provide and process a service of performance equal to or greater than performance of a legacy MVPD service or a hardware set-top box.

The other object of the present invention is to seamlessly provide a service when booting and the like are performed in case of supporting a MVPD service on a web OS platform.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

Various embodiment(s) for a digital device and a method of processing a service thereof are disclosed in the present specification.

To achieve these and other advantages and in accordance with the purpose of the present invention, as embodied and broadly described, according to one embodiment, a method of controlling a digital device includes the steps of receiving a power-on signal, determining whether or not an application, which is executed at the time of power-off before the power-on signal is received, corresponds to an image output application, if the application, which is executed at the time of power-off, corresponds to an image output application, loading and executing the image output application, loading and executing a first image control application for controlling an image outputted via the image output application, loading a second image control application, and if the loading is completed, terminating the first image control application and executing the second image control application.

To further achieve these and other advantages and in accordance with the purpose of the present invention, according to one embodiment, a method of processing an MVPD service in a digital device includes the step of storing data on a last input application in an EIM, identifying whether a mode corresponds to an MVPD mode in a TV service processing unit and delivering a result of the identification to an MVPD service processing unit, identifying an MVPD service type in the MVPD service processing unit, launching an MVPD application according to the identified MVPD service type in the MVPD service processing unit, and outputting the MVPD application to an input list when booting or rebooting is performed in a manner of registering an input at a list of an input hub together with other external input and providing an MVPD service on a screen.

To further achieve these and other advantages and in accordance with the purpose of the present invention, according to one embodiment, a digital device includes a user interface unit configured to receive an input signal from a user, a broadcast service module configured to receive a broadcast signal, a reception unit configured to receive an external input signal, a display module configured to display at least one or more applications, and a controller configured to control an operation of the digital device, the controller configured to receive a power-on signal, the controller configured to determine whether or not an application, which is executed at the time of power-off before the power-on signal is received, corresponds to an image output application, the controller, if the application, which is executed at the time of power-off, corresponds to an image output application, configured to load and execute the image output application, the controller configured to load and execute a first image control application for controlling an image outputted via the image output application, the controller configured to load a second image control application, the controller, if the loading is completed, configured to terminate the first image control application and execute the second image control application.

To further achieve these and other advantages and in accordance with the purpose of the present invention, according to one embodiment, a digital device processing an MVPD service includes an EIM processing unit configured to store data on a last input application, a TV service processing unit configured to identify whether a mode corresponds to an MVPD mode and deliver a result of the identification to an MVPD service processing unit, and an MVPD service processing unit configured to identify an MVPD service type, configured to launch an MVPD application according to the identified MVPD service type, and configured to output the MVPD application to an input list when booting or rebooting is performed in a manner of registering an input at a list of an input hub together with other external input and provide an MVPD service on a screen.

Technical solutions obtainable from the present invention are non-limited the above mentioned technical solutions. And, other unmentioned technical solutions can be clearly understood from the following description by those having ordinary skill in the technical field to which the present invention pertains.

Advantageous Effects

Advantageous effects of the present invention are described in the following.

According to one embodiment among various embodiments of the present invention, it is able to preferentially boot a first image control application providing a minimum image control function at the time a user turns on power of a device.

According to a different embodiment among various embodiments of the present invention, it is able to boot a second image control application providing various image control functions at a background while a minimum image control function is provided by a first image control application.

According to a further different embodiment among various embodiments of the present invention, it is able to perform resource management to make booting of the first image control application to be performed more quickly while a minimum image control function of the first image control application is provided.

According to a further different embodiment among various embodiments of the present invention, it is able to support and process an RF and/or an IP-based MVPD service in a digital device on which a web OS platform is mounted.

According to a further different embodiment among various embodiments of the present invention, it is able to provide the MVPD service in a form similar to external inputs such as a HDMI (high definition multimedia interface), a component and the like and provide accessibility and convenience to a user.

According to a further different embodiment among various embodiments of the present invention, it is able to provide and process a service of performance equal to or greater than performance of a legacy MVPD service or a hardware set-top box.

According to a further different embodiment among various embodiments of the present invention, it is able to seamlessly provide a service when booting and the like are performed in case of supporting a MVPD service on a web OS platform.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 34 is a diagram for explaining a process scheme or a function of EIM according to one embodiment of the present invention;

FIG. 41 is a diagram for a processing block of a main configuration for providing an IP-based MVPD service according to one embodiment of the present invention;

BEST MODE

Figure 1:
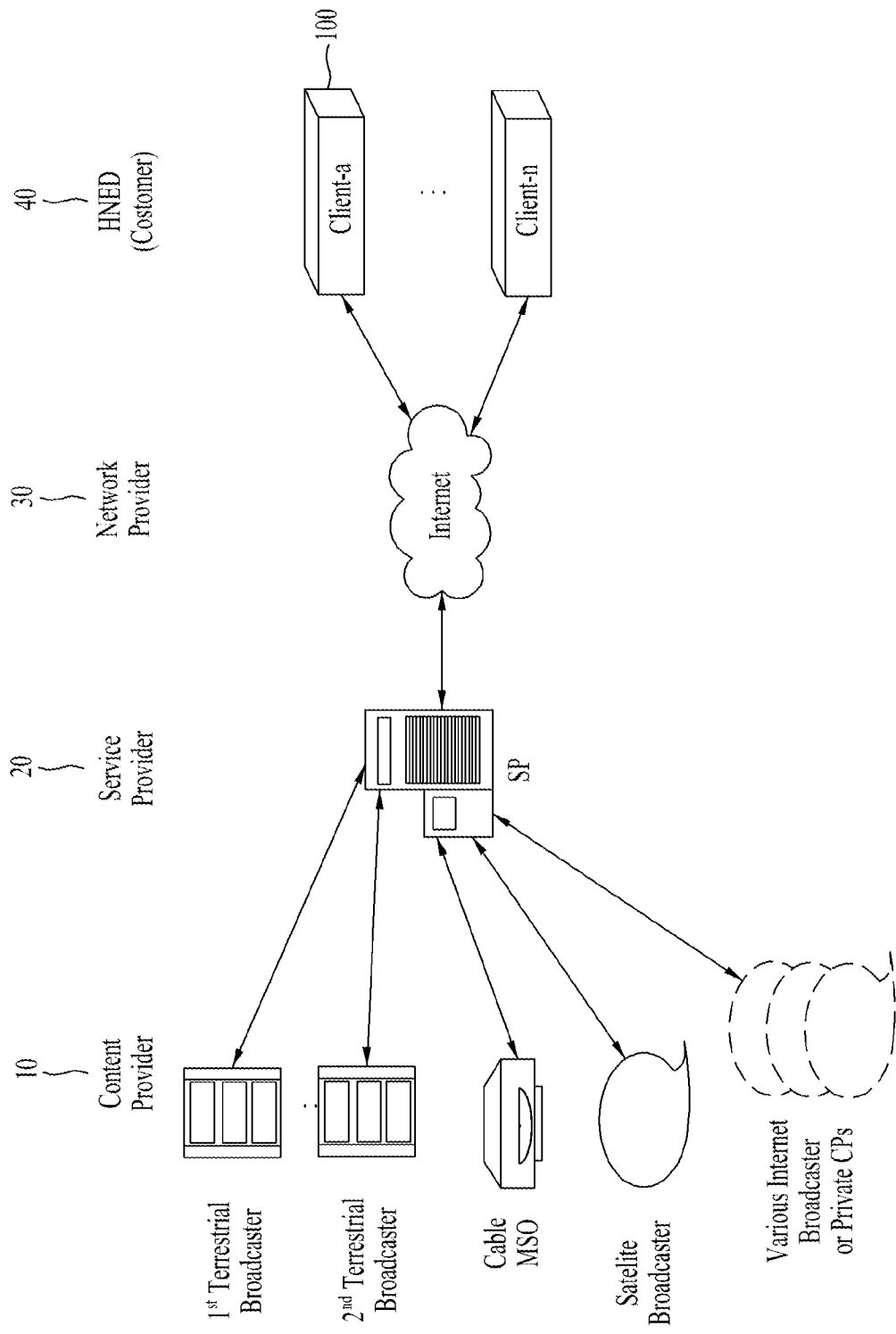
FIG. 1 is a schematic diagram for explanation of a service system including a digital device according to an embodiment of the present invention.

Description will now be given in detail according to exemplary embodiments disclosed herein, with reference to the accompanying drawings.

For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, contents specified in the present disclosure or drawings are an embodiment of the present invention, so a scope of the present invention must be determined through a claim set.

A digital device according to an embodiment of the present disclosure as set forth herein may be any device that can handle any one of transmitting, receiving, handling and outputting data, content, service, application, and so forth. The digital device may be connected to other digital devices through wired network or wireless network, paired or connected to an external server, and through the connections, the digital device may transmit and receive the prescribed data. Examples of the digital device may include standing devices such as a network television (TV), a Hybrid Broadcast Broadband TV (HBBTV), a smart TV, Internet Protocol TV (IPTV), and personal computer (PC), or mobile (or handheld) devices such as a Personal Digital Assistant (PDA), a smart phone, a tablet PC, or an Notebook computer. For convenience of description, in this disclosure, the Digital TV (DTV) is used in FIG. 2 and the mobile device is used in FIG. 3 depicting the digital device. Further, the digital device in this disclosure may be referred to configuration comprising only a panel, set-top box (STB), or a SET including the entire system.

Moreover, the wired/wireless network described in this disclosure may refer to various pairing methods, standard telecommunication network protocol methods which are supported for transmitting and receiving data between digital devices or between digital device and the external server. The wired or wireless network also includes various telecommunication network protocols supported now as well as in the future. Examples of the wired or wireless network include wired networks supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless networks supported by various standards including Bluetooth™, Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, the disclosure referring simply to the digital device can include a standing device or a mobile device depending on the context, and when it is not referred to a specific device, the digital device referred in this disclosure refers to both standing and mobile device.

Meanwhile, the digital device may perform intelligent functions such as receiving broadcasting program, operating computer functions, and supporting at least one external input, and by being connected through the network wired or wirelessly, the digital device may support e-mail functions, web browsing functions, banking, gaming, and executing applications. The digital device may further include an interface for any one of input or control means supporting a handwriting input, a touch-screen, and a spatial remote control.

Furthermore, the digital device may use a standard operating system (OS), however, the digital device described in this disclosure and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input mechanisms or digital devices, capable of transmitting and receiving data through wired or wireless network connected to and from the digital device. For example, the external input includes High Definition Multimedia Interface (HDMI), game devices such as Playstation or X-Box, smart phone, tablet PC, printing device such as pocket photo, digital devices such as smart TV and blue-ray device.

The "server" referred to as in this disclosure, includes a digital device or a system capable of transmitting and receiving data to and from a client, and may also be referred to as a processor. For example, the server may be servers providing services such as a portal server providing a web page, a web content or a web service, an advertising server providing advertising data, a content server, a Social Network Service (SNS) server providing a SNS service, a service server providing a service by a manufacturer, a Multichannel Video Programming Distributor (MVPD) providing a Video on Demand (VoD) or a streaming service, and a service server providing pay services.

When an application is described for the convenience of explanation, the meaning of disclosure in the context may include services as well as applications.

In the following description, various embodiments according to the present invention are explained with reference to attached drawings.

FIG. 1 illustrates a broadcast system including a digital device according to an embodiment of the present invention.

Referring to FIG. 1, examples of a broadcast system comprising a digital device may include a content provider (CP) 10, a service provider (SP) 20, a network provider (NP) 30, and a home network end user (HNED) (Customer) 40. The HNED 40 includes a client 100, that is, a digital device.

The CP 10 produces and provides content. Referring to FIG. 1, the CP 10 can include a terrestrial broadcaster, a cable system operator (SO) or multiple system operator (MSO), a satellite broadcaster, various Internet broadcasters, private content providers (CPs), etc. The CP 10 can provide various service or application web as well as broadcast content.

The SP 20 service-packetizes content produced by the CP 10. For example, the SP 20 packetizes at least one service among contents produced by a first terrestrial broadcaster, a second terrestrial broadcast, a cable MSO, a satellite broadcaster, various internet broadcasters, an application, etc. And, the SP 20 provides the packetized at least one service to the HNED 40.

The SP 20 can provide services to the client 100 in a uni-cast or multi-cast manner. The SP 20 can transmit data to a preregistered various clients 100 at once using an IGMP (Internet Group Management Protocol), etc.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100.

The client 100 is a consumer included in the HNED 40, construct a home network, receive data and transmit/receive data for various service or application like a VoD (video on demand), a streaming, and the like.

The CP 10 and/or SP 20 can use a content protection means or a conditional access for a content to be transmitted. In this case, the client 100 can use a means such as a cable card (CableCARD) (or a POD: Point of Deployment) or downloadable CAS (DCAS), which corresponds to the content protection means of the CP 10 and/or SP 20.

In addition, the client 100 can use an interactive service through a network. In this case, the client 100 can directly serve as the CP 10 and/or the SP 20 in a relationship with another client or indirectly function as a server of the other client.

In FIG. 1, the CP 10 and/or SP 20 may a server providing a service as below in this disclosure. In this case, if necessary, the server may include the NP 20. Although it is not described more specifically, the service or application can include not only service or application received from an external server also the service or application received from an internal memory. The service or application can include service or application data for the Client 100 based on a Web OS.

according to one embodiment, a method of controlling a digital device includes the steps of receiving a power-on signal, determining whether or not an application, which is executed at the time of power-off before the power-on signal is received, corresponds to an image output application, if the application, which is executed at the time of power-off, corresponds to an image output application, loading and executing the image output application, loading and executing a first image control application for controlling an image outputted via the image output application, loading a second image control application, and if the loading is completed, terminating the first image control application and executing the second image control application.

according to one embodiment, a method of processing an MVPD service in a digital device includes the step of storing data on a last input application in an EIM, identifying whether a mode corresponds to an MVPD mode in a TV service processing unit and delivering a result of the identification to an MVPD service processing unit, identifying an MVPD service type in the MVPD service processing unit, launching an MVPD application according to the identified MVPD service type in the MVPD service processing unit, and outputting the MVPD application to an input list when booting or rebooting is performed in a manner of registering an input at a list of an input hub together with other external input and providing an MVPD service on a screen.

Figure 2:
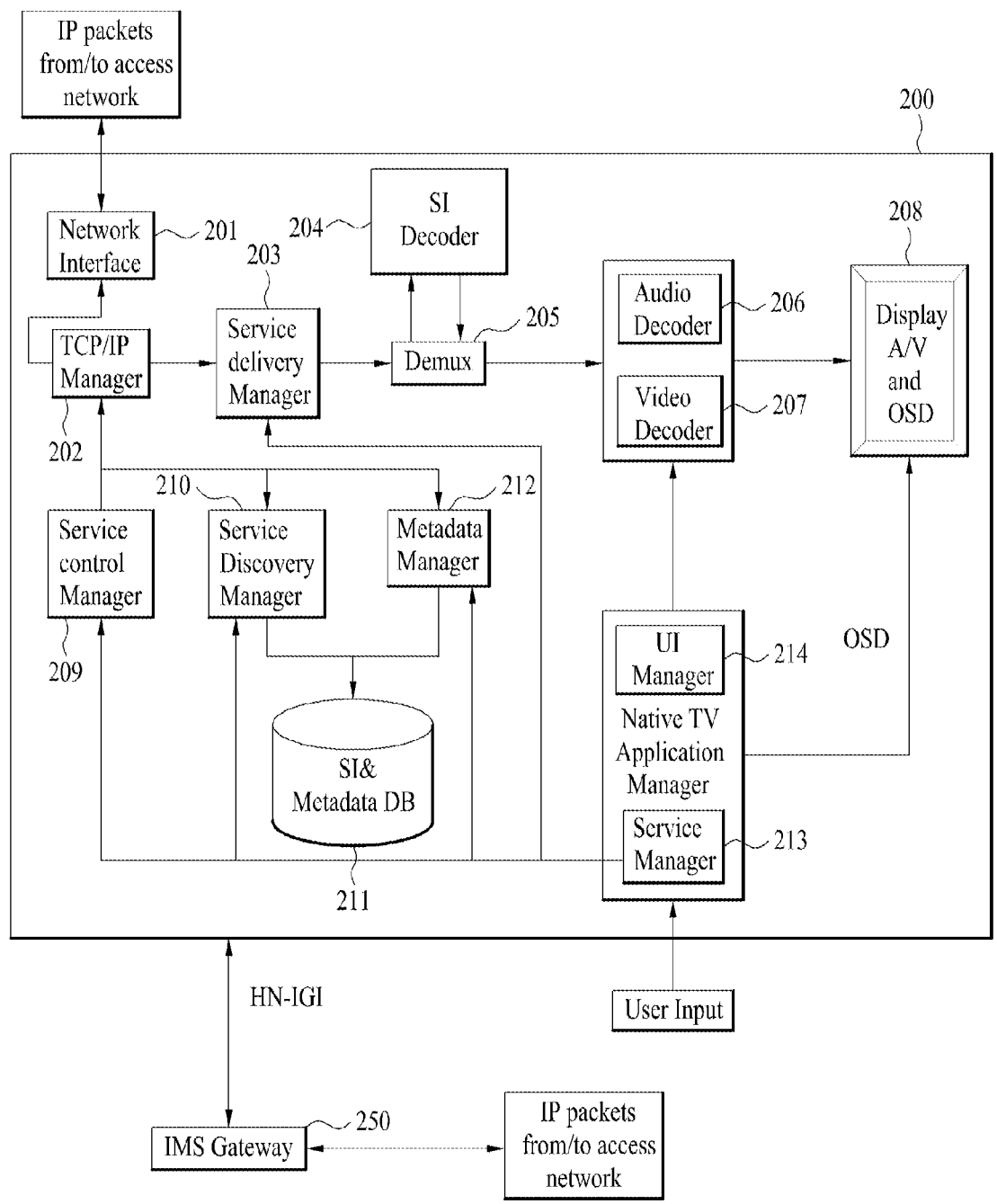
FIG. 2 is a block diagram for explanation of a digital device according to an embodiment of the present invention.
Figure 3:
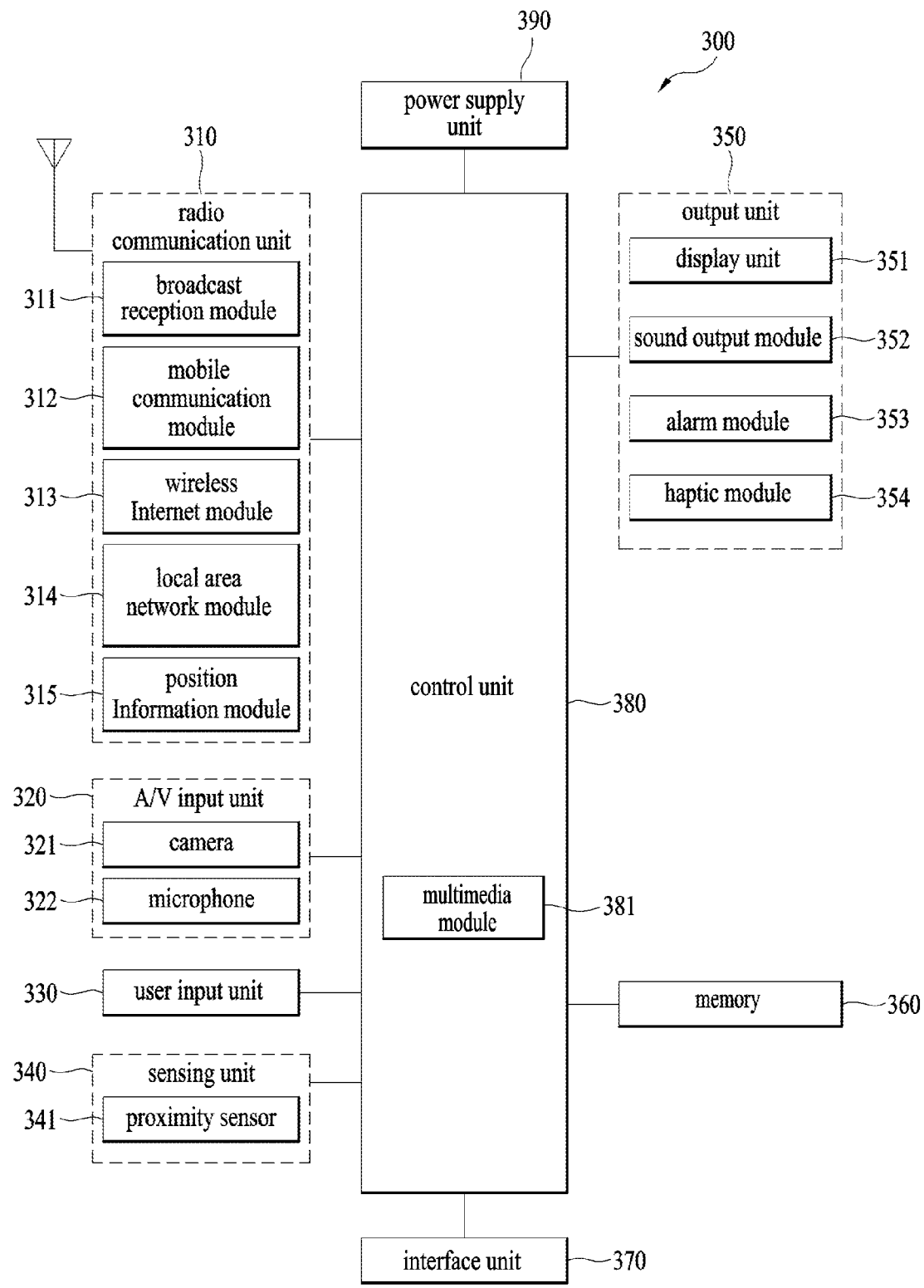
FIG. 3 is a block diagram for explanation of a digital device according to another embodiment of the present invention.

FIG. 2 is a schematic diagram of a digital device 200 according to an embodiment of the present invention.

Hereinafter, the digital device may correspond to the client 100 shown in FIG. 1.

The digital device 200 may include a network interface 201, a TCP/IP manager 202, a service delivery manager 203, an SI decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI (user interface) manager, etc.

The network interface 201 may receive or transmit internet protocol (IP) packets or IP datagrams (hereinafter, IP packet(s)) through an accessed network. As an example, the network interface 201 may receive service, application, content and the like from the service provider 20 of FIG. 1 via the network.

The TCP/IP manager 202 may involve delivery of IP packets transmitted to the digital device 200 and IP packets transmitted from the digital device 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212 and the like.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feedback network reception information to the server on the basis of the RTP.

The demultiplexer 205 may demultiplex audio data, video data, SI from a received packet and transmit the demultiplexed data to the audio/video decoder 206/207 and the SI decoder 204, respectively.

The SI decoder 204 may decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 may store the parsed and/or decoded SI data in the SI&metadata DB 211. The SI data stored in the SI&metadata DB 211 can be read or extracted and used by a component which requires the SI data.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a UI manager 214, perform a function of a controller of the digital device 200. In other words, the application manager may administrate the overall state of the digital device 200, provide a UI, and manage other mangers.

The UI manager 214 can provide a graphic user interface (GUI)/UI through OSD, receive a key input from the user and provide a graphical user interface (GUI) related to a receiver operation corresponding to the key input through OSD. For instance, the UI manager 214 transmits the key input signal to the service manager 213 if the key input related to a channel selection from the user.

The service manager 213 may control and manage service-related managers such as the service delivery manager 203, the service discovery manager 210, the service control manager 209, the metadata manager 212, and the like.

The service manager 213 may configure a channel map and enable channel control at the request of the user on the basis of the channel map. The service manager 213 may receive service information corresponding to channel from the SI decoder 204 and set audio/video PID of a selected channel to the demultiplexer 205 so as to control the demultiplexing procedure of the demultiplexer 205.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP or real time streaming protocol (RTSP) when the user selects a live broadcast service and using RTSP when the user selects a VOD service. The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like.

An IMS (IP Multimedia Subsystem) gateway 250 may include functions required to access an IMS based IPTV services.

FIG. 3 is a block diagram of a mobile terminal 300 in accordance with an embodiment of the present invention.

FIG. 2 specifies a standing device as an embodiment of the digital device, and FIG. 3 specifies a mobile terminal as another embodiment of the digital device.

With reference to FIG. 3, the mobile terminal 300 includes a wireless communication unit 310, an A/V (audio/video) input unit 320, a user input unit 330, a sensing unit 340, an output unit 350, a memory 360, an interface unit 370, a controller 380, a power supply unit 390, and the like.

Hereinafter, each element is specified as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) and an electronic service guide (ESG).

The broadcast receiving module 311 may be configured to receive broadcast signals transmitted from various types of broadcast systems. By non-limiting example, such broadcasting systems may include ATSC, DVB-T (Digital Video Broadcasting-Terrestrial), DVB-S(Satellite), media forward link only (MediaFLO™), integrated services digital broadcast-terrestrial (ISDB-T) and DTMB/CMMB. Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from at least one of a base station, an external terminal, or a server via a mobile network. Such wireless signals may carry audio, video, and data according to text/multimedia messages.

The wireless Internet module 313 includes wireless Internet access. This module may be internally or externally coupled to the mobile terminal 300. The wireless Internet technology can include WLAN (Wireless LAN) (Wi-Fi), Wibro™ (Wireless broadband), Wimax™ (World Interoperability for Microwave Access), HSDPA (High Speed Downlink Packet Access).

The short-range communication module 314 facilitates relatively short-range communications. Suitable technologies for implementing this module include Bluetooth™, radio frequency identification (RFID), infrared data association (IrDA), ultra-wideband (UWB), ZigBee™, RS-232, RS-485.

The position-location module 315 identifies or otherwise obtains the location of the mobile terminal 100. According to one embodiment, this module may be implemented with a global positioning system (GPS) module.

The audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed.

According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341 including a near field communication (NFC), and the like.

The output unit 350 generates an output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
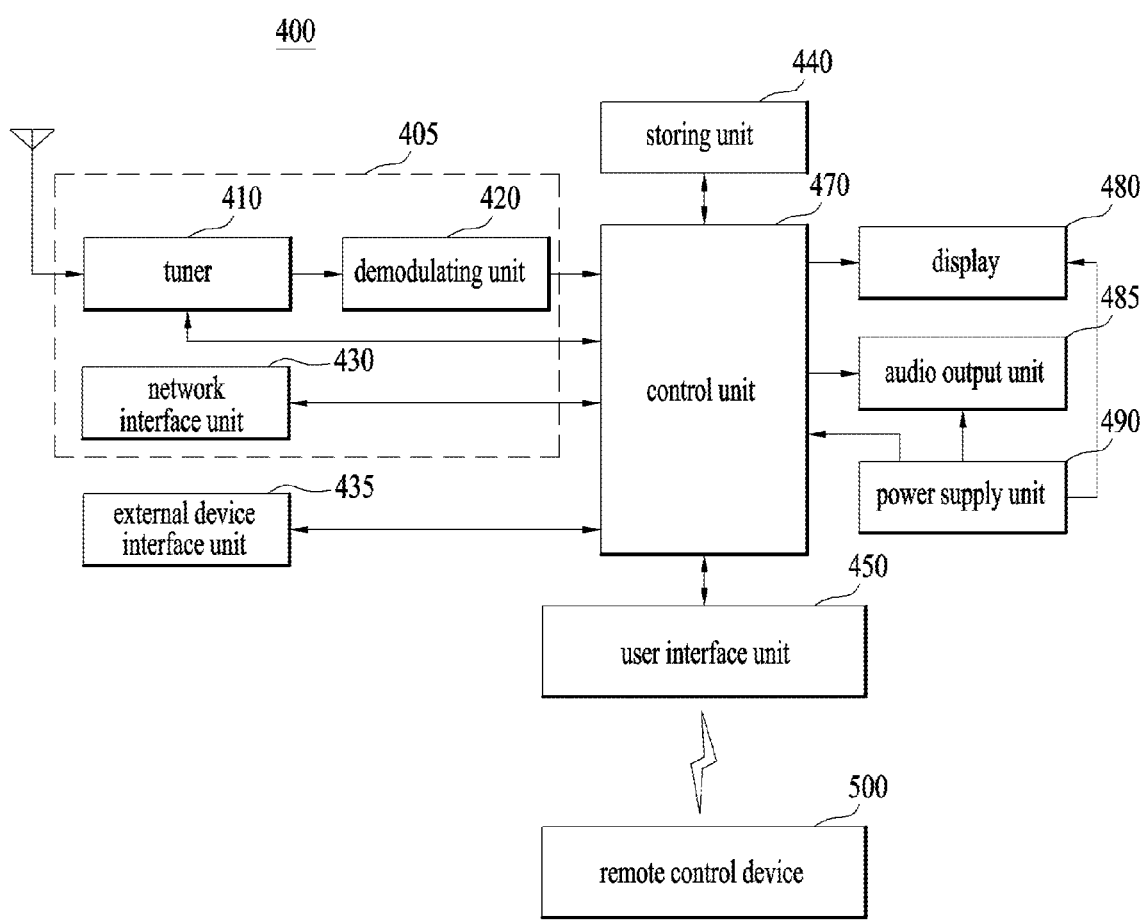
FIG. 4 is a block diagram for explanation of a digital device according to another embodiment of the present invention.

FIG. 4 illustrates a digital device according to another embodiment of the present invention.

Referring to FIG. 4, an exemplary digital device 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 410 can process both the digital broadcast signal and the analog broadcast signal. The analog baseband image or a voice signal output from the tuner 410 can be directly input to the controller 470.

The tuner 410 can receive a RF broadcast signal of single carrier or multiple carriers. The tuner 410 can sequentially tune and receive a RF broadcast signal of all broadcast channel stored by a channel memory function among RF broadcast signal received through an antenna to. And, the tuner 410 can convert the received RF broadcast signal into the DIF.

The demodulator 420 receives the DIF signal, demodulates the received DIF signal, and performs a channel decoding, etc. For this, the demodulator 420 includes a trellis decoder, a de-interleaver, a Reed-Solomon decoder, etc., or includes a convolution decoder, the de-interleaver, the Reed-Solomon decoder, etc.

The demodulator 420 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital device 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (including a notebook computer), a tablet PC, a smart phone, a Bluetooth device, a Cloud server and the like in a wired/wireless manner. The external device interface 435 transfer a signal to the controller 470 of the digital device. The signal includes image data, video data, audio data which is input through an external device. The external device is connected to the digital device. The controller 470 can control to output the signal including the processed image data, the processed video data and the processed audio data to the connected external device. For this, the external device interface 435 can further include an A/V input/output unit or a wireless communication unit (not shown).

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital device 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

Also, the external device interface 435 can connect a STB via at least one interface described above, and perform an input/output operation with the connected STB.

Meanwhile, the external device interface 435 can receive application or application list included in a nearby external device, and can transfer the application or the application list to the controller 470 or the storage unit 440.

The network interface 430 may provide an interface for connecting the digital device 400 with a wired/wireless network including an internet network. The network interface 430 can equip, for example, an Ethernet terminal to connect with a wired network and use a communication standard like wireless LAN (WLAN) (Wi-Fi), Wibro, Wimax, and HSDPA to connect with a wireless network.

The network interface 430 can transmit/receive data to/from other users or other electronic apparatuses or access a network connected thereto or another network linked to the connected network. Especially, the network interface 430 can transmit some content data stored in the digital device to another user pre-registered in the digital device 400, a user using another digital device or a selected digital device.

Meanwhile, the network interface 430 can access a web page through a connected network or another network linked to the connected network. That is, the network interface 430 can transmit/receive data to/from a corresponding server by accessing the web page through the network. Besides, the network interface 430 can receive content or data provided from a content provider or a network provider. That is, the network interface 430 can receive the content like a movie, an advertisement, a game, a VoD, a broadcast signal and related information provided from the content provider or network provider. And, the network interface 430 can receive firmware update information and an update file provided from the network provider. Also, the network interface 430 can transmit data to internet, content provider or network provider.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430.

The storage unit 440 may store various platforms which will be described later.

The storage unit 440 can include storage media of one or more types, such as a flash memory type, a hard disk type, a multimedia card micro type, a card type memory (e.g. SD or XD memory), RAM, EEPROM, etc. The digital device 400 may reproduce content files (e.g., a video file, a still image file, a music file, a text file, an application file, etc.) and provide them to the user.

While FIG. 4 illustrates an embodiment in which the storage unit 440 is separated from the controller 470, the configuration of the digital device 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 480 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital device 300. For example, the controller 470 can control the tuner 410 to tune to an RF broadcast corresponding to a channel selected by the user or a previously stored channel.

The controller 470 can control the digital device 400 according to a user command input through the user input interface 450 or an internal program. Particularly, the controller 470 can control the digital device 400 to be linked to a network to download an application or application list that the user desires to the digital device 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital device 400, received broadcast content, or content input from an external device. The content may include at least one of a broadcast image, an external input image, an audio file, a still image, an image of a linked web, and a text file.

The controller 470 can control display of applications or an application list, downloadable from the digital device 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital device 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals.

The display unit 480 may be a PDP, an LCD, an OLED, a flexible display, a 3D display or the like.

The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital device 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450.

The digital device 400 may further include the photographing unit (not shown) for photographing the user.

Image information acquired by the photographing unit (not shown) can be supplied to the controller 470. The controller 470 may sense a gesture of the user from an image captured by the photographing unit (not shown) or a signal sensed by the sensing unit (not shown), or by combining the image and the signal.

The power supply unit 490 may supply power to the digital device 400.

Particularly, the power supply unit 490 can supply power to the controller 470 which can be implemented as a system-on-chip (SoC), the display unit 480 for displaying images, and the audio output unit 485 for audio output.

For this, the power supply unit 490 can include a converter (not shown) converting a direct current to an alternative current. And, for example, if the display 480 is implemented as a crystal panel including a plurality of backlight lamps, the power supply unit can include an inverter (not shown) capable of performing a PWM (Pulse Width Modulation) operation to perform a changeable luminance or a dimming operation.

The remote controller 500 may transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The digital devices shown in FIGS. 2 through 4 are a digital broadcast receiver which is capable of processing an ATSC or DVB digital broadcast signal for standing or mobile Some of the components shown in FIG. 2 may be omitted or a component (not shown in FIG. 2) may be added as required. The digital device according to the present invention may not include the tuner and the demodulator, differently from the digital devices shown in FIGS. 2 and 4, and may receive content through the network interface or the external device interface and reproduce the content.

Figure 5:
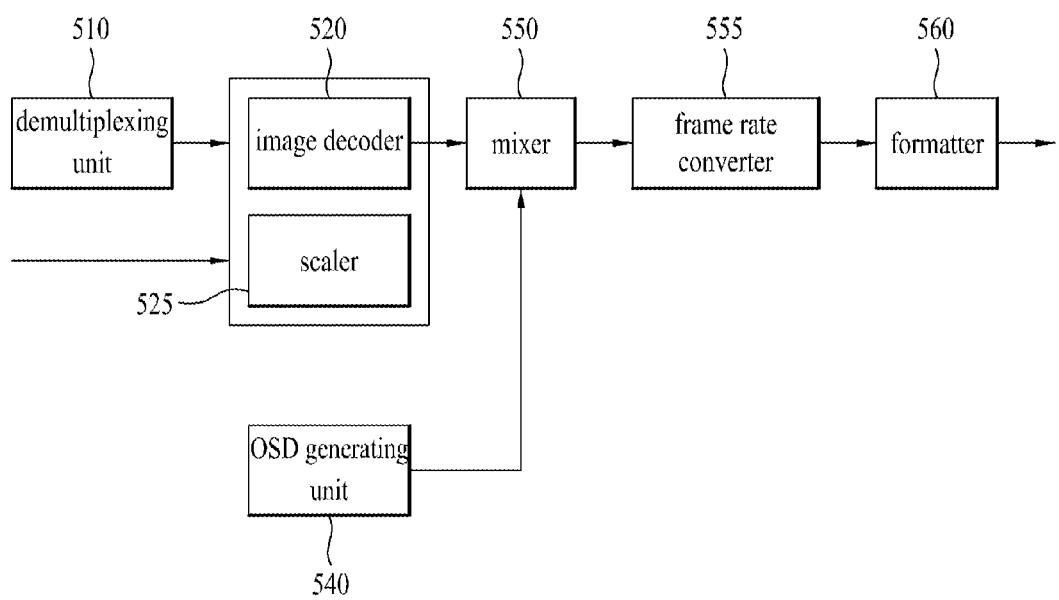
FIG. 5 is a block diagram for explanation of detailed configurations of a controller of FIGS. 2 to 4 according to an embodiment of the present invention.

FIG. 5 is a block diagram for explanation of detailed configurations of a controller of FIGS. 2 to 4 according to an embodiment of the present invention.

An example of the controller may include a demultiplexer 510, an image processor 520, an OSD generator 540, a mixer 550, a frame rate converter (FRC) 555, and a 3D formatter (or an Output formatter) 560. The controller further includes a voice processing unit (not shown) and a data processing unit (not shown).

The demultiplexer 510 can demultiplex an input stream signal into an MPEG-2 TS image, an audio signal and a data signal, for example. Here, the stream signal inputted to the demultiplexer 510 is a stream signal output from a tuner, a demodulator or an external device interface.

The image processor 520 can process a demultiplexed image signal. For this, the image processor 520 includes a video decoder 525 and a scaler 535.

The video decoder 525 can decode the demultiplexed image signal and the scaler 535 can scale the resolution of the decoded image signal such that the image signal can be displayed.

The video decoder 525 can support various Standard. For instance, the video decoder 525 performs a function of MPEG-2 decoder if a video signal is coded with a MPEG-2 standard. And, the video decoder 525 performs a function of H.264/H.265 decoder if a video signal is coded with a DMB (Digital Multimedia Broadcasting) method or H.264/H.265 standard.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital device, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (B SAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

The digital device is exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital device is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 6:
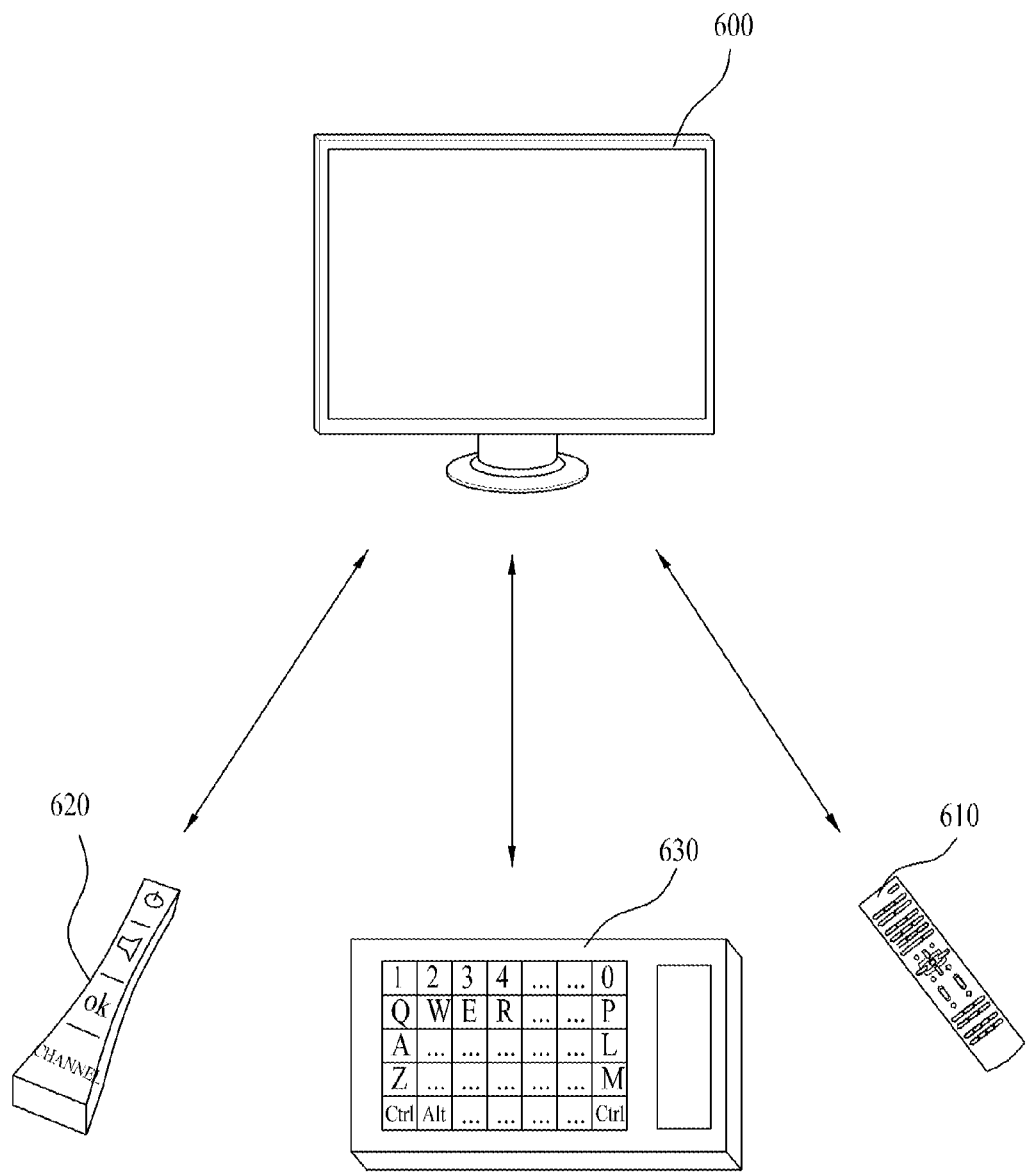
FIG. 6 is a diagram illustrating an inputter connected to the digital device of FIGS. 2 to 4 according to an embodiment of the present invention.

FIG. 6 illustrates remote controllers of a digital device according to an embodiment of the present invention.

To control the digital device, a front panel (not shown) equipped to the digital device 600 or control means (input means) is used.

Moreover, the control means is a user interface device (UID) capable of communicating with a wire/wireless communication, and includes a remote controller 610, a keyboard 630, a pointing device 620, a touch-pad for controlling the digital device 600. Further the control means includes a control mean dedicated to an external input which is connected to the digital device 600. Besides, the control means includes a mobile device like a smart phone and a tablet PC controlling the digital device 600 by switching a mode. Hereinafter, the present disclosure can specify the pointing device as an embodiment of the present invention.

The remote controllers can use various communication protocols such as Bluetooth, RFID, IrDA, UWB, ZigBee, DLNA, etc.

The remote controller 610 is a general input means including a various and necessary key buttons for controlling the digital device 600.

The pointing device 620 may include a gyro sensor mounted therein to sense vibration of a user's hand or rotation. That is, the pointing device 620 can move a pointer according to up, down, left and right motions of the user. The pointing device 620 is named to a magic remoter controller, a magic controller or the like.

The keyboard 630 UIDs can include a mobile device (e.g., a smart phone, a tablet PC, and the like), a magic remote controller 620 and a remote controller 630 equipped with a keyboard and a touch pad in addition to a general remote controller 610.

The remote controller 630 including the keyboard and touch pad can facilitate text input through the keyboard and control of movement of a pointer and magnification and reduction of a picture or video through the touch pad.

The digital device described in the present specification can be operated by based on Web OS platform. Hereinafter, a Web OS based process or algorithm may be performed by the controller of the above-described digital device. The controller includes the controllers of FIGS. 2 to 5 and has wide concepts. Accordingly, hereinafter, a component for processing Web OS based services, applications, content, etc., including software, firmware or hardware in a digital device is referred to a controller.

Such a Web OS based platform may improve development independency and functional extensibility by integrating services, applications, etc. based on a Luna-service bus, for example, and increase application development productivity based on web application framework. In addition, system resources, etc. may be efficiently used via a Web OS process and resource management to support multitasking.

A Web OS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
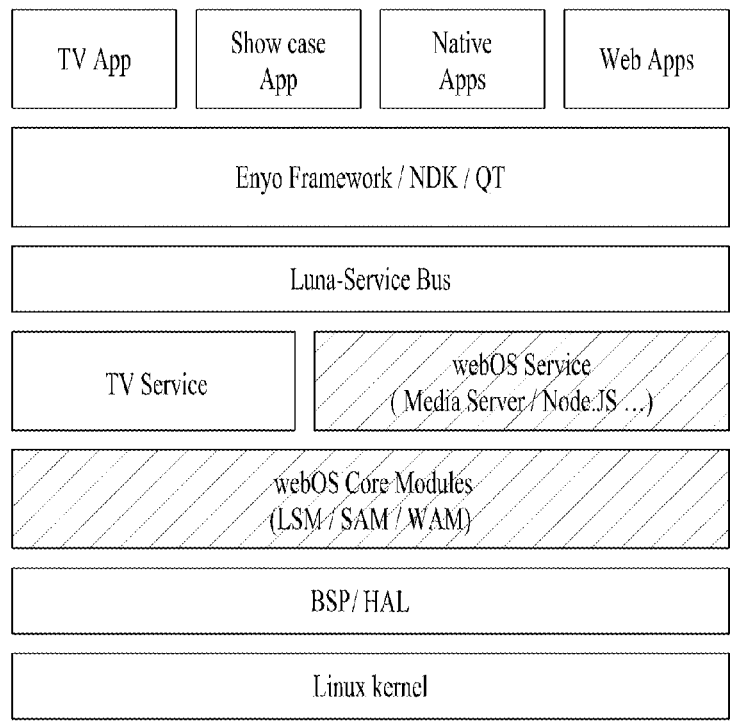
FIG. 7 is a diagram for explanation of a web OS architecture according to an embodiment of the present invention.

FIG. 7 is a diagram illustrating Web OS architecture according to one embodiment of the present invention.

The architecture of a Web OS platform will now be described with reference to FIG. 7.

The platform may be largely divided into a kernel, a Web OS core platform based on a system library, an application, a service, etc.

The architecture of the Web OS platform has a layered structure. OS is provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided.

One or more layers of the above-described Web OS layered structure may be omitted and a plurality of layers may be combined to one layer and one layer may be divided into a plurality of layers.

The Web OS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application may use a service via a Luna-service bus. A service may be newly registered via a bus and the application may detect and use a desired service.

The service layer may include services having various service levels, such as a TV service, a Web OS service, etc. The Web OS service may include a media server, Node.JS, etc. and, in particular, the Node.JS service supports JavaScript, for example.

The Web OS service may be communicated to a Linux process implementing function logic via a bus. This Web OS service is largely divided into four parts, migrates from a TV process and an existing TV to a Web OS, is developed as services which differ between manufacturers, Web OS common services and Javascripts, and is composed of the Node.JS service used via Node.JS.

The application layer may include all applications supportable by a digital device, such as a TV application, a showcase application, a native application, a web application, etc.

Applications on the Web OS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CS S) and Javascripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a native application based on Qt and includes basic applications provided along with the Web OS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
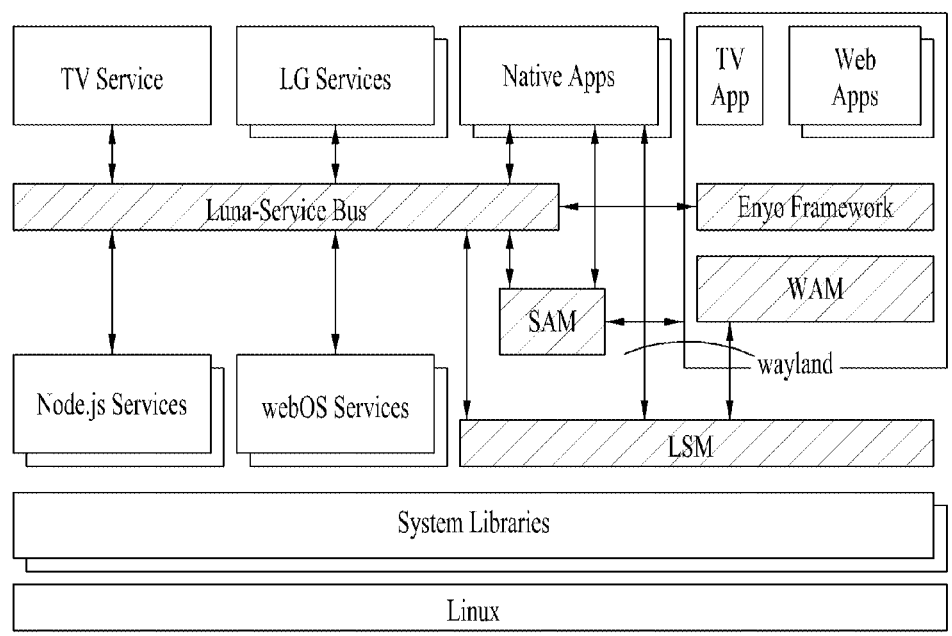
FIG. 8 is a diagram for explanation of an architecture of a web OS device according to an embodiment of the present invention.

FIG. 8 is a diagram illustrating the architecture of a Web OS device according to one embodiment of the present invention.

FIG. 8 is a block diagram based on a runtime of a Web OS device and is described with reference to the layered structure of FIG. 7.

Hereinafter, a description will be given with reference to FIGS. 7 and 8.

Referring to FIG. 8, services, applications and Web OS core modules are included on a system OS (Linux) and system libraries and communication therebetween may be performed via a Luna-service bus.

Node.JS services based on HTML5 such as e-mail, contact or calendar, CSS, Javascript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on model view controller (MVC) and easily develop code for processing user input. An interface between the QML and the Web OS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, Recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
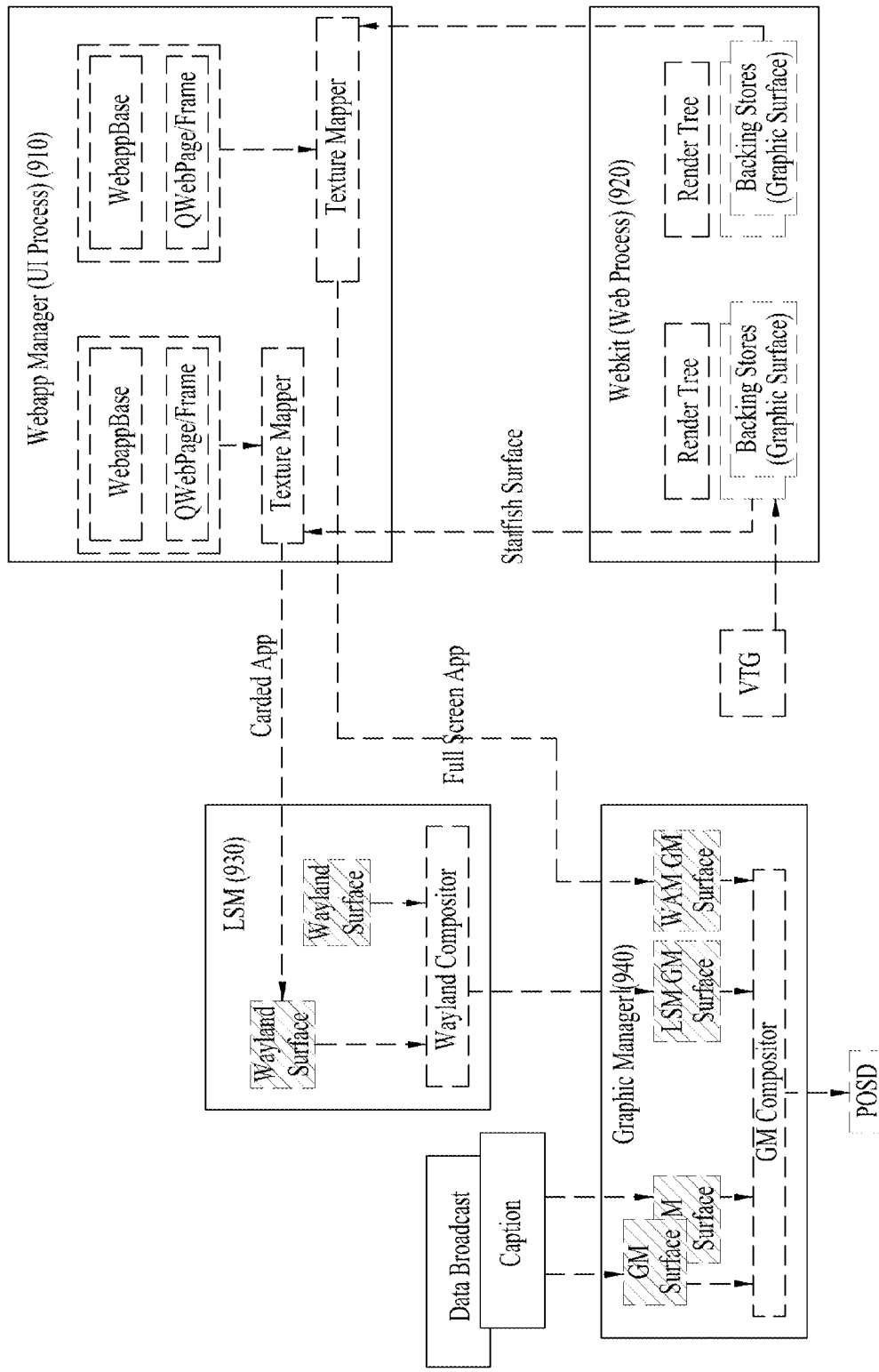
FIG. 9 is a diagram for explanation of a graphic composition flow in a web OS device according to an embodiment of the present invention.

FIG. 9 is a diagram illustrating a graphic composition flow in a Web OS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a full-screen application. The web application manager 910 receives an application generated by the WebKit 920 in order to share a graphic processing unit (GPU) memory for graphic management between the UI process and the web process and delivers the application to the LSM 930 if the application is not a full-screen application. If the application is a full-screen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The full-screen application is directly delivered to the graphics manager 940 without passing through the LSM 930 as described above and is processed in the graphics manager compositor via the WAM GM surface.

The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
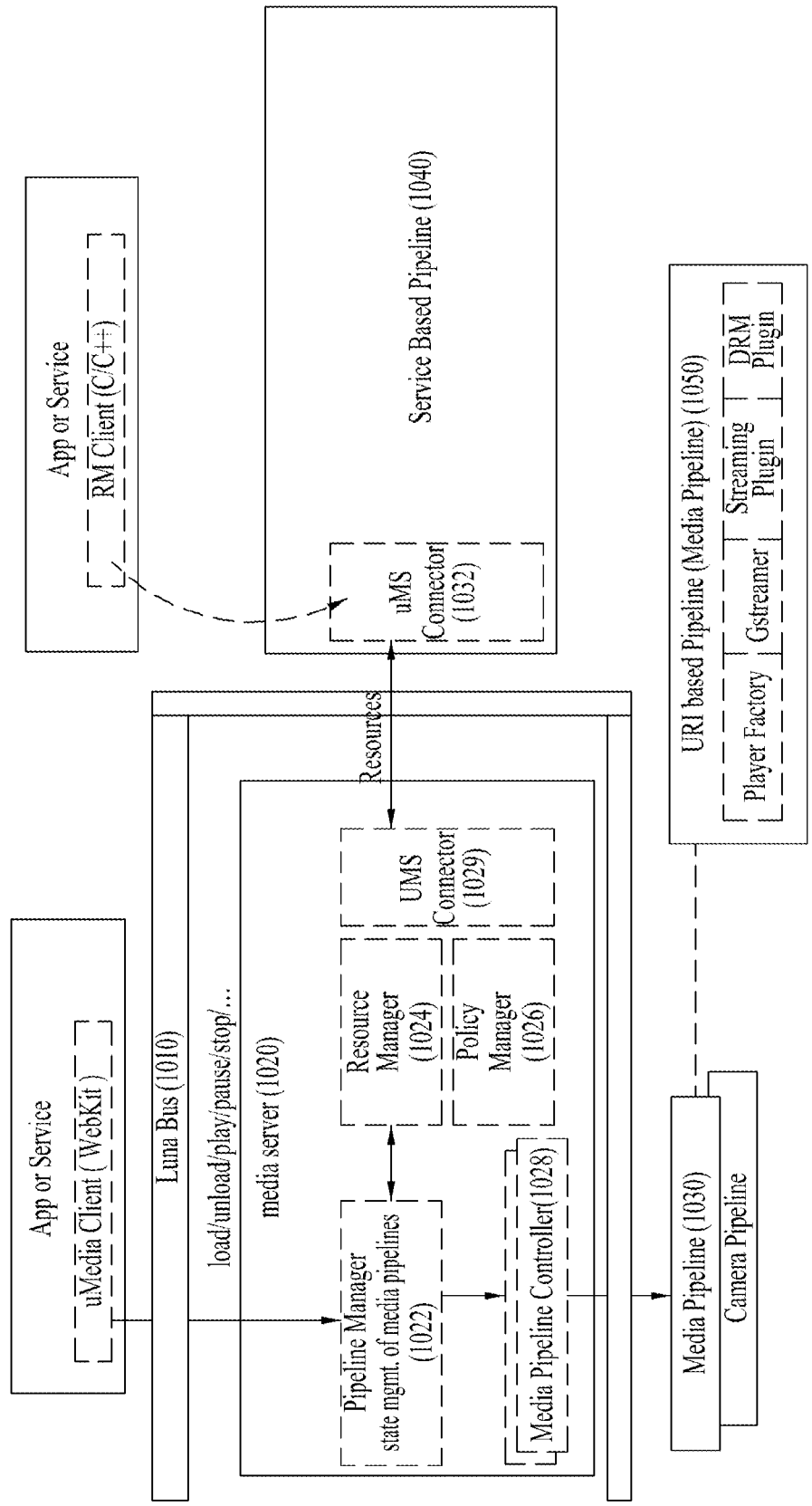
FIG. 10 is a diagram for explanation of a media server according to an embodiment of the present invention.
Figure 11:
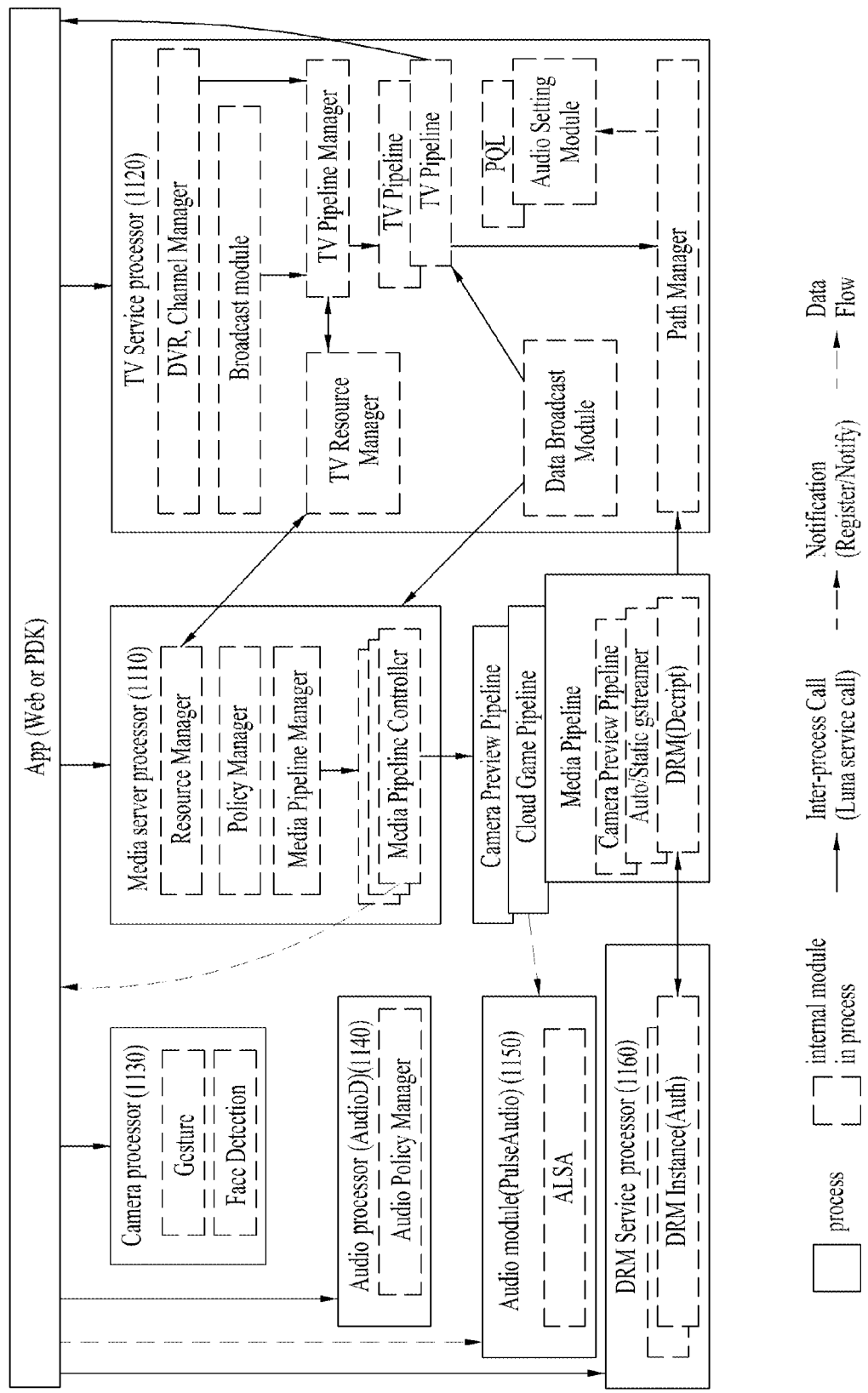
FIG. 11 is a diagram for explanation of a block diagram of a media server according to an embodiment of the present invention.
Figure 12:
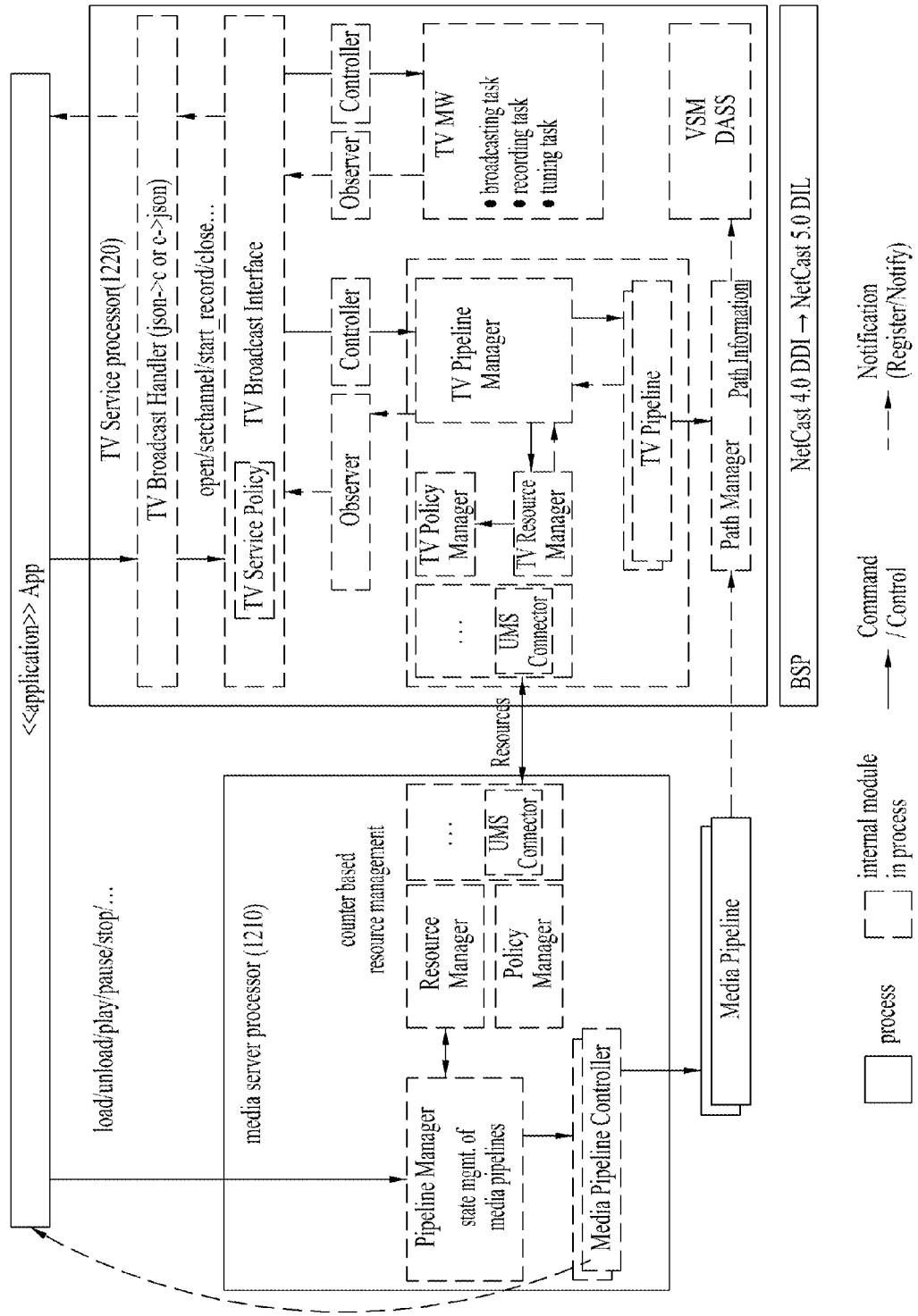
FIG. 12 is a diagram for explanation of a relationship between a media server and a TV service according to an embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (e.g., Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smarthshare playback, thumbnail extraction, NDK, cinema, multimedia and hypermedia information coding experts group (MHEG), etc.

The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used.

Alternatively, a method of using in existing CP may be used. For backward compatibility, plug-in of an existing platform may be extended and used based on Luna.

Lastly, an interface method using a non-Web OS may be used. In this case, a Luna bus may be directly called to perform interfacing.

Seamless change is processed by a separate module (e.g., TVwin) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (M/W), a path manager and a BSP (NetCast). The service processor may mean a module including a TV pipeline manager, a TV resource manager, a TV policy manager, a USM connector, etc., for example.

In the present disclosure, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (j son) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted. In the present specification, the resource manager in the media server processor 1110/1210 may perform resource management to a counter base, for example.

In the disclosure, the resource manager included in the media server processor 1110/1210, for instance, can manage the resource using a counter base.

In the following, various embodiments for a digital device according to the present invention are explained in more detail with reference to the attached drawing.

Figure 13:
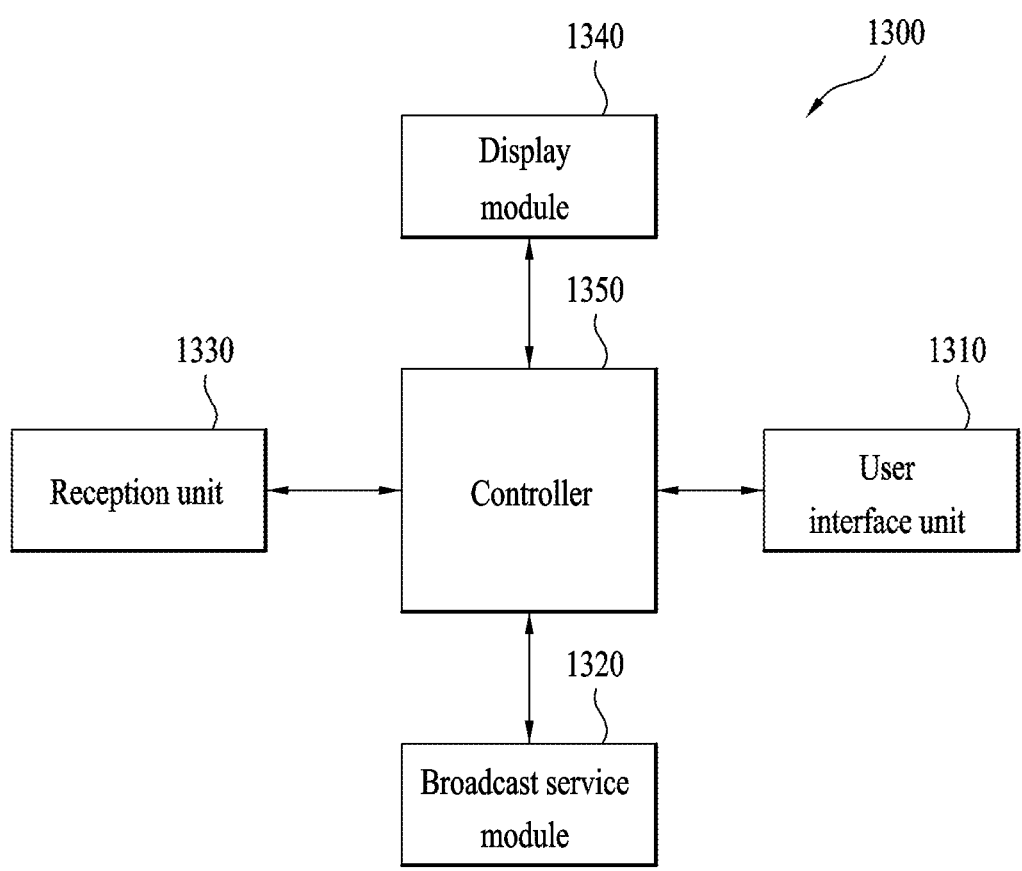
FIG. 13 is a block diagram for a configuration module of a digital device according to one embodiment of the present invention.

FIG. 13 is a block diagram for a configuration module of a digital device according to one embodiment of the present invention. A part of modules of a digital device shown in FIG. 13 can be added or changed with reference to FIGS. 1 to 12. The scope of the present invention is not determined by elements written on FIGS. 1 to 13 but interpreted by items written on the claims of the present invention in principle. As shown in FIG. 13, a digital device according to a different embodiment of the present invention includes a user interface unit 1310, a broadcast service module 1320, a reception unit 1330, a display module 1340, and a controller 1350.

The user interface unit 1310 can receive an input of a specific signal from a user. The user interface unit 1310 can generate a window for providing information on a currently displayed image such as channel information, volume information and the like to a user and a graphic user interface for transmitting and receiving a control signal. The user interface unit 1310 can receive a specific signal input via a touch panel connected with the display module 1340 of the digital device 1300 and receive a specific signal using an IR (infrared ray) signal received from a sensor module (not depicted).

The broadcast service module 1320 receives a broadcast signal including broadcast program data from a broadcast station or a CP (content provider) and may be able to process the received broadcast signal. The broadcast service module 1320 can include a tuner, a de-multiplexing unit, an image decoder, a scaler, a mixer, a frame rate converter, a formatter, and the like. The broadcast service module 1320 receives a broadcast signal, decodes the received broadcast signal, and may be able to transmit broadcasting time information included in the broadcast signal to the controller 1350.

The reception unit 1330 can receive an external input signal inputted via an external input means. The reception unit 1330 can receive and process a control signal which is transmitted by a user using a remote controller, a remote control application of a smartphone or the like.

The display module 1340 processes at least one or more image content data received by a digital device according to one embodiment of the present invention and may be then able to display the data on a screen. The at least one or more image content data may include a real-time broadcast program received via the broadcast service module 1320 or an external input image content inputted via HDMI (high definition multimedia interface).

The controller 1350 performs a function of generally managing functions of at least one or more modules shown in FIG. 13 including the user interface unit 1310, the broadcast service module 1320, the reception unit 1330, and the display module 1340. Regarding this, it shall be described in more detail in the following with reference to FIGS. 14 to 24.

Figure 14:
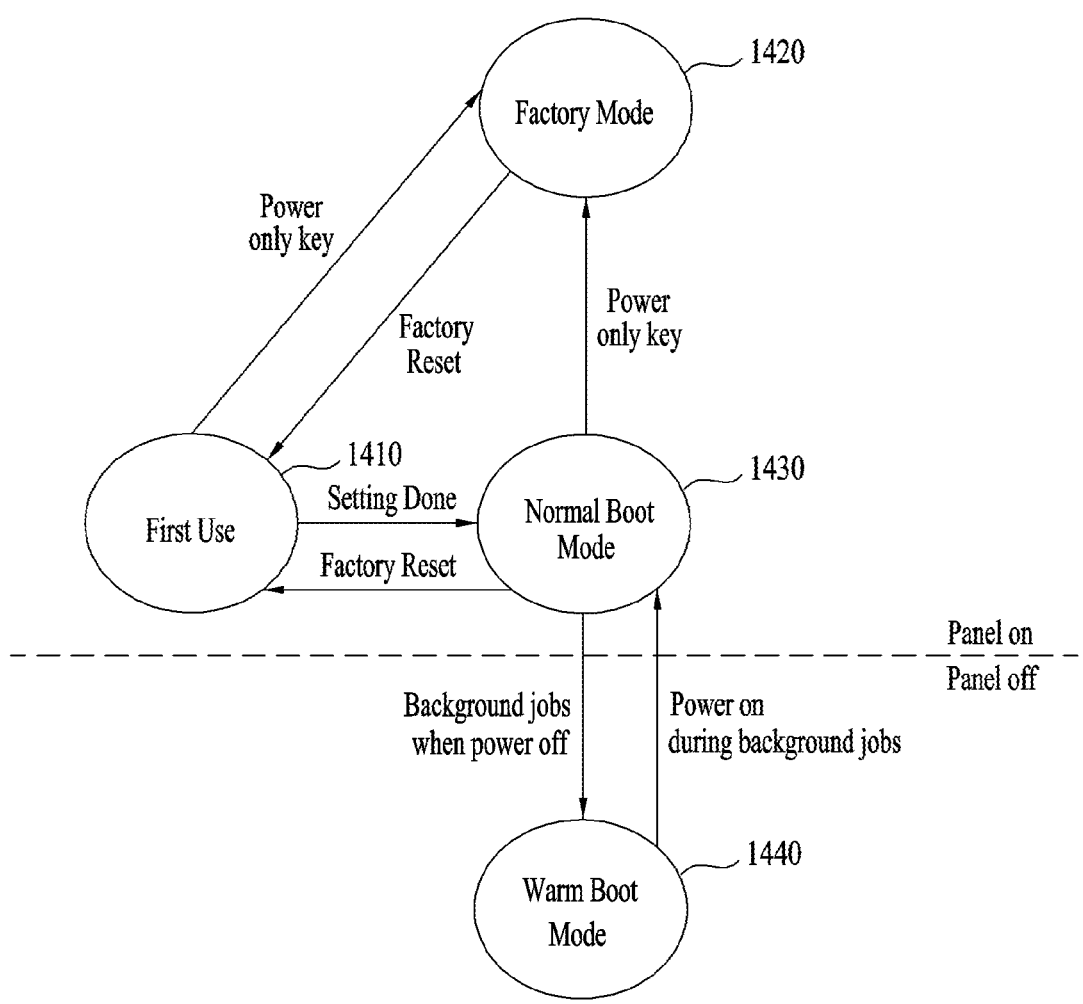
FIG. 14 is a diagram for explaining a booting mode of a digital device according to one embodiment of the present invention.

FIG. 14 is a diagram for explaining a booting mode of a digital device according to one embodiment of the present invention.

As shown in FIG. 14, a digital device according to one embodiment of the present invention can implement a plurality of booting modes. A plurality of the booting modes can include a first use mode 1410, a factory mode 1420, a normal booting mode 1430, and a warm booting mode 1440. The first use mode 1410 may correspond to a booting process or a booting mode which is performed when a power-on signal is firstly received after a factory reset process is performed. If booting of the digital device is performed in the first use mode 1410 and a user completes a first use setting, the digital device can perform a booting process in the normal booting mode 1430 when a power-on signal is received. And, if booting of the digital device is performed in the first use mode 1410, it may be able to execute a predetermined first use application. The factory mode 1420 may correspond to a booting process or a booting mode which is performed when the digital device receives a power only key signal. If a booting process is performed in the factory mode 1420, the digital device can execute at least one of a most recently executed application prior to power-off or a TV service application. If a user performs a factory reset on the digital device and the digital device receives a power-on signal thereafter, a booting process can be performed in the first use mode 1410. The normal booting mode 1430 may correspond to a booting process or a booting mode performed by the digital device after a user sets a configuration value after the booting process is performed in the first use mode 1410. And, if a power-on signal is received in a state of the warm booting mode 1440, the normal booting mode 1430 can be performed. When the digital device performs a booting process in the normal booting mode 1430, at least one selected from the group consisting of a most recently executed application, a timer setting application, and a TV service application. The warm booting mode 1440 may correspond to a booting process or a booting mode for entering a warm standby state. Hence, if the digital device performs the warm booting mode 1440, it may enter the warm standby state. If the digital device receives a power-on signal from a user, it may be able to perform fast booting by quickly entering the normal booting mode 1430.

Figure 15:
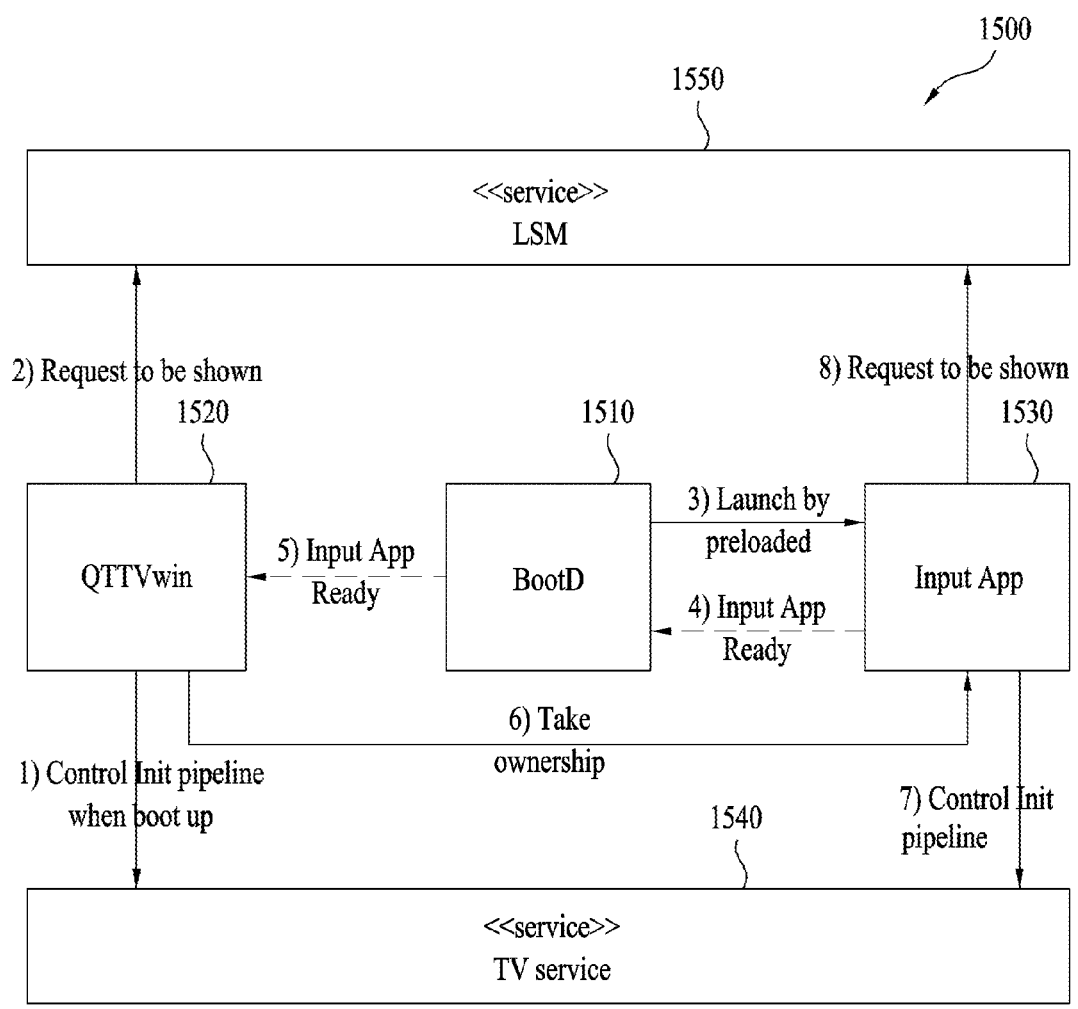
FIG. 15 is a diagram for explaining an example for a digital device to execute a first image control application and a second image control application according to one embodiment of the present invention.

FIG. 15 is a diagram for explaining an example for a digital device to execute a first image control application and a second image control application according to one embodiment of the present invention.

A controller 1510 of a digital device according to one embodiment of the present invention receives a power-on signal and determines whether or not an application, which was executed at the time of power-off before the power-on signal is received, corresponds to an image output application. If the application executed at the time of power-off corresponds to the image output application, the controller executes the image output application by loading the image output application, executes a first image control application 1520 by loading the first image control application to control an image outputted via the image output application, and loads a second image control application 1530. If the loading of the second image control application is completed, the controller can control the first image control application 1520 to be terminated and control the second image control application 1530 to be executed.

The power-on signal corresponds to an IR (infrared ray) signal inputted from an external input means and the external input means may correspond to a remote controller.

The image output application can include a first image output application configured to output a real-time broadcasting program received via a tuner and a second image output application configured to output an external input image inputted via an external device interface. If the image output application corresponds to the first image output application, the first image control application 1520 can provide a user with a channel changing function and a volume adjusting function of a real-time broadcasting program. If the image output application corresponds to the second image output application, the first image control application 1520 can provide a user with a volume adjusting function and an external input type changing function of an external input image. The external input type can include HDMI, Composite, DVD (digital video disc), and Component.

The second image control application 1530 can be generated using a web language including Java script, HTML (Hypertext Markup Language), and CSS (Cascading Style Sheets).

The second image control application 1530 can provide a user with a control function provided by the first image control application 1520, a reservation recording function, an ERG output function, and a content information output function.

If the application executed at the time of power-off is not an image output application, the controller 1510 executes an image output application by loading the image output application, executes a first image control application 1520 by loading the first image control application to control an image outputted via the image output application, and loads the application which is executed at the time of power-off. If the loading of the application is completed, the controller can control a message for receiving an output request of the application, which was executed at the time of power-off, to be displayed on a screen.

As shown in FIG. 15, if a power-on signal is received in a power-off state, the controller 1510 of the digital device according to one embodiment of the present invention can determine whether or not an image output application is included in a list of applications which are executed before the power-off. As a result of the determination, if an image output application is included in the list of the applications which are executed before the power-off, the controller 1510 can execute an image output application corresponding to a lastly executed image output application among image output applications included in the list. And, as a result of the determination, if an image output application is not included in the list of the applications which are executed before the power-off, the controller 1510 can control an image output application configured to output a predetermined real-time broadcasting program to be executed. And, the controller 1510 preferentially executes a first image control application 1520 when at least one or more image contents are displayed by preferentially executing an image output application. The first image control application 1520 can provide a user with a minimum image control function such as channel change, volume change, and the like necessary for the user. Hence, time taken for loading and executing the first image control application 1520 is short and an amount of resources required for the first image control application is less. After the first image control application 1520 is executed, the controller 1510 can load a second image control application 1530 configured to provide a user with more functions compared to the function of the first image control application 1520 at a background. Since the second image control application 1530 is able to provide various image control functions including a reservation recording function, an ERG output function, a content information output function and the like in addition to the control function provided by the first image control application 1520, time taken for loading and executing the second image control application is longer and an amount of resources required for the second image control application is larger compared to the first image control application 1520. And, if loading of the second image control application 1530 is completed, the controller 1510 can terminate the first image control application 1520 and may be able to execute the second image control application 1530. In case of the first image control application 1520, it may take about 4 seconds for loading and executing the first image control application 1520. In case of the second image control application 1530, it may take about 20 seconds for loading and executing the second image control application 1530. An image control application switching process that the first image control application 1520 is terminated and the second image control application is executed can be designed in a manner that a user is unable to recognize the image control application switching process. Yet, the user is able to recognize that the user is unable to use an image control function provided by the second image control application 1530 before the second image control application 1530 is executed.

As shown in FIG. 15, if such a minimum control function as channel change and volume change required by a user is preferentially provided and an additional image control function is provided while the user is watching image contents without recognizing the function, it is able to increase user convenience.

Figure 16:
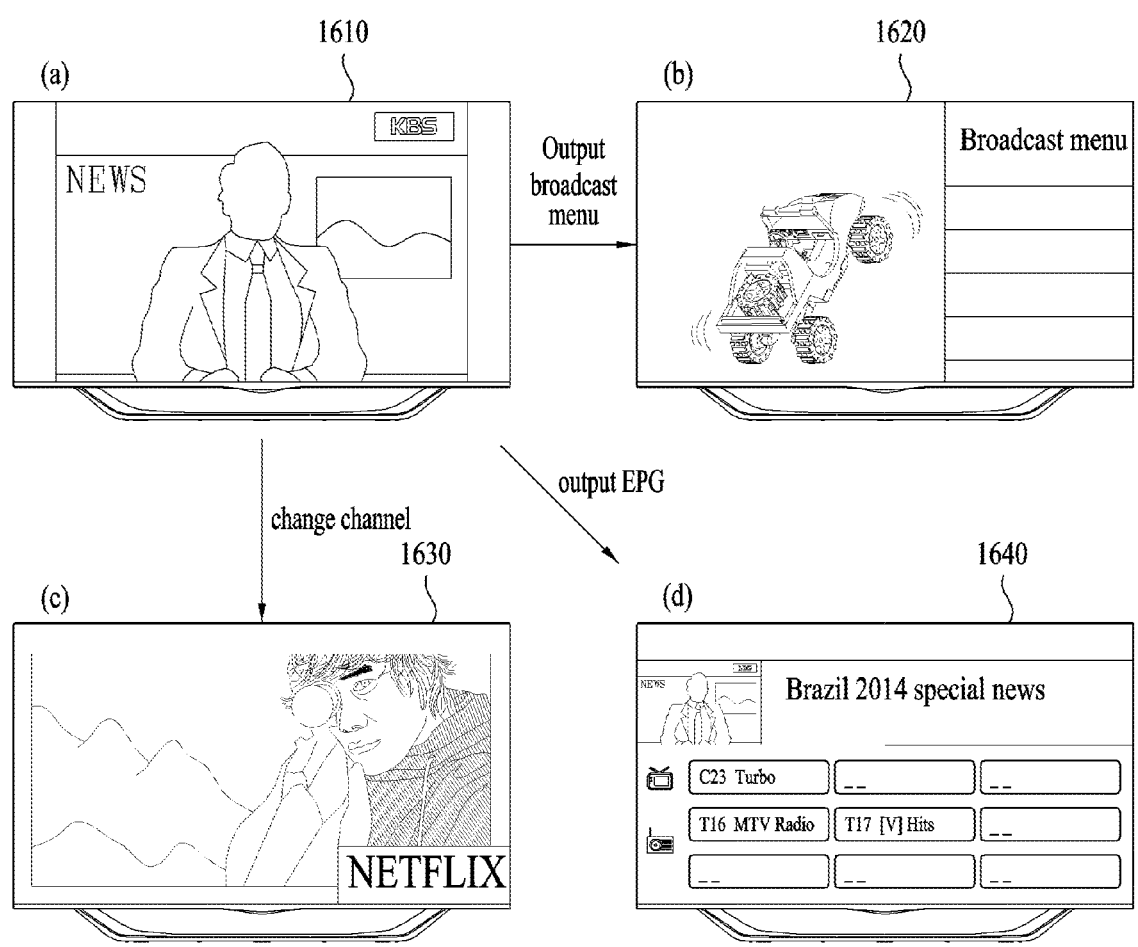
FIG. 16 is a diagram for explaining an image control function provided by a digital device according to one embodiment of the present invention.

FIG. 16 is a diagram for explaining an image control function provided by a digital device according to one embodiment of the present invention.

As shown in FIG. 16, when image content is outputted via an image output application, a digital device according to one embodiment of the present invention can provide various informations and a control function to a user using an image control application. In FIG. 16, assume that a real-time broadcasting program is outputted using an image output application.

As shown in FIG. 16a, a controller of the digital device according to one embodiment of the present invention can control channel information 1610 of a currently outputted real-time broadcasting program to be outputted using an image control application. And, as shown in FIG. 16b, the controller of the digital device according to one embodiment of the present invention can control a broadcasting menu 1620 configured to provide such a function as a recommendation content page output, a channel list, search and the like to be outputted using the image control application. And, as shown in FIG. 16c, the controller of the digital device according to one embodiment of the present invention can control a function of changing a channel 1630 of the currently outputted real-time broadcasting program to be performed using the image control application. Moreover, as shown in FIG. 16d, the controller of the digital device according to one embodiment of the present invention can control EPG 1640 including channel information of the currently outputted real-time broadcasting program to be outputted using the image control application. In this case, a first image control application provides the channel changing function shown in FIG. 16c only and a second image control application can provide all functions shown in FIGS. 16a to d. Regarding this, it shall be explained in detail with reference to FIGS. 17 to 20 in the following.

Figure 17:
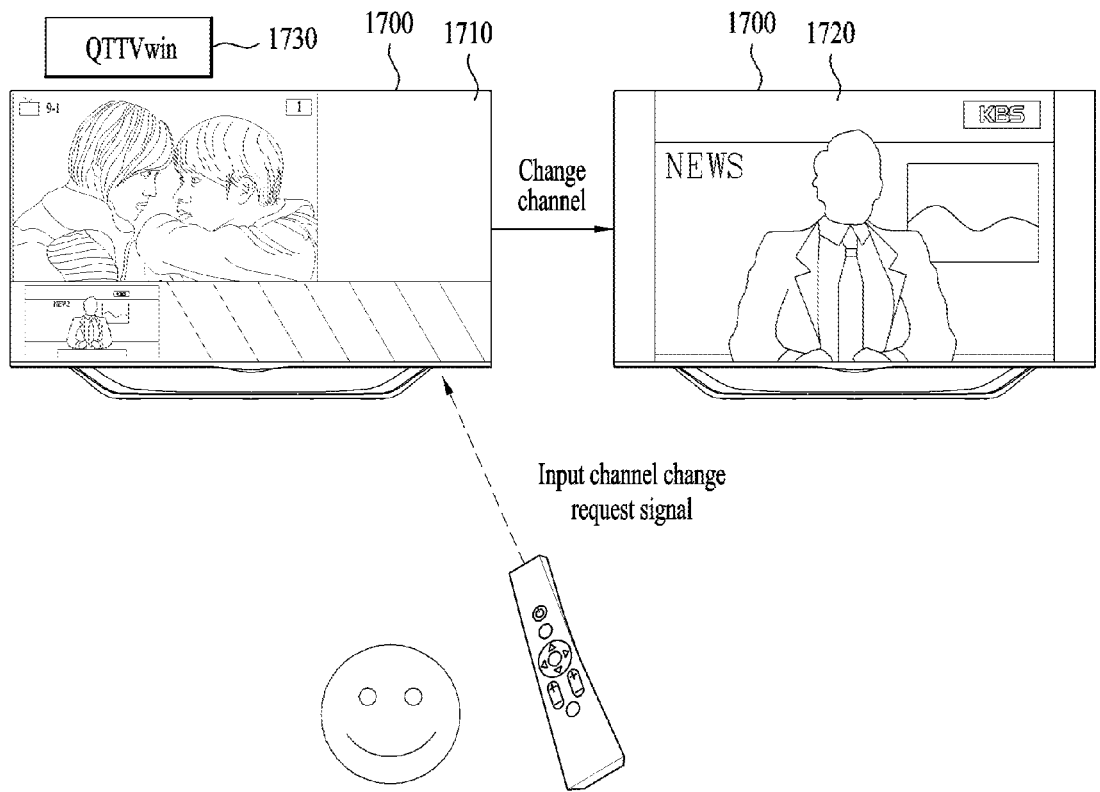
FIG. 17 is a diagram for explaining a control function performed by a digital device via a first image control application according to one embodiment of the present invention.

FIG. 17 is a diagram for explaining a control function performed by a digital device via a first image control application according to one embodiment of the present invention.

As shown in FIG. 17, if a power-on signal is received, a controller of a digital device 1700 according to one embodiment of the present invention can control a real-time broadcasting program 1710 of a first channel to be displayed on a screen by executing an image output application based on a predetermined booting process. And, the controller can control a first image control application 1730 to be loaded and executed to provide a function of controlling the real-time broadcasting program 1710 of the first channel. As mentioned in the foregoing description, the first image control application 1730 can be designed to provide a minimum control function such as channel change, volume adjustment and the like. If the first image control application 1730 is executed, a user transmits a channel change request signal to the digital device 1700 via such an external input means as a remote controller or the like. By doing so, the digital device 1700 can control a real-time broadcasting program 1720 of a second channel to be displayed on a screen.

Figure 18:
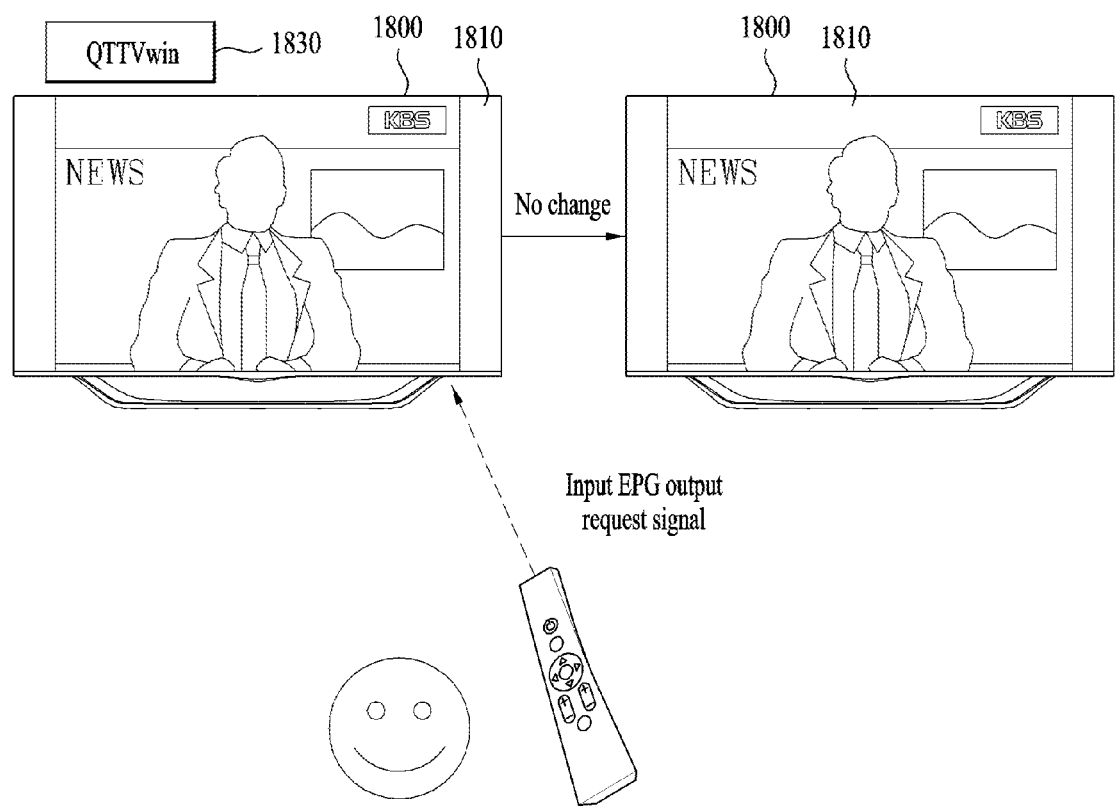
FIG. 18 is a different diagram for explaining a control function performed by a digital device via a first image control application according to one embodiment of the present invention.

FIG. 18 is a different diagram for explaining a control function performed by a digital device via a first image control application according to one embodiment of the present invention.

As shown in FIG. 18, if a power-on signal is received, a controller of a digital device 1800 according to one embodiment of the present invention can control a real-time broadcasting program 1810 of a first channel to be displayed on a screen by executing an image output application based on a predetermined booting process. And, the controller can control a first image control application 1830 to be loaded and executed to provide a function of controlling the real-time broadcasting program 1810 of the first channel. As mentioned in the foregoing description, the first image control application 1830 can be designed to provide a minimum control function such as channel change, volume adjustment and the like. Hence, although a user transmits an EPG output request signal to the digital device 1800 via such an external input means as a remote controller or the like, since the first image control application 1830 does not provide an EPF output function, the request EPG is not displayed.

Figure 19:
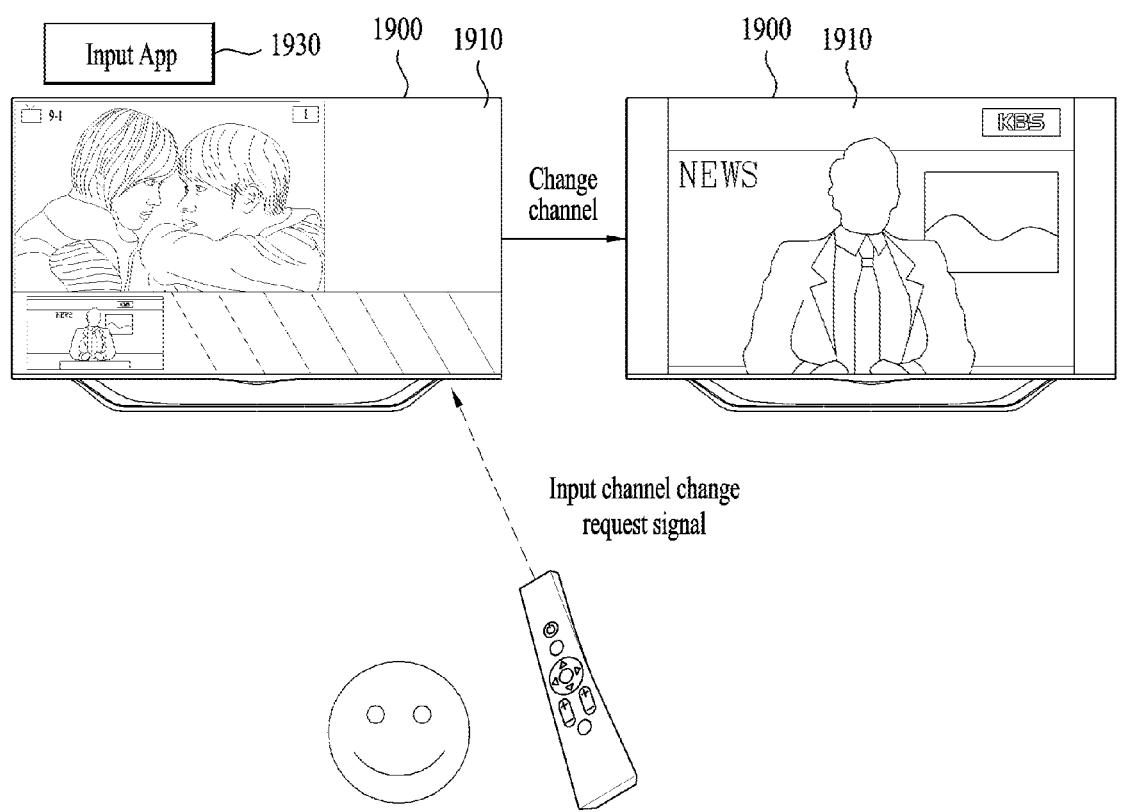
FIG. 19 is a diagram for explaining a control function performed by a digital device via a second image control application according to one embodiment of the present invention.

FIG. 19 is a diagram for explaining a control function performed by a digital device via a second image control application according to one embodiment of the present invention.

As shown in FIG. 19, if a power-on signal is received, a controller of a digital device 1900 according to one embodiment of present invention can control a real-time broadcasting program 1910 of a first channel to be displayed on a screen by executing an image output application based on a predetermined booting process. And, the controller can control a first image control application to be loaded and executed to provide a function of controlling the real-time broadcasting program 1910 of the first channel. As mentioned in the foregoing description, the first image control application can be designed to provide a minimum control function such as channel change, volume adjustment and the like. While the minimum control function is provided to a user via the first image control application, the controller can control a second image control application 1930, which is configured to provide more functions for controlling the real-time broadcasting program 1910 of the first channel at a background, to be loaded. And, if loading of the second image control application 1930 is completed, the controller can control the first image control application to be terminated and control the second image control application 1930 to be executed. Since the second image control application 1930 supports all image control functions provided by the first image control application, it is able to control the digital device 1900 to display the real-time broadcasting program 1920 of the second channel when a user transmits a channel change request signal to the digital device 1900 via such an external input means as a remote controller or the like.

Figure 20:
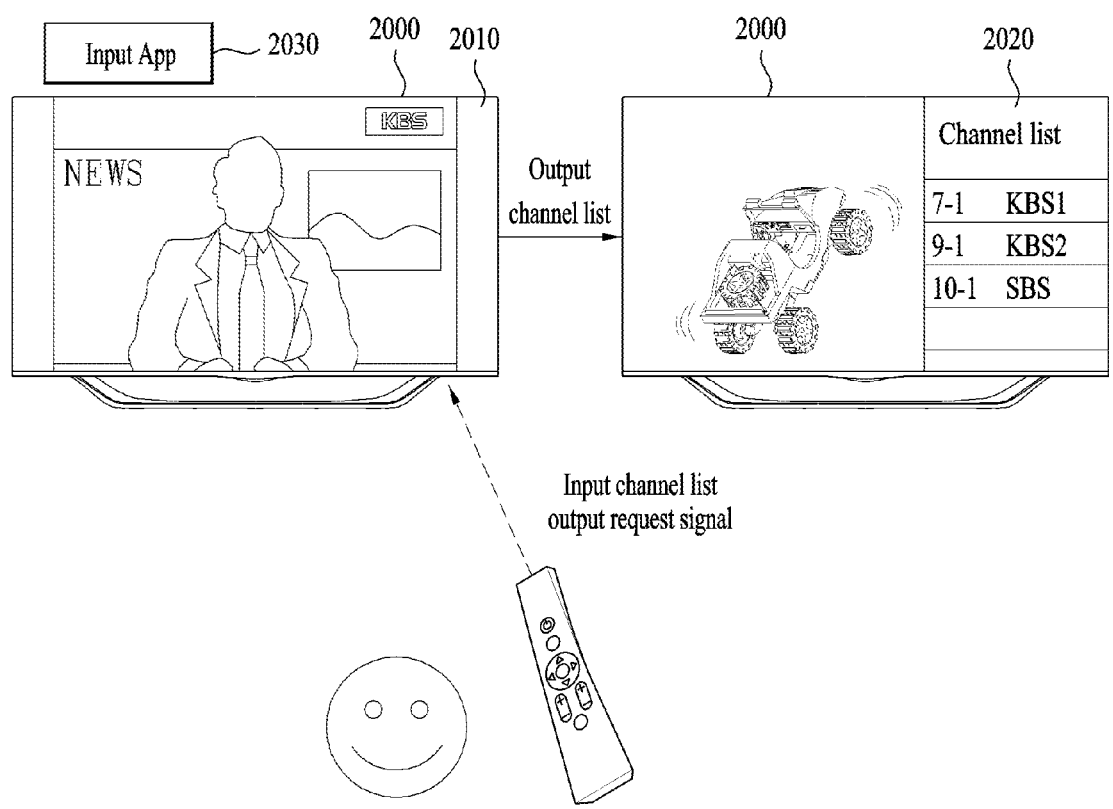
FIG. 20 is a different diagram for explaining a control function performed by a digital device via a second image control application according to one embodiment of the present invention.

FIG. 20 is a different diagram for explaining a control function performed by a digital device via a second image control application according to one embodiment of the present invention.

As shown in FIG. 20, if a power-on signal is received, a controller of a digital device 2000 according to one embodiment of present invention can control a real-time broadcasting program 2010 of a first channel to be displayed on a screen by executing an image output application based on a predetermined booting process. And, the controller can control a first image control application to be loaded and executed to provide a function of controlling the real-time broadcasting program 2010 of the first channel. As mentioned in the foregoing description, the first image control application can be designed to provide a minimum control function such as channel change, volume adjustment and the like. While the minimum control function is provided to a user via the first image control application, the controller can control a second image control application 2030, which is configured to provide more functions for controlling the real-time broadcasting program 2010 of the first channel at a background, to be loaded. And, if loading of the second image control application 2030 is completed, the controller can control the first image control application to be terminated and control the second image control application 2030 to be executed. The second image control application 2030 can support not only an image control function provided by the first image control application but also various image control functions such as channel information output, a channel list output, a reservation recording function, EPG output, and the like. As an example, as shown in FIG. 20, if a user transmits a channel list output request signal to the digital device 2000 via such an external input means as a remote controller or the like, the controller can control a channel list 2020 including the currently displayed first channel to be displayed on a screen.

Figure 21:
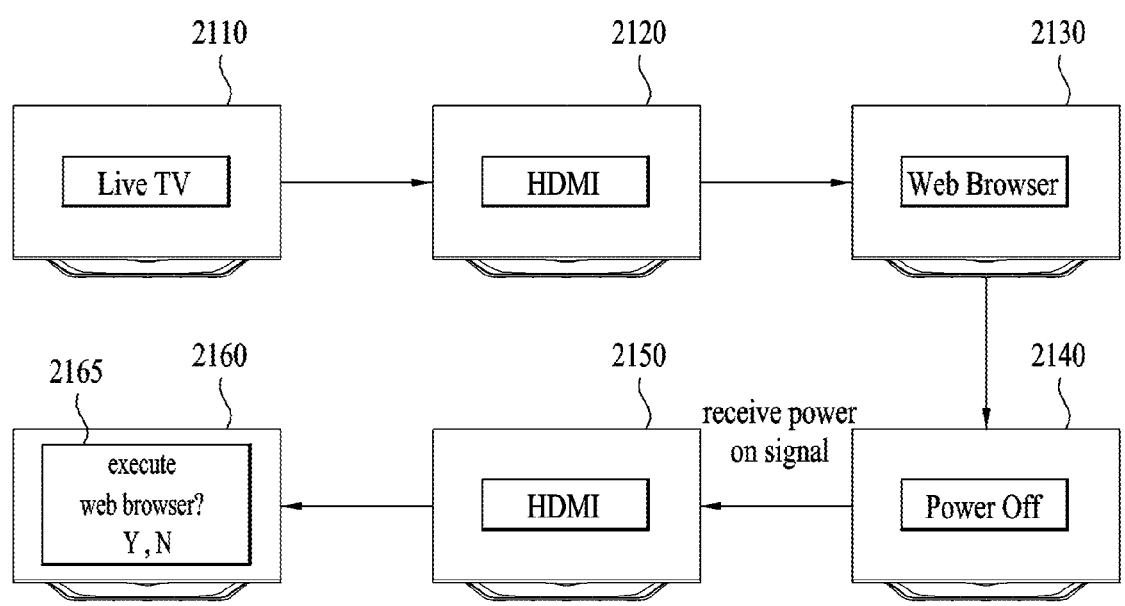
FIGS. 21 and 22 are diagrams for explaining an example for a digital device to receive a power-on signal and determine a firstly executed image output application according to one embodiment of the present invention.
Figure 22:
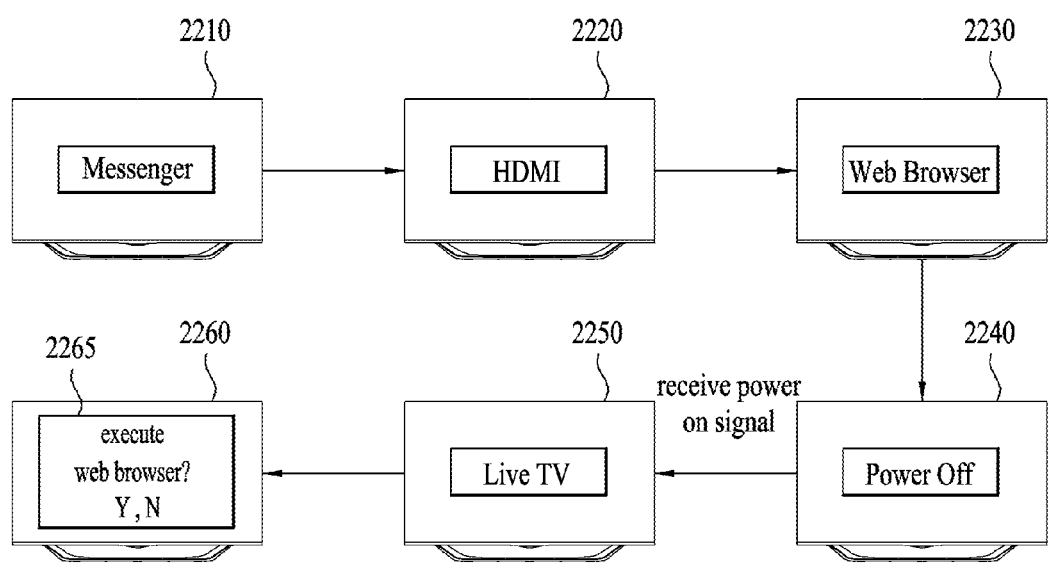

FIGS. 21 and 22 are diagrams for explaining an example for a digital device to receive a power-on signal and determine a firstly executed image output application according to one embodiment of the present invention.

A controller of a digital device according to one embodiment of the present invention receives a power-on signal and determines whether or not an application, which was executed at the time of power-off before the power-on signal is received, corresponds to an image output application. If the application executed at the time of power-off corresponds to an image output application, the controller can control the image output application to be loaded and executed, control a first image control application for controlling an image outputted via the image output application to be loaded and executed, and control a second image control application to be loaded. If loading of the second image control application is completed, the controller can control the first image control application to be terminated and control the second image control application to be executed.

And, if the application executed at the time of power-off is not an image output application, the controller executes an image output application by loading the image output application, executes a first image control application by loading the first image control application to control an image outputted via the image output application, and loads the application which is executed at the time of power-off. If the loading of the application is completed, the controller can control a message for receiving an output request of the application, which was executed at the time of power-off, to be displayed on a screen.

For example, as shown in FIG. 21, if a first image output application 2110 is executed, a second image output application 2120 is executed, a web browser application 2130 is sequentially executed, a digital device is switched to a power-off state 2140, and a power-on signal is received again, the controller of the digital device determines whether or not a lastly executed application, which was executed immediately before the digital device is switched to the power-off state, corresponds to an image output application. Since the lastly executed application, which was executed immediately before the digital device is switched to the power-off state, is not the image output application but a web browser application, the controller can control to search for whether or not there exists a previously executed image output application. As a result, the controller checks that the second image output application 2120 corresponds to a lastly executed image output application. If a power-on signal is received, the controller preferentially executes the second image output application 2120 and can control a first image control application to be loaded and executed to control an image outputted via the second image output application 2120. Moreover, the controller can control the web browser application 2130 to be loaded at the background. If the loading of the web browser application is completed, the controller can control a message 2165 for receiving an output request of the web browser application 2130 to be displayed on a screen.

And, as shown in FIG. 22, if a messenger application 2210 is executed, a game application 2220 is executed, a web browser application 2230 is sequentially executed, a digital device is switched to a power-off state 2240, and a power-on signal is received again, the controller of the digital device determines whether or not a lastly executed application, which was executed immediately before the digital device is switched to the power-off state, corresponds to an image output application. Since the lastly executed application, which was executed immediately before the digital device is switched to the power-off state, is not the image output application but a web browser application, the controller can control to search for whether or not there exists a previously executed image output application. As a result, if data on executing an image output application is not discovered, the controller can control a predetermined first image output application 2250 to be preferentially loaded and executed. And, the controller can control a first image control application to be loaded and executed to control an image outputted via the first image output application 2250. Moreover, the controller can control the web browser application 2230 to be loaded at the background. If the loading of the web browser application is completed, the controller can control a message 2265 for receiving an output request of the web browser application 2230 to be displayed on a screen.

If the digital device is designed as FIGS. 21 to 22, a user can preferentially receive the first needed function and it is able to automatically execute an application which was used before the digital device is turned off.

Figure 23:
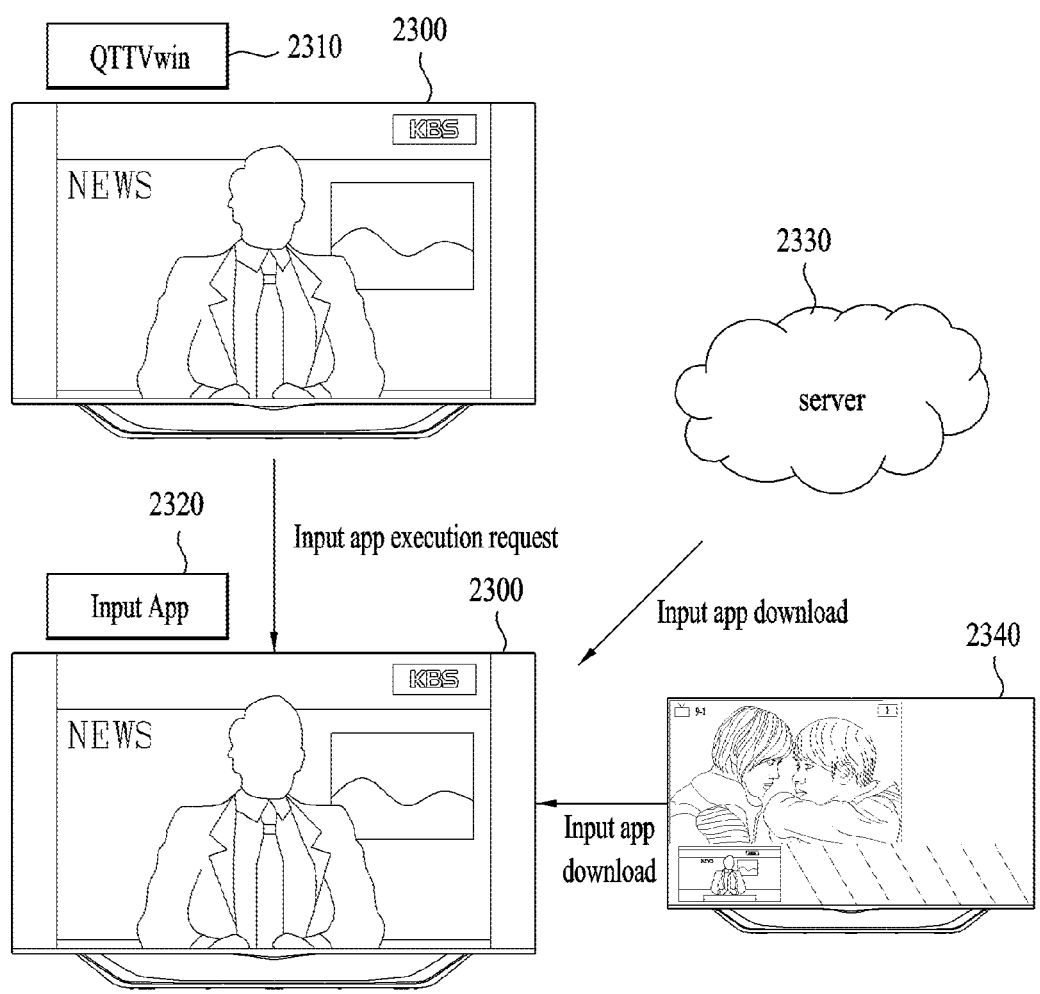
FIG. 23 is a diagram for explaining an example for a digital device to download a second image control application from an external server and the like according to one embodiment of the present invention.

FIG. 23 is a diagram for explaining an example for a digital device to download a second image control application from an external server and the like according to one embodiment of the present invention.

A controller of a digital device according to one embodiment of the present invention receives a power-on signal and determines whether or not an application, which was executed at the time of power-off before the power-on signal is received, corresponds to an image output application. If the application executed at the time of power-off corresponds to the image output application, the controller executes the image output application by loading the image output application, executes a first image control application 2310 by loading the first image control application to control an image outputted via the image output application, and loads a second image control application 2320. If the loading of the second image control application is completed, the controller can control the first image control application 2310 to be terminated and control the second image control application 2320 to be executed. The first image control application 2310 and the second image control application 2320 can be generated using a program language different from each other. For example, the second image control application 2320 can be generated using a web language including Java script, HTML, and CSS. And, although the first image control application 2310 should use a pre-installed application, the second image control application 2320 can be downloaded from an external server 2330 or an external device 2340. And, the controller of the digital device 2300 according to one embodiment of the present invention loads and executes the first image control application 2310 and may be able to determine a second image control application 2320 to be executed among a plurality of second image control applications 2320. In this case, the controller can sequentially execute a most recently executed second image control application 2320. And, if a user inputs a signal for requesting execution of a specific function, the controller of the digital device 2300 according to one embodiment of the present invention searches for a second image control application 2320 capable of providing the specific function and can control the second image control application 2320 to be downloaded from an external server 2330 or an external device 2340.

Figure 24:
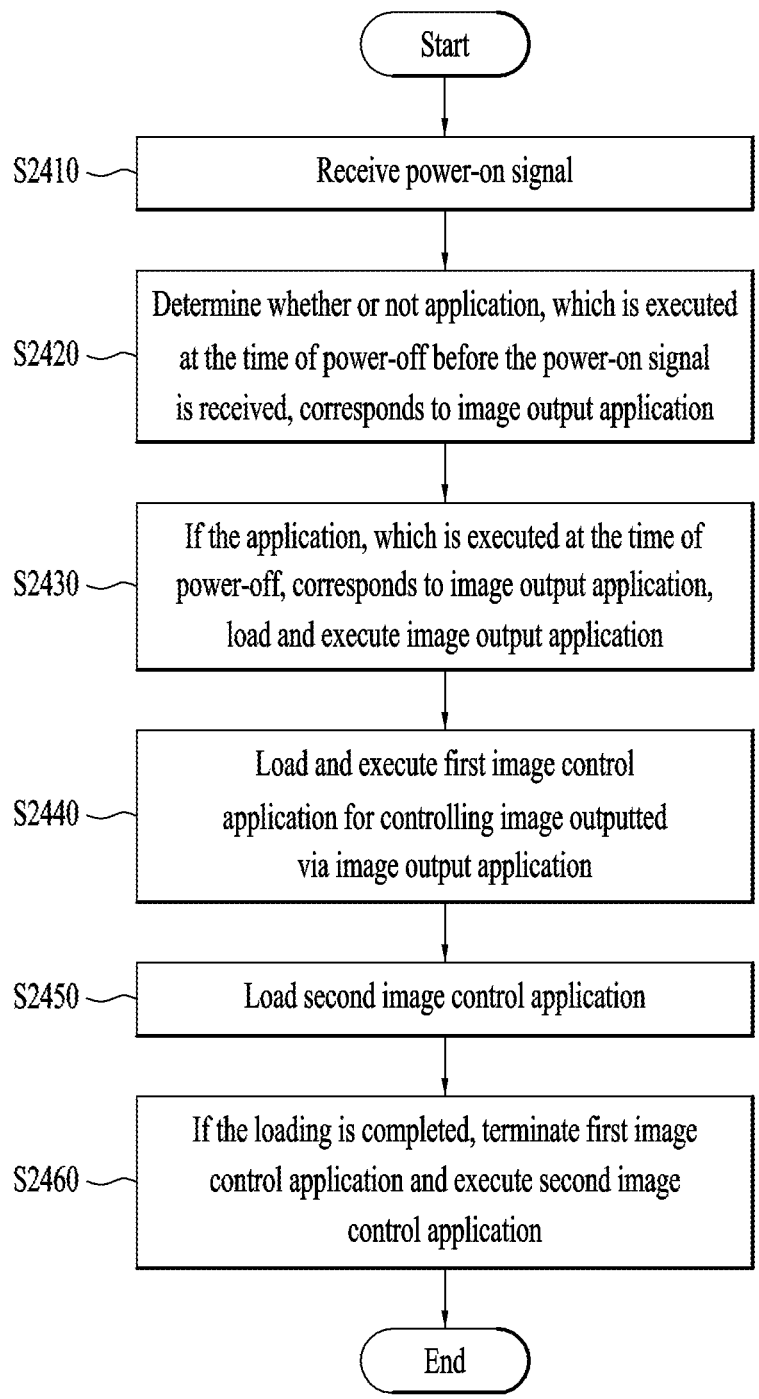
FIG. 24 is a flowchart for a method of controlling a digital device according to one embodiment of the present invention.

FIG. 24 is a flowchart for a method of controlling a digital device according to one embodiment of the present invention.

As shown in FIG. 24, a method of controlling a digital device according to one embodiment of the present invention includes the step of receiving a power-on signal (S2410), the step of determining whether or not an application, which was executed at the time of power-off before the power-on signal is received, corresponds to an image output application (S2420), the step of, if the application executed at the time of power-off corresponds to an image output application, loading and executing the image output application (S2430), the step of loading and executing a first image control application to control an image outputted via the image output application (S2240), the step of loading a second image control application (S2450), and, if the loading is completed, the step of terminating the first image control application and executing the second image control application (S2460). Since explanation on each step is identical to what is mentioned above, explanation on overlapped content is omitted at this time.

In the following, various embodiments for a digital device configured to process a service or an application according to the present invention are explained in more detail with reference to the attached drawing.

In the present specification, a digital device configured to process an MVPD service or an MVPD application (hereinafter, 'MVPD service') as the aforementioned service or the application and a method of controlling therefor are described in the following. In this case, the MVPD is an abbreviation for multichannel video programming distributor and corresponds to one or more service providers providing a VoD or a streaming service. In relation to the present invention, for example, the MNPD service can be performed based on an RF-based or can be performed based on an IP-based. And, if necessary, the MVPD service can also be performed in a hybrid form that the RF-based and the IP-based are mixed. Hence, in the following, the RF-based MVPD service and the IP-based MVPD service are respectively explained.

In relation to the present invention, according to a legacy MVPD service, the service was performed in a form that solution(s) of a service provider are all embedded in a STB. Hence, a digital device embeds the solutions in the device in a software manner and replaces a function of the legacy hardware set-top box with the solutions. Yet, unlike the aforementioned legacy MVPD service, the present invention intends to operate the MVPD as an input and provide and operate the MVPD in an external input form. Hence, according to the present invention, the MVPD can be serviced as an external input such as HDMI, Component, or the like. And, as mentioned in the foregoing description, although the MVPD according to the present invention operates as an input of a device, it may be able to provide and process a service performance equal to or greater than a service performance of the legacy MVPD service or the hardware set-top box.

First of all, a process of the RF-based MVPD service is explained in detail in the following with reference to the attached drawings. Meanwhile, a partial configuration of the drawings associated with the process of the MVPD service can be briefly explained or omitted for clarity of explanation of an applicant. Yet, a function or a role of the configuration can be clearly interpreted in relation to a basic function of a digital device and a process of the MVPD service.

Figure 25:
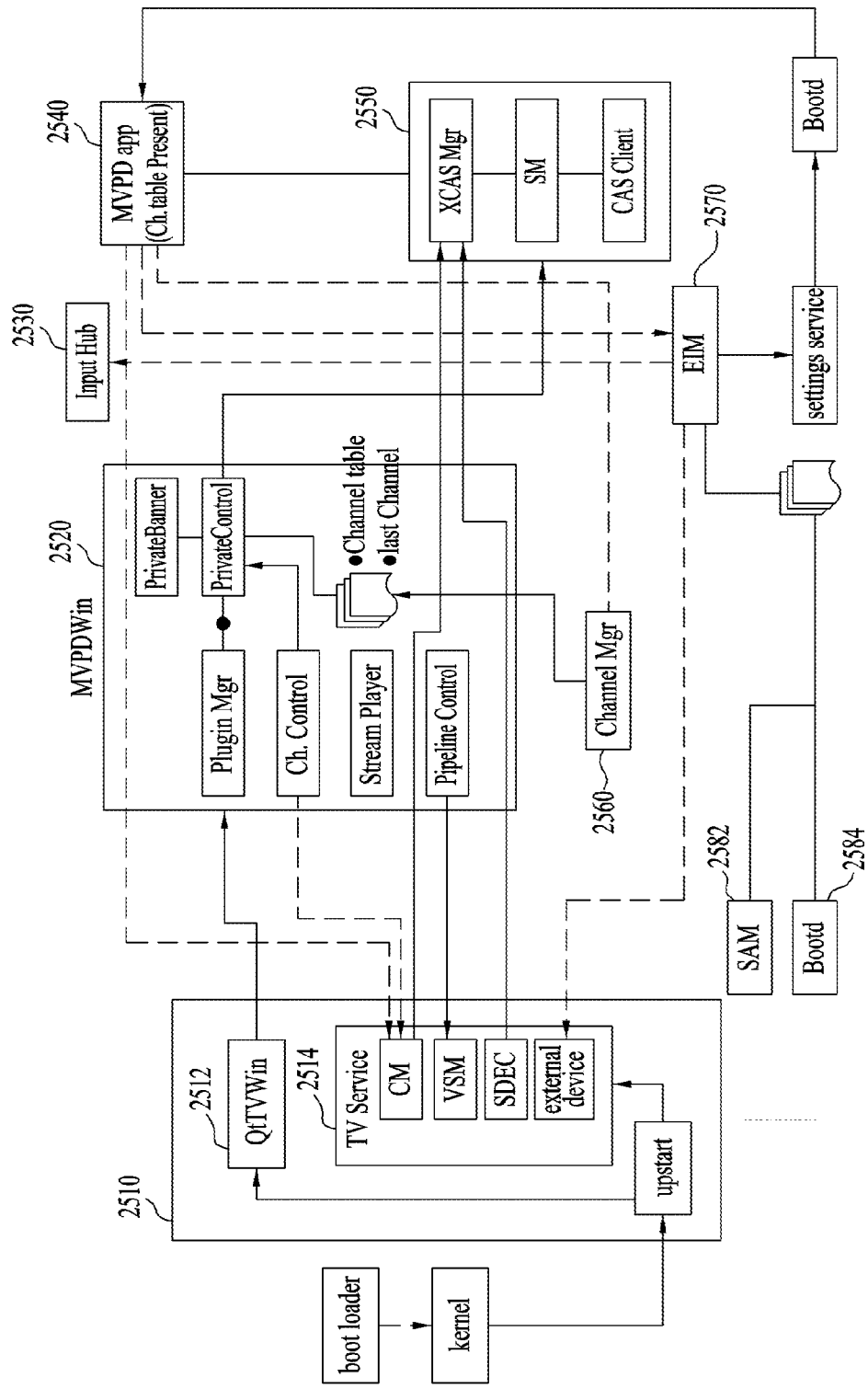
FIG. 25 is a configuration block diagram for a device to recognize an RF-based MVPD service as an input mode and process the RF-based MVPD service according to one embodiment of the present invention.

FIG. 25 is a configuration block diagram for a device to recognize an RF-based MVPD service as an input mode and process the RF-based MVPD service according to one embodiment of the present invention.

Referring to FIG. 25, a digital device mainly includes configurations for a TV processing unit 2510, an MVPD processing unit (MVPDWin) 2520, and other MVPD service process.

If booting of a digital device is performed via a boot loader and a kernel, an upstart module of the TV processing unit 2510 receives an input data, i.e., file, from the kernel. The upstart module delivers the input file to a QtTVWin module 2512 and a TV service processing module 2514. The QtTVWin module 2512 checks whether or not a mode corresponds to an MVPD mode based on the received input file. In this case, if the mode corresponds to the MVPD mode, the QtTVWin module 1512 hands over a role of the QtTVWin module to the MVPD processing unit 2520 and terminates the role of the QtTVWin module. Meanwhile, the TV service processing module 2514 processes relevant data by including such a configuration as a channel manager, VSM, SDEC, an external device and the like.

Meanwhile, as mentioned in the foregoing description, if the MVPD processing unit 2520 receives a role transfer indication from the QtTVWin module 2512 according to RF mode recognition, the MVPD processing unit 2520 processes an MVPD service. In this case, the MVPD processing unit 2520 checks/var/lib/eim/last input file stored from the EIM 2570. By doing so, the MVPD processing unit 2520 can identify whether a type of an inputted MVPD service file corresponds to a file of an RF-based MVPD_RF type or a file of an IP-based MVPD_IP type.

The EIM 2570 includes MVPD information in last input application information of the file. And, the EIM 2570 stores information on whether or not a mode corresponds to an MVPD mode in the last input application information to use the mode information at the time of booting. Hence, when booting is performed, as mentioned in the foregoing description, the QtTVWin module 2512 reads and extracts the file stored in the EIM 2570 and delivers the file to the MVPD processing unit 2520 to perform a basic processing.

Meanwhile, the EIM 2570 can add the last input application information to a setting service as a setting data. Although it is not depicted in FIG. 25, it is necessary for LSM and the like to receive a value of the last input application from the setting service for an exit key operation. The LSM and the like may subscribe the value of the last input application. In relation to this, configuration or update of the setting service of the last input application can be performed in a live TV application, the EIM 2570, and the like.

Meanwhile, SAM 2582 and Bootd 2584 can flexibly perform an external input-related processing according to an external input management policy. The SAM 2582 and the Bootd 2584 obtain a last input from the TV service processing module 2514 and matches the last input with a mapping table of an input and an input application to launch a prescribed application. On the contrary, as mentioned in the foregoing description, the SAM 2582 and the Bootd 2584 can read and extract the stored/var/lib/eim/lastinput file from the EIM 2570 instead of the TV service processing module 2514 and process the file.

Meanwhile, an MVPD application 2540 launches an MVPD-related service of the MVPD application 2540. In addition to the MVPD-related service of the MVPD application 2540, a service related to XCAS 2550 can also be launched from PrivateControl plugged in the MVPDWin module 2520 when booting is performed. The MVPD application 2540 implements API such as downloadCHTable, saveLastChInfo and the like in some cases.

After the MVPD application 2540 is executed, if MVPDWin 2520 does not exist anymore, the channel manager 2560 provides a service for receiving a luna service call and the like requested by the MVPD application 2540.

In terms of a function, when an input mode corresponds to MVPD, a detail MVPD service processing architecture is explained in the following. As mentioned in the foregoing description, MVPD operates as a general input according to a requirement of a service provider. In this case, a characteristic of the general input can be described as follows. For example, the general input can be displayed in a list of input selector application similar to an input hub (picker) 2530 together with other inputs. For example, in a state that an MVPD service is watching, if a different application rather than an input application is performed and the different application is terminated or switched to the background, an MVPD application may appear by default. Similarly, if a digital device is rebooted in the middle of watching the digital device, similar to other inputs, booting can be performed as an MVPD service appears. This may be associated with a seamless change of a digital device to which a web OS platform is mounted. Meanwhile, an input mode can be activated after an application is installed and the application is authenticated by each MVPD server.

Figure 26:
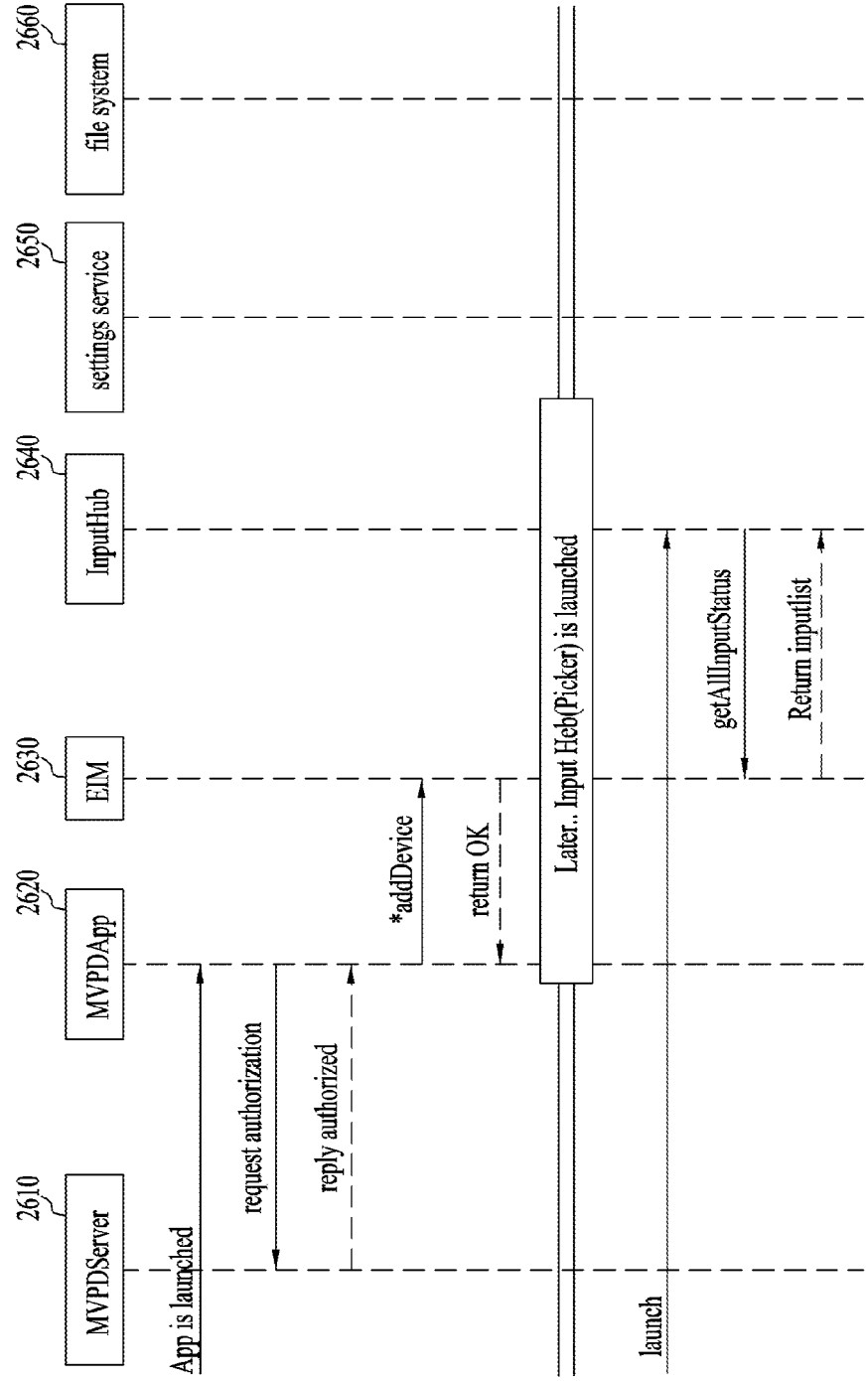
FIG. 26 is a sequence diagram for processing an MVPD service according to one embodiment of the present invention.

FIG. 26 is a sequence diagram for processing an MVPD service according to one embodiment of the present invention.

In FIG. 26, assume a case that an MVPD application is already installed in a web OS device.

As mentioned in the foregoing description, in order to process an MVPD service in a web OS digital device together with external inputs, it may be necessary to define EIM or extend predefined contents. In other word, it is required to dynamically add an MVPD input to a default input application of the EIM. To this end, it may be able to define a relevant API (addDevice). And, the EIM can also extend API (getAllInputStatus) which is obtained to configure input information in an input hub.

If a user was watching an MVPD service immediately before power of a web OS device is turned off, the web OS device provides an identical MVPD to the user when the power of the web OS device is turned on, i.e., rebooted. In general, an MVPD application corresponds to a web application. In case of boot-up, time taken for opening a first web application is over 30 seconds on the basis of initial release. Hence, this may not be able to satisfy a requirement of the MVPD. Hence, in order to satisfy the requirement of the MVPD and increase user convenience, it may use a native framework, i.e., MVPDWin. According to the native framework, it may be able to provide a screen to a user before an application is executed.

When booting is performed, TVWin determines a type of a last input application. If the type of the last input application is determined as an MVPD mode, the MVPDWin is launched. In this case, as mentioned in the foregoing description, the TVWin is terminated. Meanwhile, the MVPDWin can preferentially process a partial function related to streaming, channel switching and the like provided by a legacy MVPD. In this case, in case of performing the channel switching, a pay channel may be excluded. In this case, a service depending on the MVPD may include a XCAS manager service and the like.

The aforementioned contents are described according to a sequence order in the following with reference to FIG. 26.

If an MVPD application 2620 is launched on a web OS device, an MVPD server 2610 receives an authentication request from the MVPD application 2620 (S2604) and returns an authentication result to the MVPD application (S2606). The MVPD application 2620 receives the authentication result of the step S2606 and transmits the addDevice API to an EIM 2630 (S2608). The EIM 2630 returns a result of the API transmission (S2610).

After the step S2610 is performed, an input hub (picker) 2640 is launched by the MVPD server 2610 (S2612). The input hub launched via the step S2612 transmits getAllInput- Status API to the EIM 2630 (S2614) and the EIM 2630 returns an input list according to the API (S2616).

Figure 27:
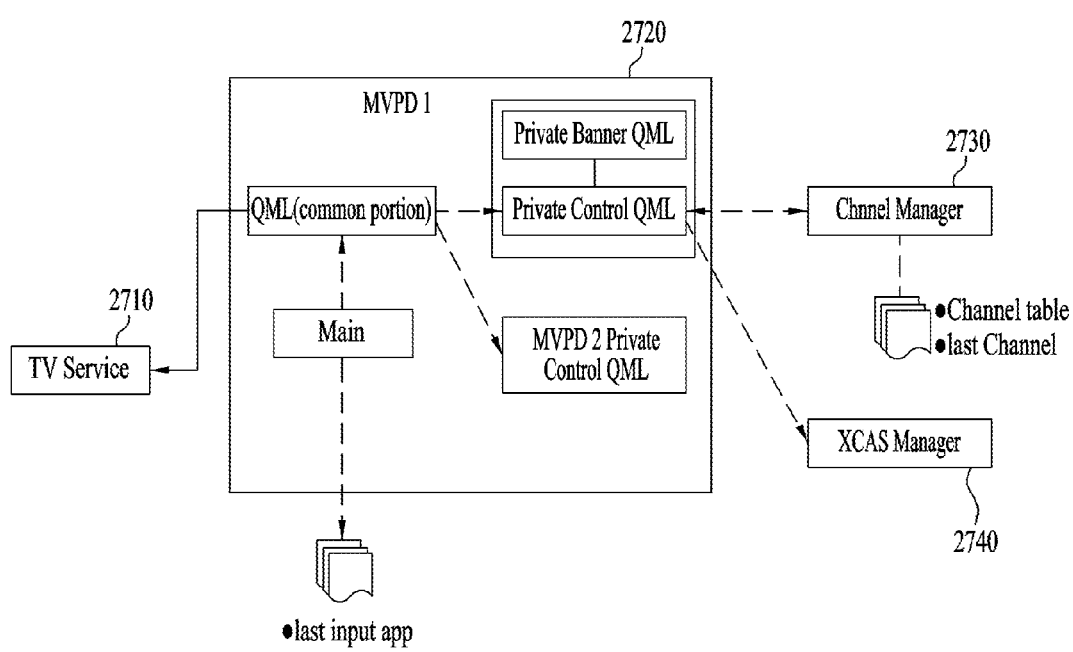
FIG. 27 is a configuration block diagram for an MVPD service processing module according to one embodiment of the present invention.

FIG. 27 is a configuration block diagram for an MVPD service processing module according to one embodiment of the present invention.

As shown in FIG. 27, in order to process an MVPD service, a TV service module 2710, an MVPD service module 2720, a channel manager 2730, an XCAS manager module 2740, and the like can be included.

The MVPD service module 2720 includes QML. For example, the QML may exist according to an MVPD service provider. Hence, a different QML can be loaded for an MVPD service according to a last input application. The loaded QML respectively obtains a banner in the MVPD service module 2720 and the QML can obtain a channel map from the channel manager 2730. In this case, if there exists a service dependent of an MVPD according to an MVPD, it may be able to launch the service. For example, XCAS manager and the like can be included in the service.

Figure 28:
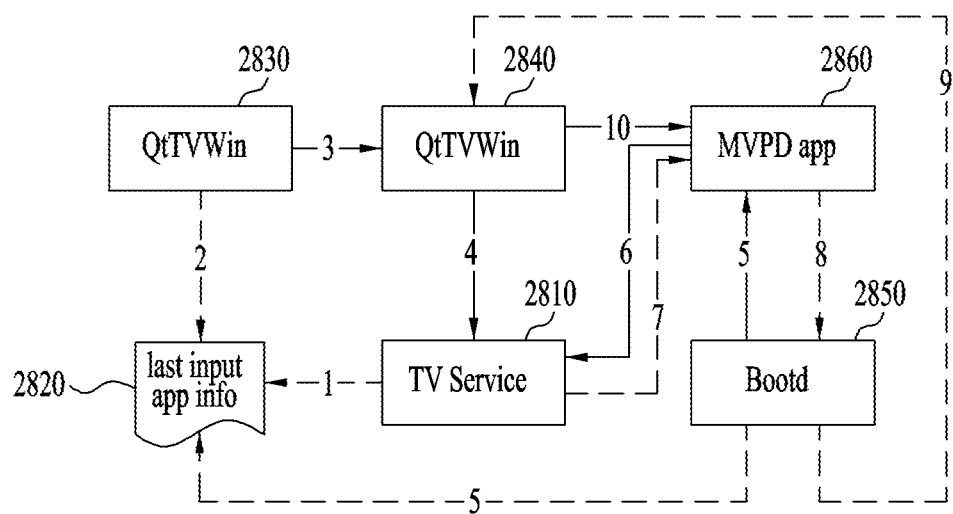
FIG. 28 is a diagram for explaining a seamless process when an input mode corresponds to MVPD according to one embodiment of the present invention.

FIG. 28 is a diagram for explaining a seamless process when an input mode corresponds to MVPD according to one embodiment of the present invention.

If an input mode corresponds to MVPD in a web OS device, as mentioned in the foregoing description, mute may occur due to reset of a media when MVPDWin goes on to an MVPD application. For example, since the mute may affect usability, a design for a seamless change may be required.

For example, if a last input application corresponds to MVPD, a TV service may prevent a routine of resetting a pipeline in case of performing booting for a TV or an external input. In this case, MVPDWin receives a stored last input application information file (/var/lib/eim/lastinput) from EIM and may be then able to check the file. In other word, the MVPDWin determines whether or not a type of the last input application corresponds to an MVPD mode based on the file received from the EIM. In this case, the MVPDWin controls a process of the TV service related a pipeline. For example, the MVPDWin makes a request for reset of a pipeline, a setting of a reset pipeline to the TV service. To this end, it may be able to define a relevant API. Subsequently, if the MVPD application is displayed on a screen, as mentioned in the foregoing description, an initial pipeline can be handed over.

The aforementioned contents are explained in more detail in the following based on contents shown in FIG. 28.

A TV service 2810 reads and extracts last input application information from a file (/var/lib/eim/lastinput) of EIM and checks a type of the information. In this case, if the type corresponds to MVPD_RF or MVPD_IP, the TV service 2810 skips a pipeline reset procedure.

Similar to the TV service 2810, QtTVWin 2830 reads and extracts the last input application information and checks a type of the information. In this case, if the type of the last input application corresponds to MVPD_RF or MVPD_IP, the QtTVWin delivers corresponding content to an MVPD-Win 2840 and the QtTVWin stops performing a function of the QtTVWin.

The MVPDWin 2840 opens a pipeline and makes a request for returning a pipeline ID. In this case, broadcastId can be called as the pipeline ID (luna://com.webos.service.tv.broadcast/open). Subsequently, the MVPDWin 2840 makes a request for setting an initial pipeline. In this case, the pipeline can be delivered to the MVPD application 2860. Subsequently, the MVPDWin 2840 makes a request for connection with VSM and sets a frequency.

Subsequently, when a system is ready, bootd 2850 reads and extracts last input application information and launches a last input application based on the read and extracted last input application information.

The MVPD application 2860 makes a request for opening a pipeline to the TV service 2810 (luna://com.webos.service.tv.broadcast/open) and the TV service 2810 returns a pipeline ID of a previously generated initial pipeline. And, the MVPD application 2860 makes request for connection with the VSM to the TV service 2810.

When the MVPD application 2860 is ready, a minimal-boot-done signal (MBD signal) is transmitted to the bootd 2850 and the MVPDWin 2840 receives the MBD signal. The MVPDWin 2840 destroys all jobs, relaunches the MVPD application, and terminates a function of the MVPDWin 2840. By doing so, the MVPD application 2860 is seamlessly launched to the foreground.

As mentioned in the foregoing description, in order to process a seamless change, the last input list is occupied by the TV service. If necessary, a different module obtains an application mapped to a last input from the last input list and processes the application. In relation to this, a module for processing the seamless change may include SAM, Bootd, LSM and the like. Since it is difficult for each module to dynamically secure an input list, it may be necessary to perform mapping between a necessary, distributed and static input list and an input application.

Figure 29:
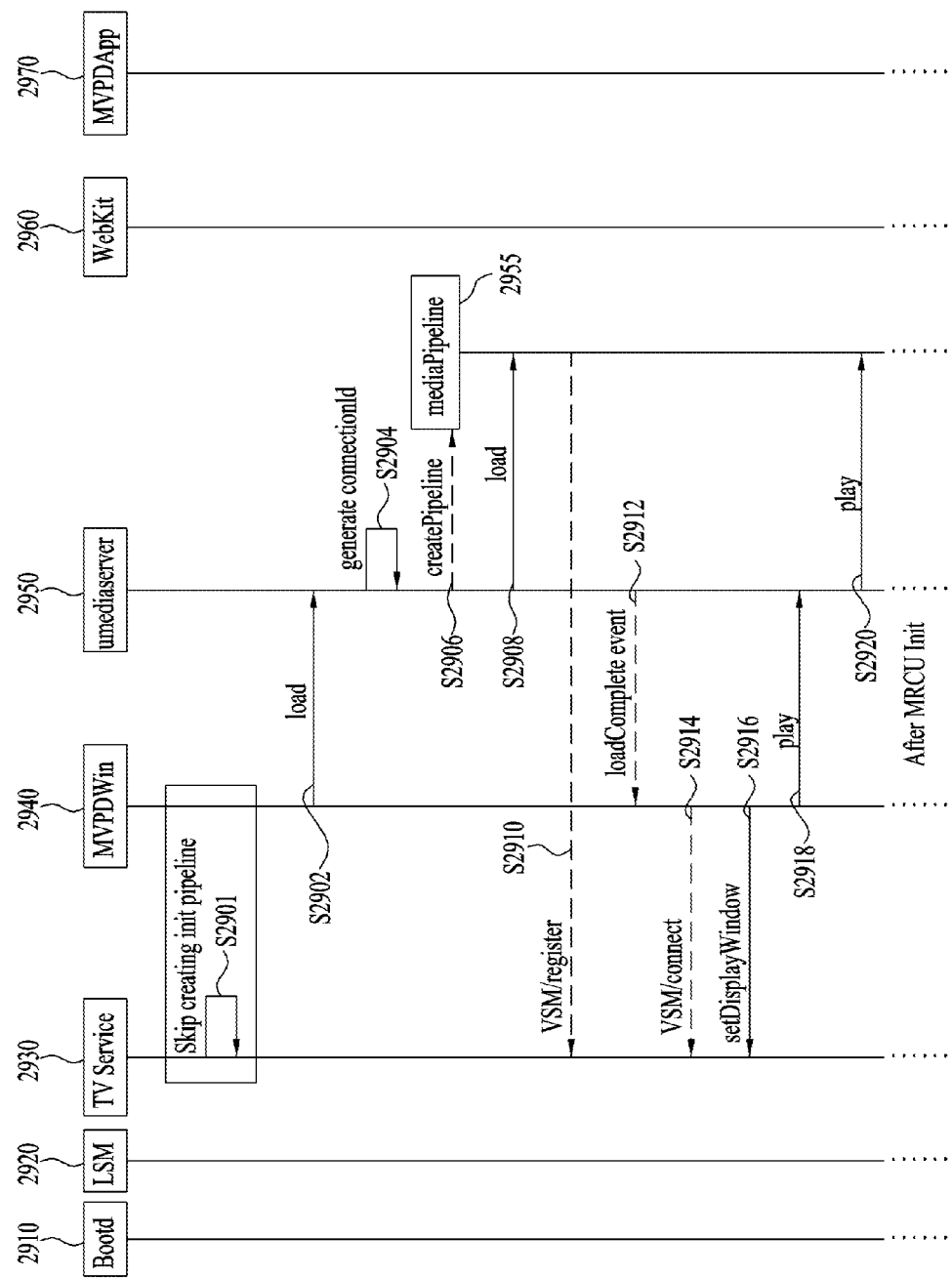
FIGS. 29 and 30 are sequence diagrams for a last input process related to a seamless change according to one embodiment of the present invention.
Figure 30:
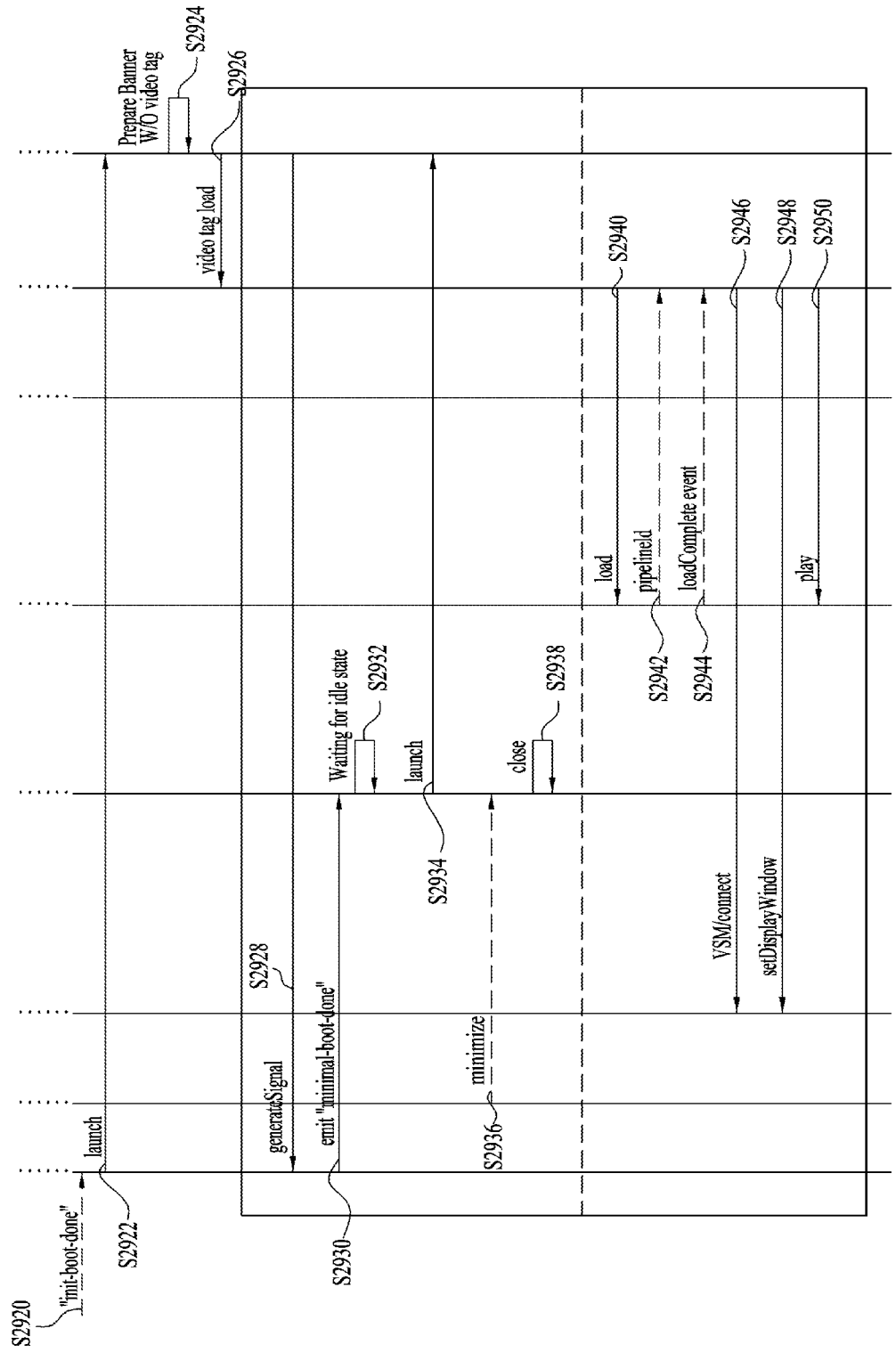

FIGS. 29 and 30 are sequence diagrams for a last input process related to a seamless change according to one embodiment of the present invention.

A seamless change and the like can be performed by Bootd 2910, LSM 2920, TV service 2930, MVPDWin 2940, media server 2950, web kit 2960, MVPD application 2970 and the like.

In the following, a sequence diagram is explained in detail with reference to FIGS. 29 and 30.

If a last input application corresponds to MVPD, the TV service 2930 skips an initial pipeline generating procedure (S2901).

The MVPDWin 2940 loads keep_session to the media server 2950 (S2902). The media server 2950 generates a connectionID (S2904), makes a request for generating a pipeline to the media pipeline 2955, and loads the generated pipeline (S2906, S2908). The media pipeline 2955 registers a pipelineID at VSM of the TV service 2930 (S2910).

The media server 2950 loads complete_event to the MVPDWin 2940 (S2912).

The MVPDWin 2940 makes a request for connection and display window setting to the VSM of the TV service 2930 using the pipelineID (S2914, S2916). And, the MVPDWin 2940 makes a request for playing to the media server 2950 (S2918) and the media server 2950 makes a request for the play request to the media pipeline 2955 (S2920).

Subsequently, referring to FIG. 30, if initial booting is performed after MRCU is reset (S2922), the Bootd 2910 makes a request for launching launch_Hidden to the MVPD application 2970 (S2924). Then, the MVPD application 2970 prepares a banner without a video tag (S2926) and loads a video tag to the web kit 2960 (S2928).

Subsequently, the MVPD application 2970 makes a request for generating an MBD signal to the Bootd 2910 (S2930). If an application is ready, the Bootd 2910 delivers the MBD signal to the MVPDWin 2950 (S2932). The MVPDWin 2950 waits for an idle state and launches show to the MVPD application 2970 (S2934, S2936).

Subsequently, the LSM transmits minimize to the MVP-DWin 2950 (S2938) and the MVPDWin 2950 closes after the minimization is received (S2940).

Subsequently, if the web kit 2960 loads to the media server 2950 (S2942), the media server 2950 loads the pre-allocated pipelineID and the complete_event to the web kit 2960 (S2944, S2946).

Subsequently, the web kit 2960 makes request for connection with the VSM of the TV service 2930 and display window setting based on the pipelineID (S2948, S2950). Then, the web kit 2960 loads a play request to the media server 2950 (S2952).

Figure 31:
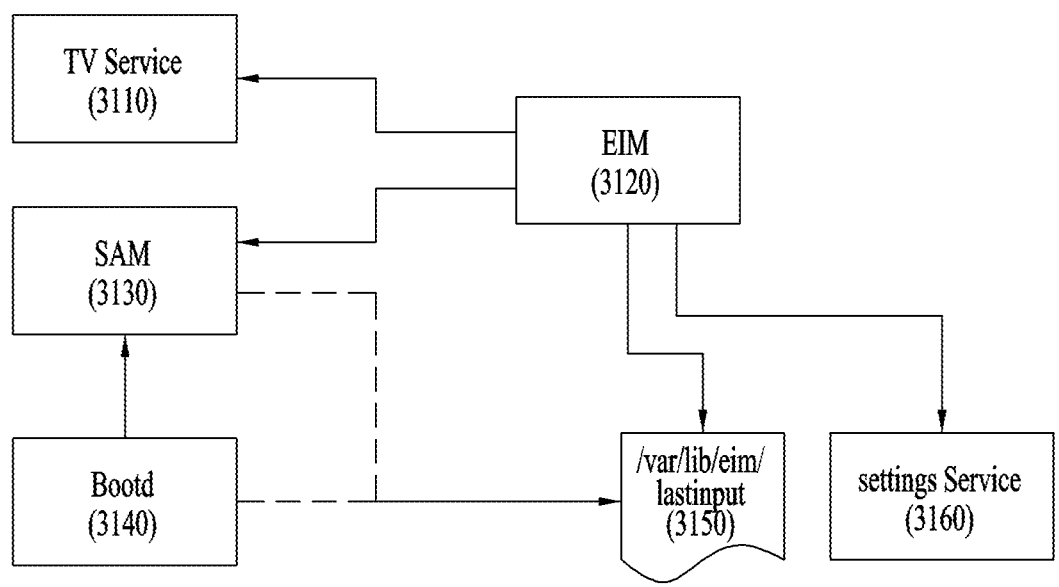
FIG. 31 is a diagram of a processing block for a seamless change according to one embodiment of the present invention.
Figure 32:
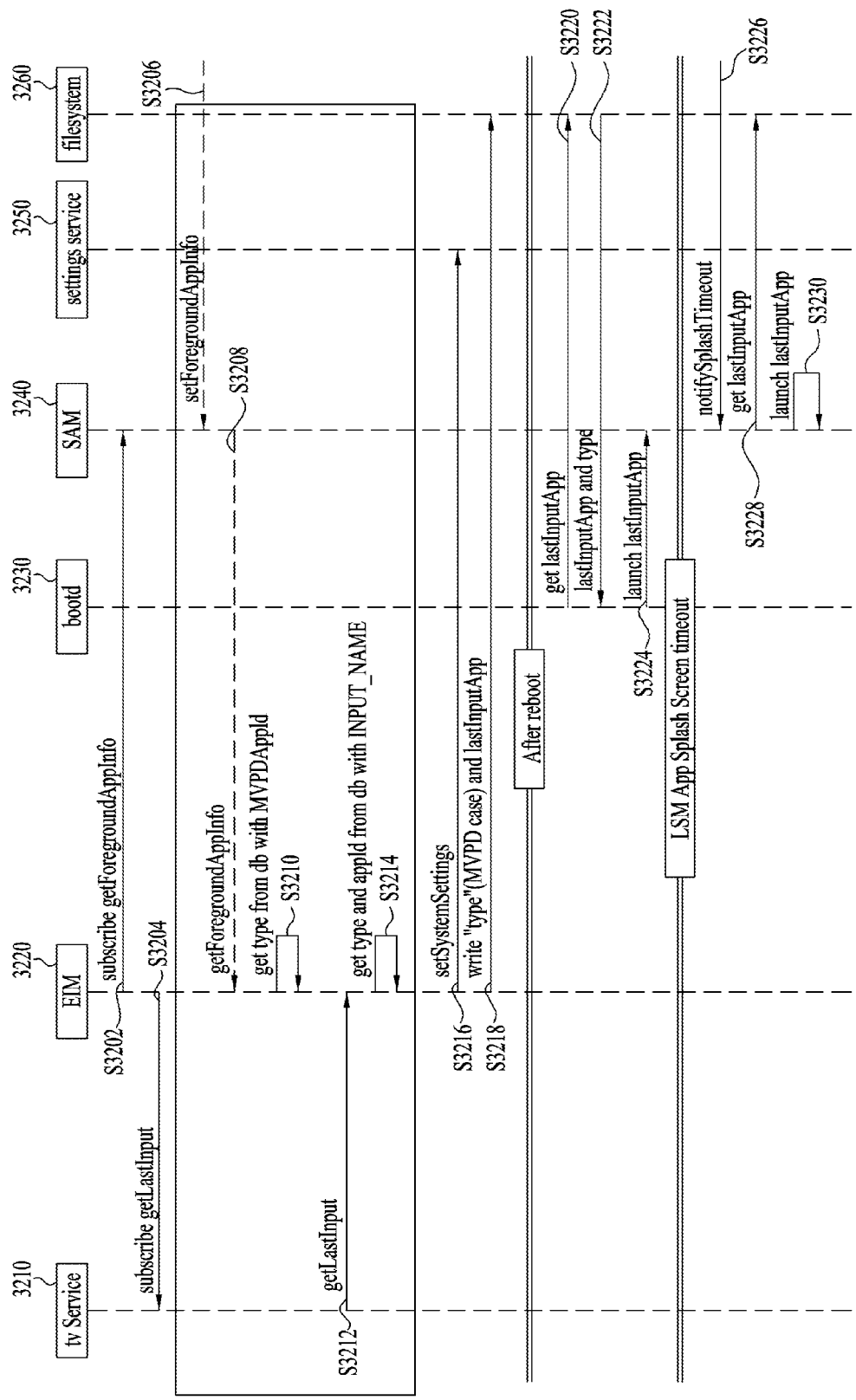
FIG. 32 is a sequence diagram for a process performed in a processing block shown in FIG. 31.

FIG. 31 is a diagram of a processing block for a seamless change according to one embodiment of the present invention and FIG. 32 is a sequence diagram for a process performed in the processing block shown in FIG. 31.

As mentioned in the foregoing description, a basic concept of the present invention is to manage a mapping table between a last input list and a last input application not by SAM 3130, Bootd 3140, and the like but by EIM 3120. The EIM manages the mapping table in a manner of occupying and managing data, a file and the like of the last input application. In this case, a premise of the concept of the present invention is to install an MVPD application and authenticate the MVPD application.

Hence, instead of requesting to the TV service 3110 and obtaining the last input application from an independent mapping table, the SAM 3130 and the Bootd 3140 can directly obtain the last input application from the EIM 3120.

In order to set the last input application, the EIM 3120 subscribes both getForegroundAppInfo API of the SAM 3130 and getLastInput API of the TV service 3110.

In case of MVPD, since data is received via the getForegroundAppInfo API, it is able to set the last input application using the getForegroundAppInfo API. Yet, if a service is not MVPD, data can be received from the two subscribed APIs. Yet, in case of an external input, since information of the TV service 3110 may be more accurate according to a platform policy, it may use last input application setting based on the information of the TV service 3110.

Processing sequences of the processing blocks are explained in more detail in the following with reference to FIG. 32.

The EIM 3220 subscribes getForegroundAppInfo to the SAM 3240 and subscribes getLastinput to the TV service 3210 (S3204). In this case, the step S3202 and the step S3204 can be performed at the same time or can be performed in a reverse order.

In this case, assume that an MVPD application is positioned at the foreground.

The SAM 3240 receives setForegroundAppInfo (S3206) and makes a request for getForegroundAppInfo to the EIM 3220 (S3208). The EIM 3220 obtains type information from a database including MVPDAppId (S3210). If gestLastInput request is received from the TV service 3210 (S3212), the EIM 3220 obtains a type and appId from a database including INPU_NAME (S3214).

Subsequently, the EIM 3120 transmits setSystemSettings to a setting service 3250 (S3216). In case of MVPD, the EIM records a type and a last input application to a file system 3260 (S3218).

After rebooting is performed, the Bootd 3230 transmits getLastInputApp to the file system 3160 (S3220) and obtains a last input application and type information (S3220). And, the Bootd 3230 makes a request for launching the last input application to the SAM 3240.

Subsequently, when LSM application splash screen timeout arrives, if the SAM 3240 receives notifySplashTimeout from external (S3226), the SAM transmits getlastinputApp to the file system 3260 and launches the last input application (S3230).

Figure 33:
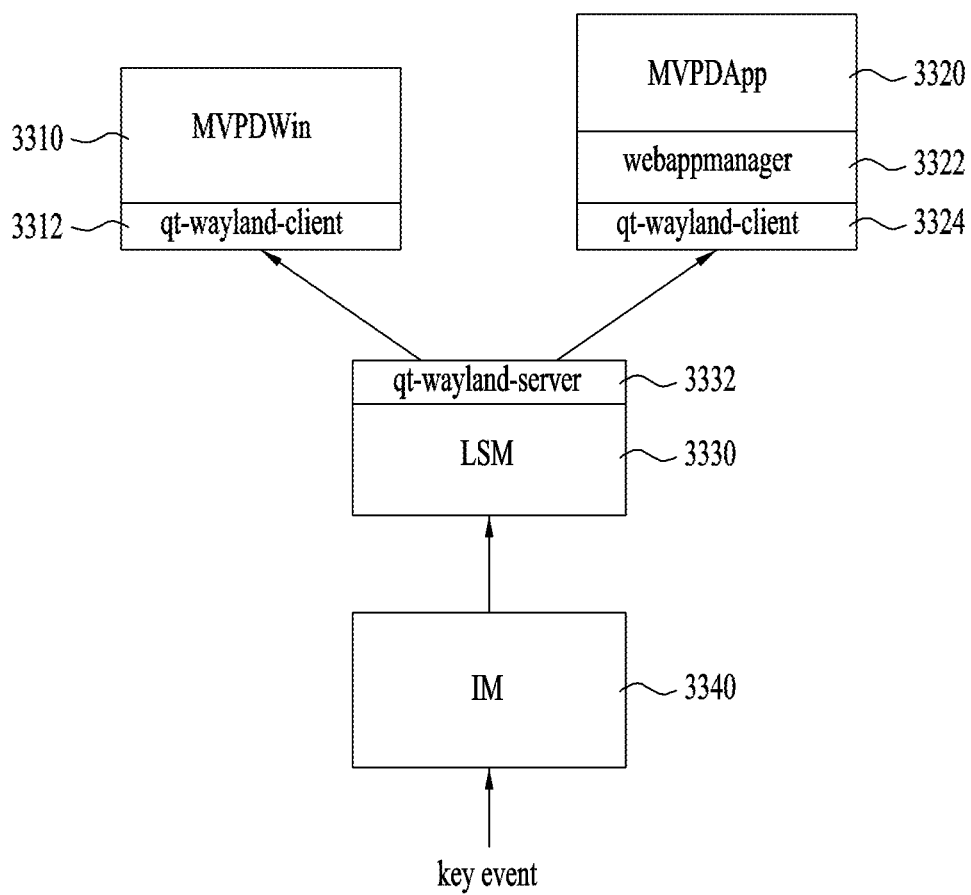
FIG. 33 is a diagram for explaining EKfms input focus change according to one embodiment of the present invention.

FIG. 33 is a diagram for explaining EKfms input focus change according to one embodiment of the present invention.

In the following, an input focus change among the aforementioned contents is explained in more detail. In this case, the input focus change indicates that an input focus is naturally changed into a focused window when MVPDWin goes on to an MVPD application.

If an IM 3340 receives a key event, the IM 3240 transmits sendEvent to an LSM 3330.

The LSM 3330 transmits sendKeyToFocusWindow( ) to the MVPDWin 3310 and the MVPD application 3320 via qt-wayland-server 3332 and qt-wayland-client 3312/3324, respectively. In other word, m_focusObject of the LSM 3330 currently holds a focused client object and a received event, i.e., sendKeyToFocusWindow, is delivered to the focused client object. In this case, the MVPD application 3320 processes the sendKeyToFocusWindow( ), which is received via the qt-wayland-client 3324, via a web manager 3322. Yet, in the foregoing description, the MVPDWin may not correspond to a wayland client. In this case, an additional design may be required.

In the following, an EIM storing a last input application and delivering the application to a setting service is explained in more detail.

FIG. 34 is a diagram for explaining a process scheme or a function of EIM according to one embodiment of the present invention.

FIG. 34a shows a scheme not mainly processed by the EIM and FIG. 34b shows a scheme mainly processed by the EIM.

Referring to FIG. 34a, if each of input applications is foregrounded, a last input application is configured by a setting service (setSystemSettings {"Category": "general", "key": "lastInputApp", "Option": APP_ID}).

Yet, as shown in FIG. 34a, if each of input applications is in charge of a private system setting, efficiency can be lowered. And, applications including the MVPD application may be unable to access a private API in general.

Hence, according to the present invention, as shown in FIG. 34b, the EIM knows information on a currently foregrounded input application and sets the information to a setting service. If a normal input is foregrounded, an event can be received from a last input of a TV service using a subscription reply. The event includes type information of an external input such as ATV, HTMl_1, RGB and the like and the EIM sets a last input application in a manner of searching for the type information from an input type managed by the EIM and an input application mapping table.

Meanwhile, foreground includes not only a case that an input application is foregrounded but also a case that a TV is displayed as PIG in a TV guide application. In relation to a PIG case, an MVPD input can be processed by a subscription reply of getForegroundAppInfo of the SAM. When the subscription reply is received, if the subscription reply is matched with an MVPD input application managed by the EIM, the EIM sets the application and a file to a setting service.

Meanwhile, in relation to a last input file access scheme, the EIM is a main entity (owner) for writing a file. On the contrary, the SAM, the Bootd, and the TV service have a reading right only.

Figure 35:
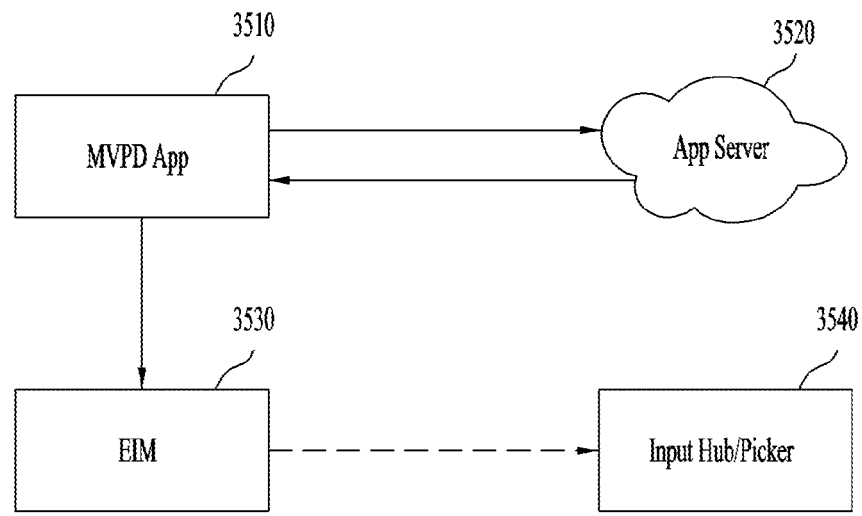
FIG. 35 is a diagram for explaining a scheme of recognizing MVPD as an input mode according to one embodiment of the present invention.

FIG. 35 is a diagram for explaining a scheme of recognizing MVPD as an input mode according to one embodiment of the present invention.

As mentioned in the foregoing description, an MVPD application is recognized and processed as an input mode on a web OS device.

As mentioned above, in order to recognize and process an MVPD application as an input mode on a web OS device, it is necessary to assume that a basic procedure is to be performed.

This is explained in the following with reference to FIG. 35.

An MVPD application 3510 makes a request for authentication to an application server 3520. In this case, if the application server 3520 permits the authentication in response to the authentication request, the MVPD application 3510 transmits addDevice( ) to the EIM 3530 to register the MVPD application as an input mode.

Subsequently, the EIM 3530 transmits such a changed item as the input mode and the like to an input hub (picker) 3540 corresponding to a subscriber using settAllInputStatus( ).

Figure 36:
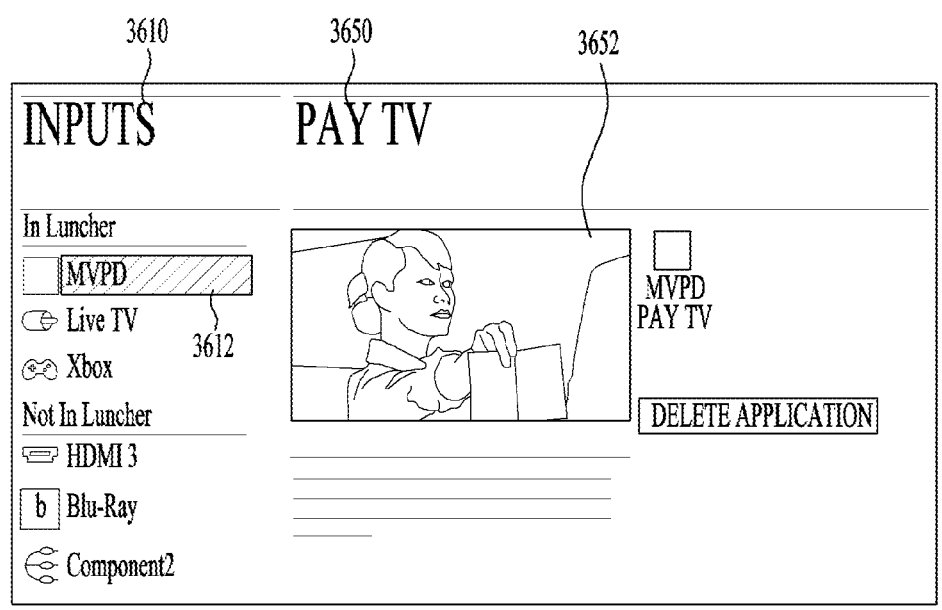
FIG. 36 is a diagram for UX of an input mode in which MVPD is included according to the aforementioned FIG. 35.

FIG. 36 is a diagram for UX of an input mode in which MVPD is included according to the aforementioned FIG. 35.

Referring to FIG. 36, inputs are shown in a first area 3610 and an MVPD item 3612 is also included in the first area. And, details on an MVPD service (pay TV) is outputted on a second area 3650 according to a selection (pointing, hovering, etc.) of the MVPD item 3612 in the first area 3610. For example, an image (PIG replacement image) 3652, an icon and description for the icon can be outputted as the detail on the MVPD service.

Although details for a single MVPD application are shown in FIG. 35, details for a plurality of MVPD applications can be outputted at the same time. And, an item for deleting a prescribed MVPD application is provided in the second area 3650.

As mentioned in the foregoing description, all information on an MVPD input can be obtained from the EIM. The information may correspond to information in the second area 3650.

An image path obtained from the EIM can be read and extracted from an input hub application. For example, images related to a normal input are located at /usr/palm/plugins/inputapps/assets and an input hub (picker) can access the images.

Figure 37:
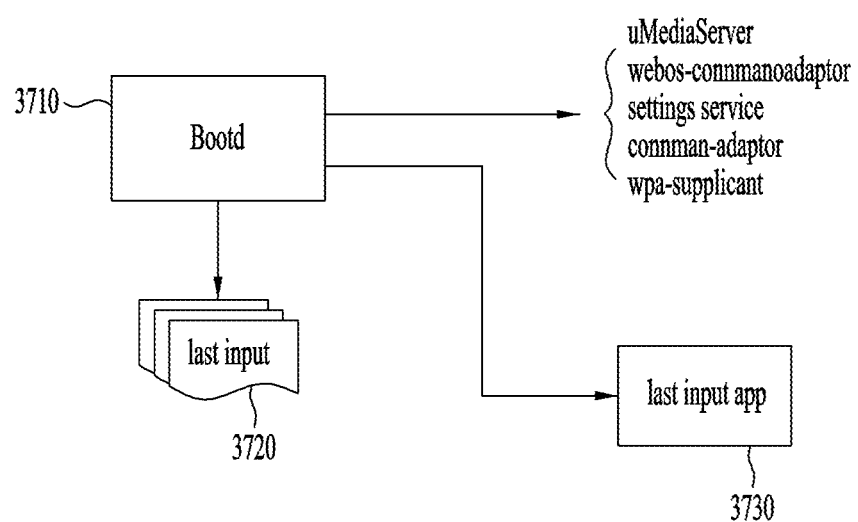
FIG. 37 is a diagram for explaining Bootd according to one embodiment of the present invention.

FIG. 37 is a diagram for explaining Bootd according to one embodiment of the present invention.

Referring to FIG. 37, a boot sequence is modified via Bootd 3710 and a last input application is launched by the Bootd.

The Bootd 3710 reads and extracts last input application information form a last input 3720. If a type of the last input application corresponds to MVPD, the Bootd executes a boot sequence by commanding the start of modules dependent of the Bootd 3710 such as a media server, a web OS-connman-adaptor, a setting service, a connman-adaptor, a wpa-supplicant and the like.

Subsequently, if launching of a web application is ready, the Bootd 3710 commands a last input application 3630 to be launched based on the information read and extracted from the last input 3720.

In relation to the present invention, a TV service is in charge of a core function for a basic broadcasting reception function and a channel-related function of a TV. In particular, if a service provider corresponds to an RF-based service provider (C&M, T-board, etc.), the service provider has implementation dependency for the TV service.

CM, PSIP, SDEC, a tuner, and the like of a TV can be extended to be implanted in a manner of being interlocked with a CAS service of a service provider. And, a TV service performs reset of a TV pipeline for channel switching of TVWin and VSM connection.

Subsequently, if a live TV application is launched, the TV service can seamlessly deliver a pipeline identifier (pipelineID). Meanwhile, for example, XCAS manager of a service provider can be implemented in a manner of being interlocked with the TV service.

Meanwhile, the TV service can process an exception of an MVPD mode. For example, the TV service refers to /var/lib/eim/lastinput file managed by EIM to determine whether or not the service is booted in the MVPD mode. And, if the service is booted in the MVPD mode, it may be able to define a structure in order not to pass through reset of a TV pipeline processed for TVWin and a VSM connection part. For example, in case of an MVPD RF input mode, the reset can be processed by MVPDWin.

Meanwhile, the TV service can add or extend a channel manager (CM) API. For example, the TV service can additionally implement a channel switching function that uses a frequency required by a service provider, a program number, channel information and the like.

And, the TV service can increase a level of channel switching. For example, when a CM makes a request for obtaining an audio PID and a video PID to a PSIP module, time taken for receiving a reply is too long. Hence, the TV service stores and uses channel information to cope with a live TV. The TV service can support a channel manager, a PSIP module and the like to satisfy a channel switching speed for MVPD using a similar scheme.

Besides, in relation to channel performance, an optimization area of the TV service may vary according to whether audio PID and video PID are obtainable by an interval of receiving a PMT (program map table) from a service provider and the PMT only or parsing of a VCT (virtual channel table) is additionally required. First of all, since MVPD is aware of information of a corresponding program, if PSIP parses PAT (program association table) and the PMT only, a channel information event can be transmitted to a channel manager. And, the channel manager sets a PID to a corresponding channel by matching program numbers.

In this case, although PSIP information of an ATSC scheme is explained as an example, as mentioned in the foregoing description, a digital device according to the present invention can process a DVB scheme, a DTMB/CMMB scheme and the like and Table for the same and may be able to include a module for the same. Hence, a TV service can process channel information using a scheme identical to or similar to the aforementioned scheme via the module.

In the foregoing description, a digital device for processing an RF-based MVPD service and a method of processing therefor are described. In the following, a digital device for processing an IP-based MVPD service and a method of processing therefor are described. Meanwhile, among explanations or drawings related to the processing of the IP-based MVPD service, explanation overlapped with the explanation on the aforementioned RF-based MVPD service is omitted at this time and it may refer to the aforementioned contents.

The IP-based MVPD service supports a function similar to a function of the aforementioned RF-based MVPD service. In other word, if an MVPD service provider embeds a set-top box in a device, MVPD is regarded as a virtual external input, UX for the MVPD is outputted, and it may be able to access an MVPD service not only using an MVPD application but also using an external input. In case of accessing the IP-based MVPD service, it may be able to support a channel up/down function to a live stream. In addition, after booting is performed, a native end can support streaming before an MVPD web application is outputted. Regarding this, it was sufficiently explained in the aforementioned RF-based MVPD service.

Figure 38:
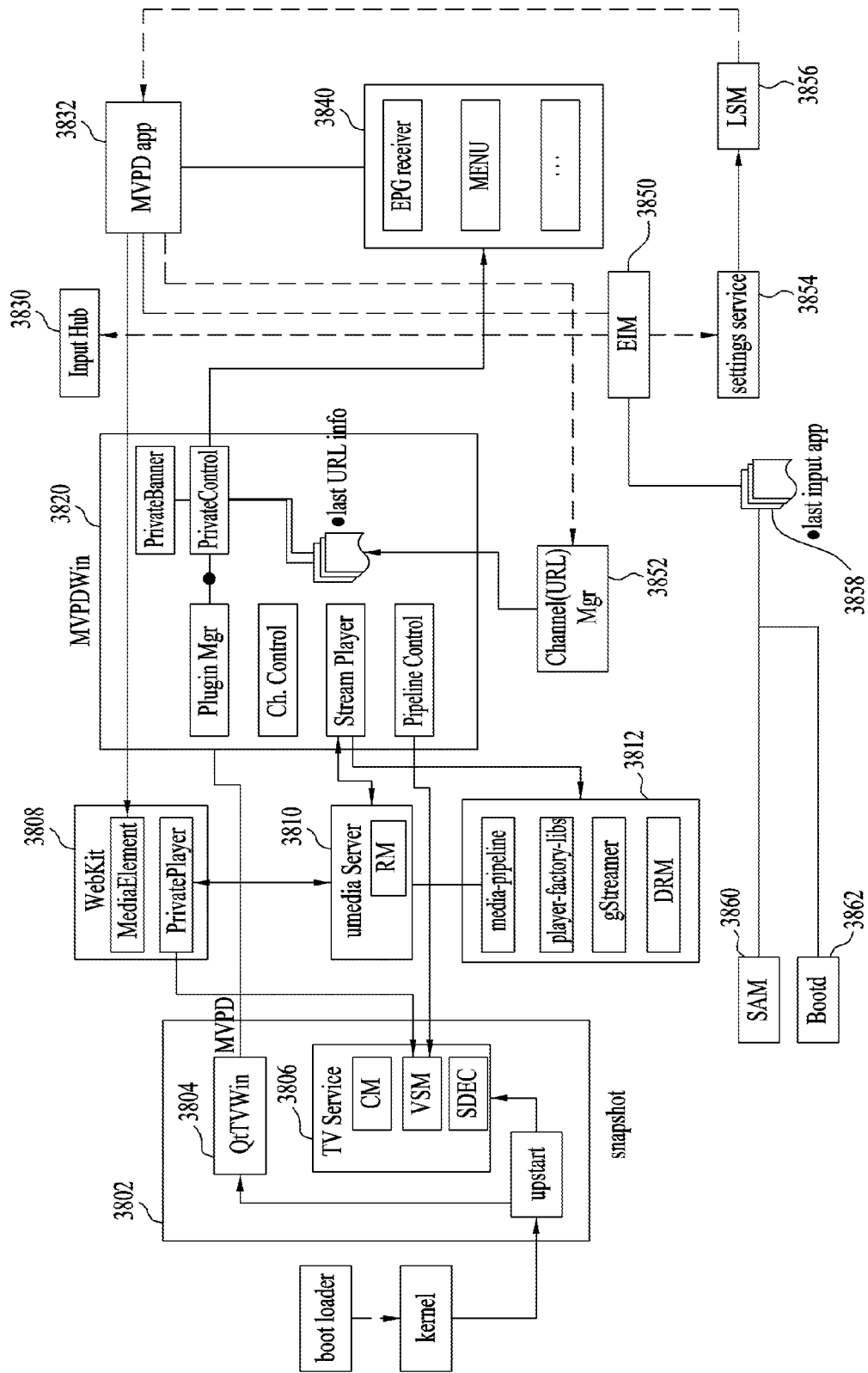
FIG. 38 is a configuration block diagram for a device to recognize an IP-based MVPD service as an input mode and process the IP-based MVPD service according to one embodiment of the present invention.

FIG. 38 is a configuration block diagram for a device to recognize an IP-based MVPD service as an input mode and process the IP-based MVPD service according to one embodiment of the present invention.

As mentioned in the foregoing description, since a configuration and explanation of FIG. 38 correspond to the configuration and the explanation of FIG. 25, explanation on overlapped part is omitted at this time.

Referring to FIG. 38, a configuration different from the configuration of FIG. 25 may include a web kit 3808, a media server 3810, a pipeline processing unit 3812, a URL-based channel manager 3852, a process configuration 3840 corresponding to XCAS manager, and the like.

In this case, the IP-based MVPD service shown in FIG. 38 may be different from the aforementioned RF-based MVPD service in a boot sequence via Bootd. For example, in the RF-based MVPD service, a boot sequence is optimized for a TV, an external input, and the like. On the contrary, since the IP-based MVPD service performs network media streaming, there exist more services requiring fast launching. In particular, in case of the IP-based MVPD service, it may be able to change an input in 15 seconds by executing an input picker. In relation to this, a basic concept that Bootd reads and extracts a type of a last input application and launches a necessary module is similar. In relation to this, the last input application can be outputted by either TVWin or MVPDWin.

Figure 39:
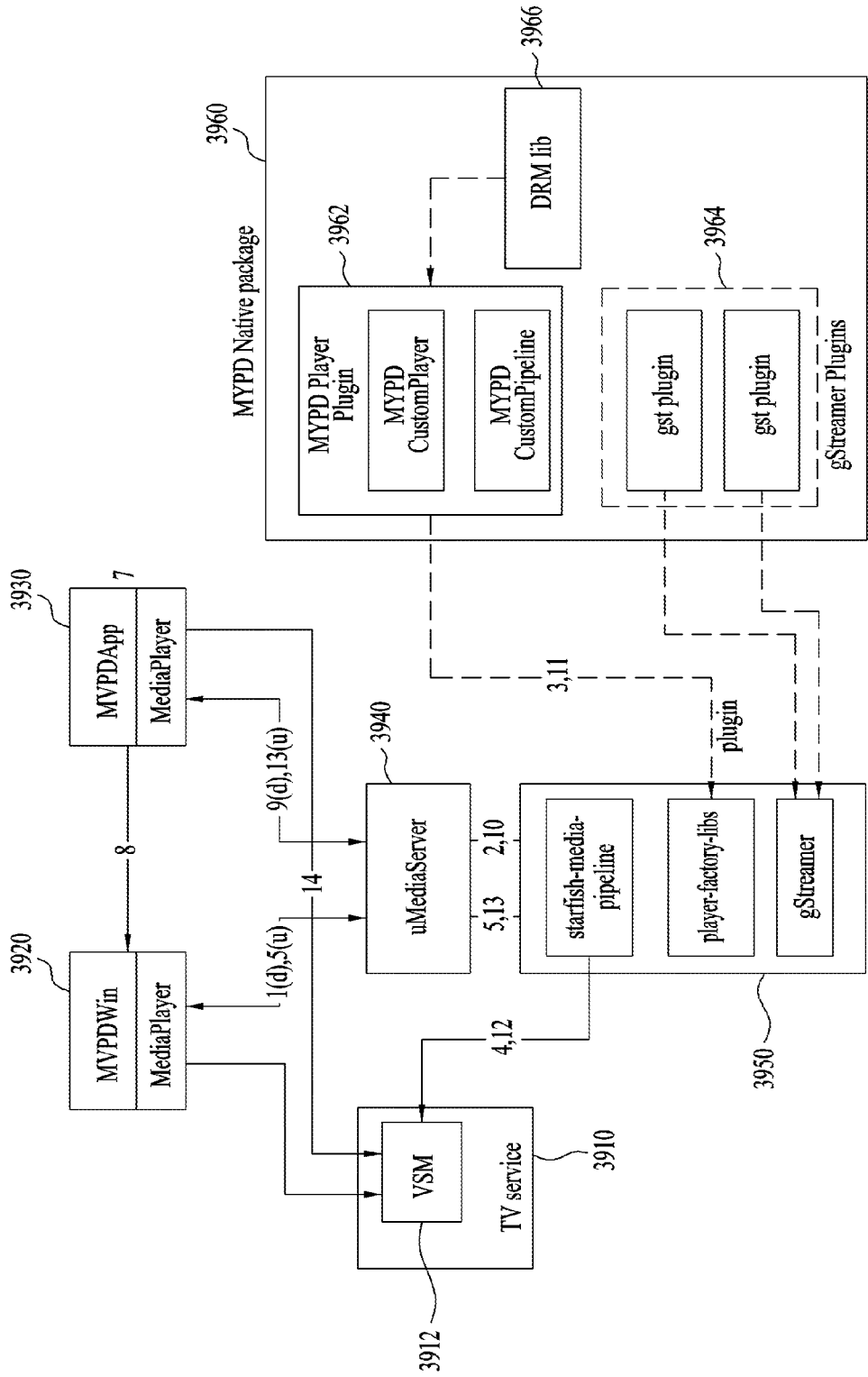
FIG. 39 is a diagram for explaining a media framework for an IP-based MVPD service according to one embodiment of the present invention.
Figure 40:
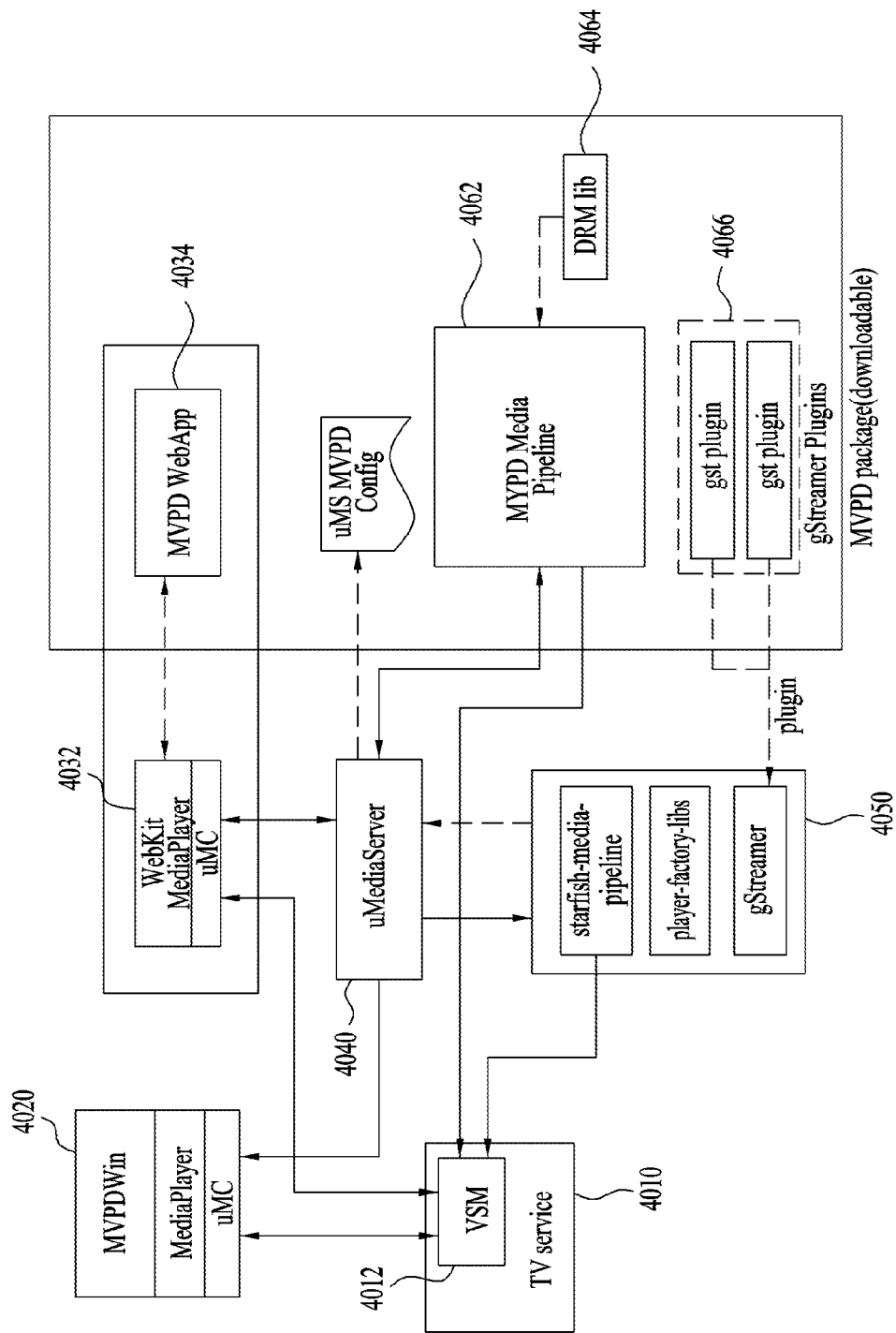
FIG. 40 is a diagram for explaining a media framework according to a different embodiment of the present invention.

FIG. 39 is a diagram for explaining a media framework for an IP-based MVPD service according to one embodiment of the present invention and FIG. 40 is a diagram for explaining a media framework according to a different embodiment of the present invention.

A media framework can be used in a manner of being interlocked with a media server (uMediaServer) 3940. A starfish-media-pipeline supports most of media and a camera pipeline and the like are separately exist.

DRM (digital right management) is processed by a unique DRM service API and various DRM libraries can be used by potting the DRM libraries using the API.

In particular, in relation to MVPD service processing, in case of not considering downloadable, an MVPD service is processed based on a starfish-media-pipeline. In case of considering the downloadable, an MVPD service can be implemented by generating a separate dedicated pipeline.

Meanwhile, it may be able to perform potting on the DRM with gStreamer plug-in.

In relation to the MVPD service, FIG. 39 shows a media framework for a case that a downloadable issue is not considered and FIG. 40 shows a media framework for a case that the downloadable issue is considered.

In relation to the present invention, a basic API, which is defined to cope with MVPD, other external service provider, and the like in a web OS platform, may correspond to uMediaServer API.

A web application end makes a request for a player of a service provider by a scheme of using a video tag (<video> tag) and a native player porting end may be able to use a standard gStreamer pipeline. In this case, the gStreamer pipeline can be configured by a static pipeline.

A service provider performs potting on a DRM library of the service provider with a standard gStreamer plug-in and it is able to make the DRM library write a standard gStreamer pipeline.

Hence, in case of an MVPD service of no downloadable issue, a service provider, which does not perform downloadable correspondence, uses a starfish-media-pipeline. In this case, it is able to implement an MVPD-dedicated player and a pipeline in a manner of inheriting CustomPlayer and CustomPipeline to the starfish-media-pipeline.

On the contrary, in case of an MVPD service of a downloadable issue, it may be able to configure a separate MVPD-dedicated pipeline rather than the starfish-media-pipeline in a media server.

In the following, a method processing an MVPD service of no downloadable issue is explained with reference to FIG. 39.

In this case, as mentioned in the foregoing description, assume a case that QtTVWin is skipped and a TV pipeline is not reset.

First of all, uMediaServer 3940 loads MVPDWin 3920. Meanwhile, the uMediaServer 3940 also loads MediaAPI to a processing unit 3850.

A gStreamer pipeline is generated together with custom gStreamer plug-in 3964.

A starfish-media-pipeline in the processing unit 3950 registers at VSM 3912 of a TV service 3910. And, a loadCompleted event is delivered to the MVPDWin 3920. Hence, the MVPDWin 3920 makes a request for connection with the VSM and an MVPD application 3930 is launched via Bootd and SAM.

After the MVPD application 3930 is launched, it may inform the MVPDWin 3920 that the application ready. The MVPDWin 3920 does not perform a function anymore. Hence, the MVPD application 3930 directly communicates and functions with the uMediaServer 3940 and processes an MVPD service.

In the following, processing of a downloadable MVPD service is explained with reference to FIG. 40. In this case, as shown in FIG. 40, a configuration of FIG. 40 is different from a configuration of FIG. 39. For a common configuration and function, it may refer to the aforementioned contents. A different part is mainly explained in the following.

Similar to an input mode for an RF-based MVPD service, a streaming screen is seamlessly switched when MVPDWin goes on to an MBPD application.

An uMediaServer 4040 may not control a pipeline session.

In relation to this, this is indented to secure seamlessness in a manner that an original pipeline session owner is in charge of playing. In other word, the MVPDWin 4020 plays a screen until the MVPD application 4034 changes a channel.

Since the MVPDWin 4020 is continuously in charge of playing a screen despite an application is opened, no processing is performed on a pipeline although a minimize event is received. Yet, after the application is opened, rendering can be performed on UI by the MVPD application 4034.

An event to be received by a player is propagated to a media player of a web kit 4032 via a service of the MVPDWin 4020.

Since it is necessary to match a status of a media player of the MVPDWin 4020 with a current player, a current status of an MVPD player can be delivered by a return of a subscribe call.

When a channel is changed in the MVPD application 4034, loading is performed by the application and the MVPDWin 4020 transmits a call (kill call) to make the MVPDWin stop functioning.

After the application performs first loading, it may use setUri to change a channel.

FIG. 41 is a diagram for a processing block of a main configuration for providing an IP-based MVPD service according to one embodiment of the present invention.

FIG. 41*a* is a diagram for explaining an MVPD application preferentially launched in a booting process and FIG. 41*b* is a diagram for explaining a case that there is a first channel change on an MVPD application according to FIG. 41*a*.

First of all, referring to FIG. 41*a*, an MVPD application 4130 is launched via Bootd {"boot":true} 4140.

In this case, the MVPD application can be loaded without a vide tag. In other word, boot is included in launching parameters, a video tag parameter ({"firstUse":true}) is added in the MVPD application, and the MVPD application 4130 can be preferentially loaded without a vide tag.

In this case, the MVPD application 4130 can process an exception using a web kit if necessary. For example, the video tag parameter corresponds to true and AV mute may not be performed after loadComplete. And, it may not perform setBlackBG.

Meanwhile, if a first channel change is requested on the launched MVPD application 4130, as mentioned in the foregoing description, it may use setUri.

The MVPD application 4130 scribes a media event using an MVPDWin player 4110. The MVPDWin player 4110 returns a current player status to the MVPD application 4130 in response to the scribe. Meanwhile, if an event is received from an umediaserver 4120, the MVPDWin player 4110 delivers the received event to the MVPD application 4130.

Subsequently, as an example, a first channel change shown in FIG. 41*b* can be processed by the MVPDWin 4110 and the MVPD application 4130 only.

For example, as mentioned earlier in FIG. 41*a*, if a channel change is requested after an MVPD application 4130 is launched, the MVPD application 4130 loads a video tag. In this case, the MVPD application 4130 loads URI via a web kit player. In the foregoing description, if {"boot": true} is already included in launching parameters in the course of loading a video tag, the URI is loaded without using the parameter.

And, the MVPD application 4130 transmits a kill command to the MVPDWin player to change a channel.

Figure 42:
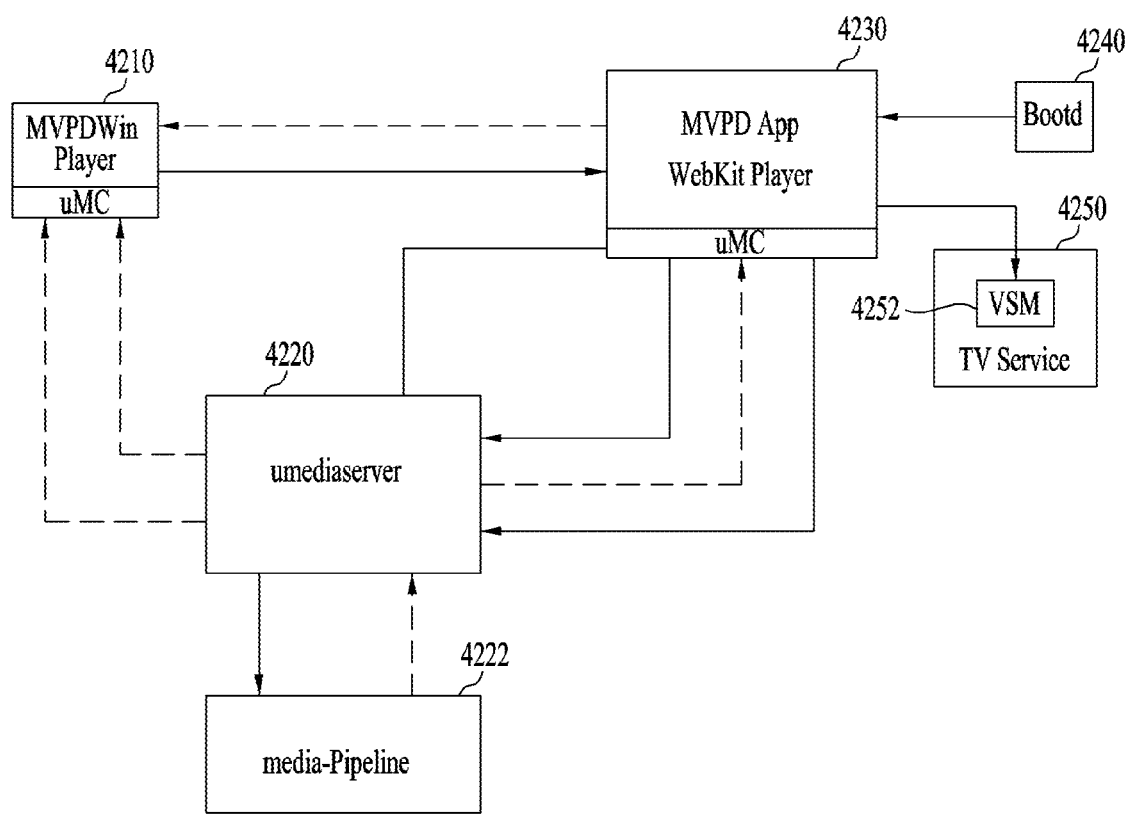
FIGS. 42 and 43 are diagrams for a processing block of a main configuration for providing an IP-based MVPD service according to a different embodiment of the present invention.
Figure 43:
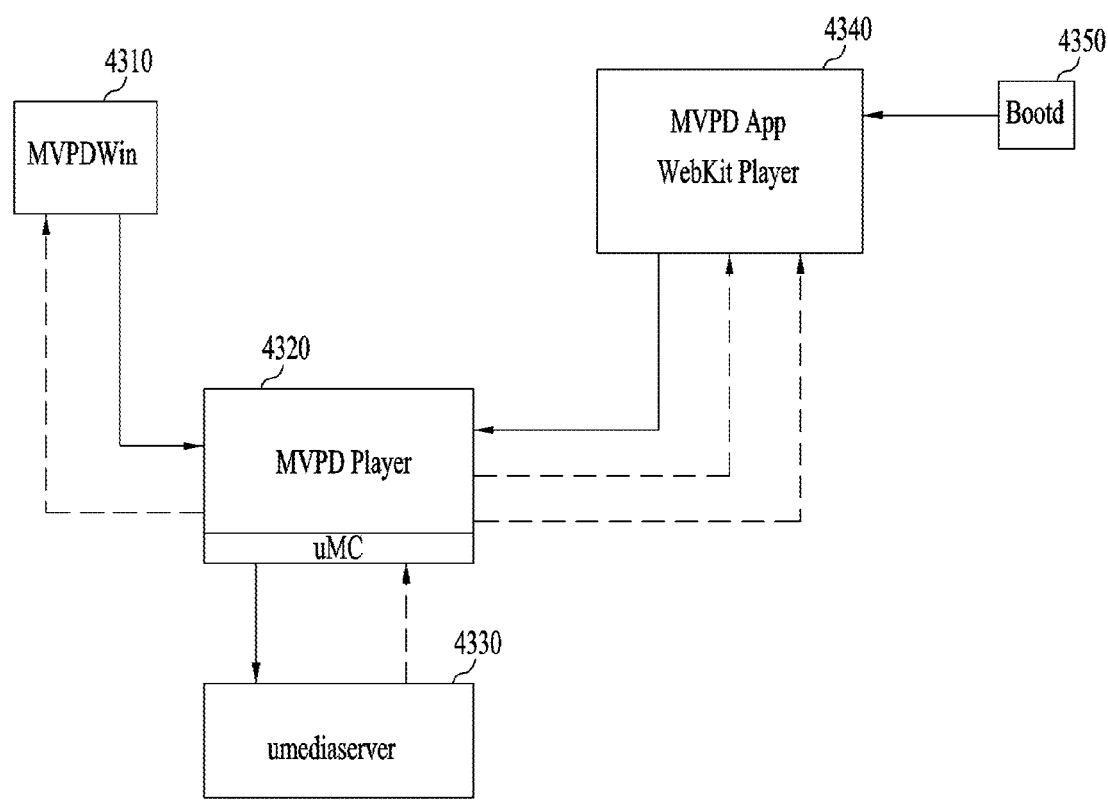

FIGS. 42 and 43 are diagrams for a processing block of a main configuration for providing an IP-based MVPD service according to a different embodiment of the present invention.

FIGS. 42 and 43 adopt a scheme different from a scheme of FIG. 40. For example, in FIGS. 42 and 43, an owner of a change pipeline session is explained.

Basically, in FIGS. 42 and 43, it may be able to design a policy not collided with a policy of a legacy media server.

For example, a media server may not correspond to an owner for such a command as play, stop, pause, and unload of an event.

For security reasons, the media server may not reveal mediaId managed by the media server except an owner of the mediaId, i.e., a main agent of loading request.

The media server does not manage a client corresponding to the mediaId, may not be involved in an extending characteristic of a specific pipeline except a general pipeline characteristic, and may not process an exception. The media server can permit a single client (owner) only in response to a single mediaId.

In relation to transferring of a mediaId control right, an MVPDWin corresponding to an owner of the mediaId should be a main agent for transferring the right. This is because the media server may not manage client information.

If an MVPD application makes a request for a mediaId, an MVPDWin checks a requester and may be able to return the mediaId to the requester.

According to the present invention, it may be able to extend a function of a media server. For example, the media server can be extended to receive a legacy pipeline control in a manner of being loaded using mediaId. To this end, if a legacy load( ) API is extended, it may be able to recognize the mediaId as a factor as well as URI.

For example, since it is impossible for a plurality of modules to subscribe an identical mediaId, a new subscription can be defined to replace a legacy subscription with the new subscription. To this end, it is able to define and deliver an extended player and an event for resetting a media server.

In this case, for example, the media server is not a main agent for generating an event. Hence, a media pipeline end corresponding to a lower end of the media server should provide an event to the media server.

For example, when a previously loaded pipeline delivers loading again, it is necessary to deliver a basic event such as sourceInfo, ladCompleted, videoInfo, audioInfo, and the like to the media server end.

Subsequently, processing can also be performed by a web kit player. As a default operation, AV can be muted until playing after the loadCompeleted. The default operation can be performed in a manner of processing a player background of a graphic end as black until VSM is connected from immediately before loading. In this case, a current player may play a basic operation.

Meanwhile, a web kit player can process an exception that makes the codes not to be operated only for "launch on boot".

According to the present invention, the web kit player may be able to add a new exception processing routine to a legacy player or generate a new player.

Referring to FIG. 42, an MPVD application 4230 notifies an MVPDWin player 4210 that an application is ready and the MVPDWin player 4210 commands the MVPD application 4230 to relaunch. In this case, the MVPD application 4230 makes ready by receiving a launching command from Bootd 4240 and the MVPDWin 4210 may receive an event from a media server 4220.

Having received the relaunching command, the MVPD application 4230 loads a video tag and URI using a web kit player.

The web kit player transmits loadExit (URI) to the media server 4220 via uMC, receives a return of mediaId, and subscribes the returned mediaId. In the foregoing description, if the mediaId is included in a load parameter, the media server 4220 does not load a new pipeline process and makes a request for queuing and pending of a pipeline including the given mediaId. And, if a subscription request is received from the MVPD application 4230 and the received subscription exists in the mediaId, a previous uMC handle's client watcher is eliminated, a subscription of the previous uMC handle is cancelled, a new uMC handle including the mediaId is subscribed, a client watcher for a new uMC handle is added, and a load request pending is processed. The media server 4220 delivers the received loadExit (URI) to the media pipeline and delivers an event to the media server again. In this case, the delivered event may include sourceInfo, loadCompleted, videoInfo, audioInfo, and the like.

Having received the event from the media pipeline 4222, the media server 4220 delivers the event to the MVPD application. And, the MVPD application 4230 makes a request for connection with VSM 4252 of a TV service 4250. In this case, if mediaId subscription is received from the MVPD application 4230 before the event is delivered, the media server 4220 commands MVPDWin player 4210 to perform disconnection. If the command is received, the MVPDWin player 4210 kills itself.

In the foregoing description, for example, the relaunching timing may correspond to timing that the MVPDWin is in idle state. For example, if an event for such a request as a channel change and the like is received and a process for the event is completed, the relaunching can be performed.

Meanwhile, a lifecycle of the MVPDWin becomes timing at which processing on seamless is completed in the media server 4220. The timing of completing the processing indicates that processing on the seamless is completed. In particular, it indicates that a subscription is handed over. Meanwhile, it is necessary for the lifecycle of the MVPDWin to have an exception for a routine of killing itself in relation to the MVPD application.

Meanwhile, in the foregoing description, loading to the media pipeline is pending. This is because if an event is provided by the media pipeline before the subscribed, since the event is provided to a player of the MVPDWin instead of a web kit, it is necessary to deliver a queued load after the subscribe.

And, if URI and other load parameter are delivered to the media pipeline 4222, it is necessary to determine whether a pipeline is maintained or reloaded in a manner of matching a previously loaded URI and URI to be loaded with each other. It is also able to determine whether to compare the rest of parameters with a legacy state.

Meanwhile, as mentioned in the foregoing description, a method of generating a dedicated player for a service is explained in the following with reference to FIG. 43.

In this case, control of a pipeline of the media server 4330 does not move. In other word, since the aforementioned pipeline session owner is in charge of playing, seamless can be secured.

The MVPD application 4340 plays a screen using the MVPDWin 4310 until a channel is changed and the MVPDWin 4310 is continuously in charge of playing despite an application is opened. Hence, in this case, the MVPDWin 4310 performs no processing on a pipeline although a minimize event is received. Yet, after an application is opened, the MVPD application 4340 is in charge of UI.

For example, an event to be received by a player is propagated to a player of a web kit via a service of the MVPDWin 4310 and a current state of an MVPD player 4320 is delivered by a return of a subscribe call in a manner of matching a state of a player of the MVPDWin 4310 with a current player.

Meanwhile, when a channel is changed in the MVPD application 4340, loading is performed in the application and a kill call is transmitted to the MVPDWin 4310.

A channel change is performed using setUri after first loading is performed in the application.

In this case, a lifecycle of the MVPDWin 4310 is autonomously killed when the lifecycle is minimized after the lifecycle is launched by the TVWin.

Meanwhile, the MVPD application 4340 seamlessly moves to the foreground. The MVPD application can seamlessly move to the foreground after the MVPD application 4340 is stabilized, the MVPD application 4340 transmits ready to the MVPDWin 4310, and the MVPD application 4340 transmits a relaunching command to show the application in the MVPDWin 4310. Hence, when the MVPD application 4340 moves to the foreground, an event is subscribed using an MVPD player 4320, i.e., a dedicated player for the MVPD application, the MVPD player 4320 returns a current state of the player, and the MVPD application (web kit player) 4340 configures the state.

Generally, although FIG. 43 is similar to FIG. 42, contents on the media pipeline and contents on the MVPD-dedicated player are different from each other.

Mode for Invention

According to various embodiments of the present invention, it is able to support and process an RF and/or an IP-based MVPD service in a digital device on which a web OS platform is mounted, it is able to provide the MVPD service in a form similar to external inputs such as a HDMI, a component and the like and provide accessibility and convenience to a user, it is able to provide and process a service of performance equal to or greater than performance of a legacy MVPD service or a hardware set-top box, and it is able to seamlessly provide a service when booting and the like are performed in case of supporting a MVPD service on a web OS platform.

A digital device disclosed in the present specification may be non-limited to the aforementioned configurations and method of embodiments. The embodiments may be composed in a manner that a whole or a part of the each of the embodiments is selectively combined to achieve various modifications.

Meanwhile, a method of operating a digital device disclosed in the present specification can be implemented with a code readable by a processor in a recording media in which a program is recorded. The recording media readable by the processor includes recording devices of all types in which data readable by the processor is stored. The examples of the recording media readable by the processor may include a ROM, a RAM, a CD-ROM, a magnetic tape, a floppy disc, an optical data storing device and the like. And, implementing in a form of a carrier wave (e.g., transmission via the internet) is also included. The recording media readable by the processor are distributed to the computer systems connected by a network and codes readable by the processor can be stored and executed in a manner of being distributed.

While the present specification has been described and illustrated herein with reference to the attached drawings thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

INDUSTRIAL APPLICABILITY

The present invention relates to a digital device and a method of controlling therefor. The present invention is usable over industry using the same.

What is claimed is:

1. A method of controlling a digital device, comprising:
receiving a power-on signal;
determining whether or not an application, which is executed at a time of power-off before the power-on signal is received, corresponds to an image output application;
when the application, which is executed at the time of power-off, corresponds to the image output application, loading and executing the image output application;
loading and executing a first image control application for controlling an image outputted via the image output application;
loading a second image control application;
when the loading is completed, terminating the first image control application and executing the second image control application;
when the application, which is executed at the time of power-off, is a non-image output application, displaying a specific image output application during loading the non-image output application; and
displaying a message for receiving an output request input of the non-image output application when the loading is completed.

2. The method of claim 1, wherein the power-on signal corresponds to an IR (infrared ray) signal inputted from an external input means and wherein the external input means comprises a remote controller.

3. The method of claim 1, wherein the image output application comprises a first image output application configured to output a real-time broadcasting program received via a tuner and a second image output application configured to output an external input image inputted via an external device interface.

4. The method of claim 3, wherein when the image output application corresponds to the first image output application, the first image control application controls channel change and volume adjustment of a real-time broadcasting program.

5. The method of claim 3, wherein when the image output application corresponds to the second image output application, the first image control application controls volume adjustment of an external input image and type change of an external input and wherein the type of the external input comprises HDMI (high definition multimedia interface), Composite, DVD (digital video disc), and Component.

6. The method of claim 1, wherein the second image control application is generated using a web language containing Java script, HTML (hypertext markup language), and CSS (cascading style sheets).

7. The method of claim 1, wherein the first image control application is executed within first time after the power-on signal is received.

8. The method of claim 1, wherein the second image control application is executed within second time after the power-on signal is received.

9. The method of claim 1, wherein the second image control application provides a control function, a reservation recording function, an EPG (electronic program guide) output function, and a content information output function provided by the first image control application.

10. A digital device, comprising:
a user interface unit configured to receive an input signal from a user;
a broadcast service module configured to receive a broadcast signal;
a reception unit configured to receive an external input signal;
a display module configured to display at least one or more applications; and
a controller configured to control an operation of the digital device,
wherein the controller is further configured to:
receive a power-on signal,
determine whether or not an application, which is executed at a time of power-off before the power-on signal is received, corresponds to an image output application,
load and execute the image output application when the application, which is executed at the time of power-off, corresponds to an image output application,
load and execute a first image control application for controlling an image outputted via the image output application,
load a second image control application, and when the loading is completed, terminate the first image control application and execute the second image control application,
display a specific image output application during loading a non-image output application when the application, which is executed at the time of power-off, is the non-image output application, and
display a message for receiving an output request input of the non-image output application when the loading is completed.

11. The digital device of claim 10, wherein the power-on signal corresponds to an IR (infrared ray) signal inputted from an external input means and wherein the external input means comprises a remote controller.

12. The digital device of claim 10, wherein the image output application comprises a first image output application configured to output a real-time broadcasting program received via a tuner and a second image output application configured to output an external input image inputted via an external device interface.

13. The digital device of claim 12, wherein when the image output application corresponds to the first image output application, the first image control application provides a channel change function and a volume adjustment function of a real-time broadcasting program.

14. The digital device of claim 12, wherein when the image output application corresponds to the second image output application, the first image control application provides a volume adjustment function of an external input image and a type change function of an external input and wherein the type of the external input comprises HDMI (high definition multimedia interface), Composite, DVD (digital video disc), and Component.

15. The digital device of claim 10, wherein the second image control application is generated using a web language containing Java script, HTML (hypertext markup language), and CSS (cascading style sheets).

16. The digital device of claim 10, wherein the first image control application is executed within first time after the power-on signal is received.

17. The digital device of claim 10, wherein the second image control application is executed within second time after the power-on signal is received.

18. The digital device of claim 10, wherein the second image control application provides a control function, a reservation recording function, an EPG (electronic program guide) output function, and a content information output function provided by the first image control application.

* * * * *